United States Patent
Ottesen et al.

(10) Patent No.: US 6,529,685 B2
(45) Date of Patent: Mar. 4, 2003

(54) MULTIMEDIA DIRECT ACCESS STORAGE DEVICE AND FORMATTING METHOD

(75) Inventors: Hal Hjalmar Ottesen, Rochester, MN (US); Gordon J. Smith, Rochester, MN (US); George Willard VanLeeuwen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 09/771,036

(22) Filed: Jan. 26, 2001

(65) Prior Publication Data

US 2001/0041062 A1 Nov. 15, 2001

Related U.S. Application Data

(62) Division of application No. 09/035,624, filed on Mar. 5, 1998, now Pat. No. 6,208,804, which is a continuation of application No. 08/866,377, filed on May 30, 1997, now Pat. No. 5,751,883, which is a continuation of application No. 08/478,328, filed on Jun. 7, 1995, now abandoned.

(51) Int. Cl.[7] .............................. H04N 5/85; H04N 5/91
(52) U.S. Cl. ........................................... 386/125; 70/46
(58) Field of Search .................................. 386/125, 126, 386/124, 46, 105, 106, 45, 92, 83, 68, 67, 6, 7, 82, 70, 72; 360/32; H04N 5/91, 5/85

(56) References Cited

U.S. PATENT DOCUMENTS

| 4,142,209 A | 2/1979 | Hedlund et al. |
| 4,420,828 A | 12/1983 | Yoshida et al. |
| 4,475,132 A | 10/1984 | Rodesch |
| 4,761,694 A | 8/1988 | Shudo et al. |

(List continued on next page.)

FOREIGN PATENT DOCUMENTS

EP 0265167 A3 4/1988

OTHER PUBLICATIONS

IBM Technical Disclosure Bulletin, Multimedia Extensions to Tutorial Manager for Officevision, vol. 33, No. 2, Jul. 1990, p. 440.

(List continued on next page.)

*Primary Examiner*—Robert Chevalier
(74) *Attorney, Agent, or Firm*—Crawford & Maunu, PLLC; Mark A. Hollingsworth

(57) ABSTRACT

A multimedia direct access storage device and a method for transferring source program signals representative of a compressed digital multimedia program to and from the direct access storage device are disclosed. A multimedia program is transmitted from a multimedia server as a custom ordered series of discrete program segments and received by the multimedia direct access storage device, which buffers the compressed program segments for subsequent presentation on a local display monitor. The multimedia direct access storage device is preferably incorporated as a component of a local set-top control system for buffering a predetermined number of compressed program segments received from the multimedia server, some of which may be non-sequentially ordered and others of which may be sequentially ordered. A novel formatting methodology provides for the sequential presentation of the program segments asynchronously distributed on one or more data storage disks disposed in the direct access storage device. A user-definable presentation control window for performing local VCR-type presentation control functions for the portion of a multimedia program buffered in the direct access storage device is also provided through the novel formatting methodology. The novel formatting methodology also provides concurrent presentation and buffering of program segments received from the multimedia server for on-demand viewing of a selected multimedia program.

20 Claims, 30 Drawing Sheets

U.S. PATENT DOCUMENTS

| | | |
|---|---|---|
| 4,797,752 A | 1/1989 | Giddings |
| 4,916,682 A | 4/1990 | Tomoda et al. |
| 4,949,187 A | 8/1990 | Cohen |
| 4,972,190 A | 11/1990 | Primeau et al. |
| 5,031,218 A | 7/1991 | Galand et al. |
| 5,113,439 A | 5/1992 | Hashimoto |
| 5,148,432 A | 9/1992 | Gordon et al. |
| 5,191,410 A | 3/1993 | McCalley et al. |
| 5,197,051 A | 3/1993 | Tomoda et al. |
| 5,208,665 A | 5/1993 | McCalley et al. |
| 5,257,111 A | 10/1993 | Kakuyama |
| 5,260,800 A | 11/1993 | Sturm et al. |
| 5,291,343 A | 3/1994 | Goto |
| 5,341,474 A | 8/1994 | Gelman et al. |
| 5,357,276 A | 10/1994 | Banker et al. |
| 5,369,533 A | 11/1994 | Ottesen et al. |
| 5,410,676 A | 4/1995 | Huang et al. |
| 5,414,455 A | 5/1995 | Hooper et al. |
| 5,434,678 A | 7/1995 | Abecassis |
| 5,442,455 A | 8/1995 | Hioki et al. |
| 5,453,779 A | 9/1995 | Dan et al. |
| 5,453,790 A | 9/1995 | Vermeulen et al. |
| 5,461,415 A | 10/1995 | Wolf et al. |
| 5,517,250 A | 5/1996 | Hoogenboom et al. |
| 5,517,652 A | 5/1996 | Miyamoto et al. |
| 5,521,630 A | 5/1996 | Chen et al. |
| 5,528,281 A | 6/1996 | Grady et al. |
| 5,533,021 A | 7/1996 | Branstad et al. |
| 5,535,137 A | 7/1996 | Rossmere et al. |
| 5,535,414 A | 7/1996 | Burge |
| 5,537,408 A | 7/1996 | Branstad et al. |
| 5,539,871 A | 7/1996 | Gibson |
| 5,541,919 A | 7/1996 | Young et al. |
| 5,555,441 A | 9/1996 | Haddad |
| 5,557,538 A | 9/1996 | Retter et al. |
| 5,557,541 A | 9/1996 | Schulhof et al. |
| 5,574,662 A | 11/1996 | Windrem et al. |
| 5,581,310 A | 12/1996 | Vinekar et al. |
| 5,586,264 A | 12/1996 | Belknap et al. |
| 5,594,924 A | 1/1997 | Ottesen et al. |
| 5,603,058 A | 2/1997 | Belknap et al. |
| 5,612,953 A | 3/1997 | Olnowich |
| 5,630,067 A | 5/1997 | Kindell et al. |
| 5,630,104 A | 5/1997 | Ottesen et al. |
| 5,701,383 A * | 12/1997 | Russo et al. |
| 5,751,883 A | 5/1998 | Ottesen et al. |
| 6,208,804 B1 * | 3/2002 | Ottesen et al. |

OTHER PUBLICATIONS

IBM Technical Disclosure Bulletin, Interactive Computer/Video Server, vol. 34, No. 3, Aug. 1991, pp. 67–68.

IBM Technical Disclosure Bulletin, Automatic Multiple Source Selection in a Video Conference, vol. 34, No. 7A, Dec. 1991, pp. 385–386.

IBM Technical Disclosure Bulletin, Multimedia Bitmap Video Imaging in an OS/2 Window, vol. 34, No. 7A, Dec. 1991, pp. 402–403.

IBM Technical Disclosure Bulletin, Multimedia Network System, vol. 35, No. 4B, Sep. 1992, pp. 118–119.

IBM Technical Disclosure Bulletin, Spiral Direct Access Storage Device Format for Non–Stop Multimedia Data Transfers, vol. 37, No. 8, Aug. 1994, pp. 7–8.

Electical Engineering Times, Rich Boyd–Merritt, Video–On–Demand Battle Brewing, Oct. 4, 1993, pp. 113–114.

Electrical Engineering Times, Rich Boyd–Merritt, Redesigned Disk Drives Go To The Movies, Jan. 17, 1994, pp. 37, 39–40, 53.

P. Lougher et al., "The Impact of Digital Audio and Video on High–Speed Storage," *Thirteenth IEEE Symosium on Mass Storage Systems*, 1994, pp. 84–89.

W. D. Sincoskie, System Architecture for a Large Scale Video on Demand Service, *Computer Networks and ISDN Systems*, vol. 22, pp. 155–162 (1991).

H. Taylor et al., "The Magic Video–on–Demand Server and Real–Time Simulation System," *IEEE Parallel & Distributed Technology*, pp. 40–51 (1995).

* cited by examiner

| ROWS | COLUMNS | | | | | | | | | | |
|---|---|---|---|---|---|---|---|---|---|---|---|
| | C1 | C2 | C3 | C4 | C5 | C6 | C7 | C8 | C9 | C119 | C120 |
| R1 | A1 | A61 | A112 | A181 | A241 | A301 | A361 | A421 | ... | A7081 | A7141 |
| R2 | A2 | A62 | A122 | A182 | A242 | A302 | A362 | A422 | ... | A7082 | A7142 |
| R3 | A3 | A63 | A123 | A183 | A243 | A303 | A363 | A423 | ... | A7083 | A7143 |
| R4 | A4 | A64 | A124 | A184 | A244 | A304 | A364 | A424 | ... | A7084 | A7144 |
| R5 | A5 | A65 | A125 | A185 | A245 | A305 | A365 | A425 | ... | A7085 | A7145 |
| R6 | A6 | A66 | A126 | A186 | A246 | A306 | A366 | A426 | ... | A7086 | A7146 |
| R7 | A7 | A67 | A127 | A187 | A247 | A307 | A367 | A427 | ... | A7087 | A7147 |
| R8 | A8 | A68 | A128 | A188 | A248 | A308 | A368 | A428 | ... | A7088 | A7148 |
| R9 | A9 | A69 | A129 | A189 | A249 | A309 | A369 | A429 | ... | A7089 | A7149 |
| R10 | A10 | A70 | A130 | A190 | A250 | A310 | A370 | A430 | ... | A7090 | A7150 |
| : | : | : | : | : | : | : | : | : | : | : | : |
| R59 | A59 | A119 | A179 | A239 | A299 | A359 | A419 | A479 | ... | A7139 | A7199 |
| R60 | A60 | A120 | A180 | A240 | A300 | A360 | A420 | A480 | ... | A7140 | A7200 |

FIG. 7

| ROWS | COLUMNS | | | | |
|---|---|---|---|---|---|
| | C1 | C2 | C3 | ...... | C180 |
| R1 | A1 | A21 | A41 | ...... | |
| R2 | A5 | A25 | A45 | ...... | BLOCK-A |
| R3 | A9 | A29 | A49 | ...... | |
| R4 | A13 | A33 | A53 | ...... | |
| R5 | A17 | A37 | A57 | ...... | A3597 |
| R6 | A2 | A22 | A42 | ...... | |
| R7 | A6 | A26 | A46 | ...... | BLOCK-B |
| R8 | A10 | A30 | A50 | ...... | |
| R9 | A14 | A34 | A54 | ...... | |
| R10 | A18 | A38 | A58 | ...... | A3598 |
| R11 | A3 | A23 | A43 | ...... | |
| R12 | A7 | A27 | A47 | ...... | BLOCK-C |
| R13 | A11 | A31 | A51 | ...... | |
| R14 | A15 | A35 | A55 | ...... | |
| R15 | A19 | A39 | A59 | ...... | A3599 |
| R16 | A4 | A24 | A44 | ...... | |
| R17 | A8 | A28 | A48 | ...... | BLOCK-D |
| R18 | A12 | A32 | A52 | ...... | |
| R19 | A16 | A36 | A56 | ...... | |
| R20 | A20 | A40 | A60 | ...... | A3600 |

FIG. 9

| PACKET # | RUN | SEGMENTS | | | |
|---|---|---|---|---|---|
| 1 | Run 1 | A1 | A5 | A2 | A6 | A3 |
| 2 | Run 1.5 | A7 | A4 | A8 | A9 | A13 |
| 3 | Run 2 | A10 | A14 | A11 | A15 | A12 |
| 4 | Run 3 | A17 | A18 | A19 | A16 | A20 |
| 5 | Run 4 | A21 | A22 | A23 | A24 | |
| 6 | Run 5 | A25 | A26 | A27 | A28 | |
| 7 | Run 6 | A29 | A30 | A31 | A32 | |
| 8 | Run 7 | A33 | A34 | A35 | A36 | |
| 9 | Run 8 | A37 | A38 | A39 | A40 | |
| 10 | Run 9 | A41 | A42 | A43 | A44 | |
| 11 | Run 10 | A45 | A46 | A47 | A48 | |
| 12 | Run 11 | A49 | A50 | A51 | A52 | |

FIG. 10

INBOUND SPIRAL: LOWER DISK SURFACE

| | RUN 1 | RUN 2 | RUN 3 | RUN 4 | RUN 5 | RUN 6 | RUN 7 | RUN 8 | RUN 9 | RUN 10 | RUN 11 | RUN N |
|---|---|---|---|---|---|---|---|---|---|---|---|---|
| LOC-1 | WR A1 | S A1 | S A1 | S A1 | S A1 | W A21 | S A21 | S A21 | S A21 | S A21 | S A21 | . . . |
| LOC-2 | W A3 | R A3 | S A3 | S A3 | S A3 | S A3 | W A23 | S A23 | S A23 | S A23 | S A23 | . . . |
| LOC-3 | -- | W A5 | R A5 | S A5 | S A5 | S A5 | S A5 | W A25 | S A25 | S A25 | S A25 | . . . |
| LOC-4 | -- | W A7 | S A7 | R A7 | S A7 | S A7 | S A7 | S A7 | W A27 | S A27 | S A27 | . . . |
| LOC-5 | -- | -- | W A9 | S A9 | R A9 | S A9 | S A9 | S A9 | S A9 | W A29 | S A29 | . . . |
| LOC-6 | -- | -- | W A11 | S A11 | S A11 | R A11 | S A11 | S A11 | S A11 | S A11 | W A31 | . . . |
| LOC-7 | -- | -- | -- | W A13 | S A13 | S A13 | R A13 | S A13 | S A13 | S A13 | S A13 | . . . |
| LOC-8 | -- | -- | -- | W A15 | S A15 | S A15 | S A15 | R A15 | S A15 | S A15 | S A15 | . . . |
| LOC-9 | -- | -- | -- | -- | W A17 | S A17 | S A17 | S A17 | R A17 | S A17 | S A17 | . . . |
| LOC-10 | -- | -- | -- | -- | W A19 | S A19 | S A19 | S A19 | S A19 | R A19 | S A19 | . . . |

FIG. 18A

| | OUTBOUND SPIRAL: UPPER DISK SURFACE | | | | | | | | | | | |
|---|---|---|---|---|---|---|---|---|---|---|---|---|
| LOC-11 | WR A2 | S A2 | S A2 | S A2 | S A2 | W A22 | S A22 | S A22 | S A22 | S A22 | S A22 | . |
| LOC-12 | W A4 | R A4 | S A4 | S A4 | S A4 | S A24 | S A24 | S A24 | S A24 | S A24 | S A24 | . |
| LOC-13 | -- | W A6 | W A6 | S A6 | S A6 | S A6 | W A26 | S A26 | S A26 | S A26 | S A26 | . |
| LOC-14 | -- | W A8 | R A8 | S A8 | S A8 | S A8 | S A8 | W A28 | S A28 | S A28 | S A28 | . |
| LOC-15 | -- | -- | S A10 | W A10 | R A10 | S A10 | S A10 | S A10 | W A30 | S A30 | S A30 | . |
| LOC-16 | -- | -- | S A12 | S A12 | S A12 | R A12 | S A12 | S A12 | S A12 | W A32 | S A12 | . |
| LOC-17 | -- | -- | -- | W A14 | S A14 | S A14 | R A14 | S A14 | S A14 | S A14 | S A14 | . |
| LOC-18 | -- | -- | -- | W A16 | S A16 | S A16 | S A16 | R A16 | S A16 | S A16 | S A16 | . |
| LOC-19 | -- | -- | -- | -- | W A18 | S A18 | S A18 | S A18 | R A18 | S A18 | S A18 | . |
| LOC-20 | -- | -- | -- | -- | W A20 | S A20 | S A20 | S A20 | S A20 | R A20 | S A20 | . |

FIG. 18B

SYMBOLS:
W = Write Operation (Update-in-place)
R = Read Operation (Movie Time)
S = Skip

|  | RUN 1 | RUN 2 | RUN 3 | RUN 4 | RUN 5 | RUN 6 | RUN 7 | RUN 8 | RUN 9 | RUN 10 | RUN 11 | RUN N |
|---|---|---|---|---|---|---|---|---|---|---|---|---|
| LOC-1 | WR A1 | S A1 | S A1 | W A21 | S A21 | R A21 | S A21 | S A21 | R A41 | S A41 | R A41 | ... |
| LOC-2 | W A5 | R A5 | S A5 | S A5 | W A25 | S A25 | R A25 | S A25 | S A25 | S A45 | S A45 | ... |
| LOC-3 | -- | W A9 | R A9 | S A9 | S A9 | W A29 | S A29 | R A29 | S A29 | S A29 | W A49 | ... |
| LOC-4 | -- | W A13 | S A13 | R A13 | S A13 | S A13 | W A33 | S A33 | R A33 | S A33 | S A33 | ... |
| LOC-5 | -- | -- | W A17 | S A17 | R A17 | S A17 | S A17 | W A37 | S A37 | R A37 | S A37 | ... |
| LOC-6 | WR A2 | S A2 | S A2 | W A22 | S A22 | R A22 | S A22 | S A22 | W A42 | S A42 | R A42 | ... |
| LOC-7 | W A6 | R A6 | S A6 | S A6 | W A26 | S A26 | R A26 | S A26 | S A26 | W A46 | S A46 | ... |
| LOC-8 | -- | W A10 | R A10 | S A10 | S A10 | W A30 | S A30 | R A30 | S A30 | S A30 | W A50 | ... |
| LOC-9 | -- | W A14 | S A14 | R A14 | S A14 | S A14 | W A34 | S A34 | R A34 | S A34 | S A34 | ... |
| LOC-10 | -- | -- | W A18 | S A18 | R A18 | S A18 | S A18 | W A38 | S A38 | R A38 | S A38 | ... |

| | | | | | | | | | | | | | |
|---|---|---|---|---|---|---|---|---|---|---|---|---|---|
| LOC-11 | WR A3 | S A3 | S A3 | W A23 | S A23 | S A23 | S A23 | R A23 | S A23 | W A43 | S A43 | R A43 | ... |
| LOC-12 | W A7 | R A7 | S A7 | S A7 | R A27 | S A27 | S A27 | S A27 | W A27 | S A47 | W A47 | S A47 | ... |
| LOC-13 | -- | -- | W A11 | S A11 | S A11 | S A11 | R A31 | S A31 | S A31 | W A51 | S A31 | W A51 | ... |
| LOC-14 | -- | -- | W A15 | S A15 | S A15 | S A15 | S A35 | W A35 | S A35 | S A35 | S A35 | S A35 | ... |
| LOC-15 | -- | -- | -- | W A19 | R A19 | S A19 | S A19 | W A39 | S A39 | R A39 | S A39 | S A39 | ... |
| LOC-16 | WR A4 | S A4 | S A4 | W A24 | S A24 | S A24 | R A24 | S A24 | W A44 | R A44 | S A44 | R A44 | ... |
| LOC-17 | W A8 | R A8 | S A8 | S A8 | R A28 | S A28 | S A28 | W A28 | S A48 | W A48 | S A48 | S A48 | ... |
| LOC-18 | -- | -- | W A12 | S A12 | R A12 | S A12 | W A32 | S A32 | R A32 | S A32 | W A52 | S A32 | ... |
| LOC-19 | -- | -- | W A16 | R A16 | S A16 | S A16 | S A36 | W A36 | R A36 | S A36 | S A36 | S A36 | ... |
| LOC-20 | -- | -- | -- | W A20 | S A20 | S A20 | R A20 | S A20 | S A40 | R A40 | S A40 | S A40 | ... |

SYMBOLS:
W = Write Operation (Update-in-place)
R = Read Operation (Movie Time)
S = Skip

MULTIMEDIA DIRECT ACCESS STORAGE DEVICE AND FORMATTING METHOD

This application is a divisional of application Ser. No. 09/035,624 filed Mar. 5, 1998 now U.S. Pat. No. 6,208,804, which is a continuation of application Ser. No. 08/866,377, filed May 30, 1997, now U.S. Pat. No. 5,751,883 which is a continuation of application Ser. No. 08/478,328 abandoned, filed Jun. 7, 1995 now abandoned. The applications are incorporated herein by reference.

RELATED INVENTIONS

The present invention is related to:

co-pending U.S. patent application Ser. No. 08/288,525, filed on Aug. 8, 1994, which is entitled "Apparatus and Method for Providing Multimedia Data;"

co-pending U.S. patent application Ser. No. 08/488,329, filed on Jun. 7, 1995, which is entitled "Media-on-Demand Communication Method and Apparatus;"

co-pending U.S. patent application Ser. No. 08/473,328, filed on Jun. 7, 1995, which is entitled "Multimedia Control System and Method for Controlling Multimedia Program Presentation;" and co-pending U.S. patent application Ser. No. 08/472,506, filed on Jun. 7, 1995, which is entitled "Multimedia Server System and Method for Communicating Multimedia Information," all which are assigned to the assignee of the present invention.

FIELD OF THE INVENTION

The present invention relates generally to data storage systems, and, more particularly, to a direct access storage device and formatting method for storing multimedia information.

BACKGROUND OF THE INVENTION

Advancements in communications technology and increased consumer sophistication have challenged the distributors of multimedia programming to provide the subscribing public with entertainment services more convenient and accessible than those traditionally made available over cable television and telephone systems. An improving communications infrastructure has resulted in a proliferation of pay-per-view media services in many of the larger broadcast markets. Most pay-per-view systems permit the consumer to choose from a relatively small number of motion picture selections for home viewing, with the selected programs generally being presented only at pre-scheduled viewing times.

A number of on-demand video services have been developed that permit the consumer to order desired programs for home viewing through the household telephone line. For example, U.S. Pat. No. 5,247,347, assigned to Bell Atlantic Network Services, discloses a sophisticated video-on-demand telephone service that provides consumer ordered video programming to a plurality of households through use of a public switched telephone network (PSTN). An extensive discussion regarding the inherent deficiencies of communicating video and other multimedia signals over standard bandwidth limited analog telephone lines is provided in the '347 patent.

The video-on-demand system disclosed in the '347 patent and other conventional telephony-based multimedia services fail to satisfactorily address the adverse impact to home communications during periods of prolonged program viewing. For example, a typical theatrical motion picture can tie up the household telephone line for over two hours. Further, such sophisticated telephony-based multimedia services generally require procurement of expensive communications and diagnostic equipment by the pay-per-view provider to ensure a reasonable level of signal quality and system reliability. These and other related operating expenses, however, are typically passed on to the consumer.

Importantly, conventional multimedia services fail to provide media presentation control features now expected by the sophisticated consumer after enjoying more than a decade of home entertainment through the use of a video cassette recorder (VCR). Functions such as fast forward, reverse, and pause, for example, are standard presentation control functions now provided by all or most home VCRs, and are typically effectuated by use of an infrared (IR) remote control handset. The limited transmission bandwidth of household telephone lines, as well as common cable television channels, generally precludes accommodation of full VCR-type control functionality when employed to support a conventional multimedia communication system adapted to provide on-demand service to a large number of subscribing customers.

In FIG. 1, for example, there is illustrated a generalized block diagram of a conventional pay-per-view communication service for providing video program distribution to a plurality of households over a public switched telephone network. Movies are typically stored on one or more media servers 10, each of which is multiplexed to the PSTN 16. A telephonic ordering system 14 is generally coupled to the PSTN 16, and provides a means for accepting a pay-per-view order from a customer or user 20 over the telephone. Upon verifying the account status of a user 20, the media server 10 typically transmits the ordered movie or program to a decoder box 22 coupled to the customer's telephone line 18. The transmitted program is continuously decoded by the decoder box 22 to provide continuous presentation of the selected program on the customer's television 24. Limitations in the transmission bandwidth of the telephone lines 18, as well as limitations in the switching capability of the PSTN 16, generally preclude the use of a PSTN 16 to support a media communication system that provides high quality, full-motion video signal transmission with full VCR-type control functionality. Such limitations similarly impact a conventional pay-per-view video communication service that utilizes cable television lines.

Other video communication systems, such as that disclosed in U.S. Pat. No. 4,949,187, provide a local disk storage system for storing a digitized multimedia program received from a central archive library. After establishing a telephonic link with the central server 10 over a PSTN telephone network, a selected digitized movie is downloaded in its entirety into the disk storage system incorporated into the terminal unit disclosed in the '187 patent. This and other home communication systems that employ disk storage systems to provide local storage of a selected multimedia program generally require downloading of the entire multimedia program prior to viewing the program on the subscriber's television.

Depending on the bandwidth of the telephone line and source transmission rate, the downloading procedure may delay viewing of a selected movie for an appreciable amount of time. Very-high capacity data storage systems are generally required to locally store an entire feature-length movie. Such local data storage systems must generally be configured to allocate several gigabytes of memory for storing a typical movie in a compressed form, and several hundred gigabytes of memory for storing a typical non-compressed movie.

The excessively large memory requirement of these and other conventional local data storage systems employed to store video programming in accordance with a conventional media communication methodology generally results in a commercial product that is prohibitively expensive for the average consumer. Also, such systems cannot provide instantaneous viewing of a selected multimedia program immediately upon receiving the transmission of the program signals from the server 10. Moreover, VCR-type control functionality can only be provided, if at all, after downloading the entire multimedia program onto the disk storage system.

There exists a need in the communications industry for a direct access storage device adapted to store multimedia information received from a media-on-demand communication server system, and a method for efficiently formatting multimedia information on one or more data storage disks disposed in the direct access storage device. There exists a further need for a direct access storage system adapted to provide local VCR-type control over the presentation of a selected multimedia program at a minimal cost to the consumer. The present invention fulfills these and other needs.

SUMMARY OF THE INVENTION

The present invention is a multimedia direct access storage device and a method for transferring source program signals representative of a multimedia program to and from the direct access storage device. A multimedia program is transmitted from a multimedia server as a custom ordered series of discrete, digitally compressed program segments and received by the multimedia direct access storage device, which buffers the compressed program segments for subsequent presentation on a local display monitor. The multimedia direct access storage device is preferably incorporated as a component of a local set-top control system for buffering a predetermined number of compressed program segments received from the multimedia server, some of which may be non-sequentially ordered and others of which may be sequentially ordered. A novel formatting methodology provides for the sequential presentation of the program segments asynchronously distributed on one or more data storage disks disposed in the direct access storage device. A user-definable presentation control window for performing local VCR-type presentation control functions for the portion of a multimedia program buffered in the direct access storage device is also provided through the novel formatting methodology. The novel formatting methodology also provides concurrent presentation and buffering of program segments received from the multimedia server for on-demand viewing of a selected multimedia program.

BRIEF DESCRIPTION OF THE DRAWINGS

FIG. 7 is an illustration of an initially synchronously ordered series of source program segments representative of a two-hour multimedia program arranged as a 60×120 matrix of 7,200 discrete one-second source program segments;

FIG. 9 is an illustration of 3,600 discrete two-second source program segments representative of a two-hour multimedia program arranged in a 20×180 customized matrix comprising four 5×180 sub-matrices or blocks, with each of the four blocks containing 900 asynchronously ordered discrete two-second compressed source program segments;

FIG. 10 is a depiction of the asynchronously ordered source video segments contained in the first twelve segment packets transmitted by a novel multimedia server during successive transmission windows;

FIG. 18a–FIG. 18b are a depiction of twenty data storage locations defining a twenty second presentation control window disposed on a lower and an upper surface of a data storage disk, and a novel method for writing and reading discrete source program segments to and from the ten storage locations disposed on each of the lower and upper disk surfaces;

FIG. 20a–FIG. 20b are depiction of forty data storage locations disposed on a lower and an upper surface of a data storage disk defining a forty second presentation control window, and a novel method for writing and reading discrete source program segments to and from the ten storage locations organized into two segment blocks disposed on each of the lower and upper disk surfaces;

DETAILED DESCRIPTION OF THE PREFERRED EMBODIMENTS

The present invention, as previously indicated, relates to a multimedia direct access storage device for providing local storage and VCR-type control of the presentation of selected multimedia programs received in a customized format from a remote multimedia server, preferably on an on-demand, pay-per-view basis. The present application describes the entire multimedia communication system and process for providing multimedia program distribution from a remote multimedia server to a plurality of local set-top control systems which preferably include multimedia direct access storage devices. As such, there are described in the present application various features and functions of the multimedia communication system which are not the subject of the presently claimed subject matter, but are the subject of inventions claimed in co-pending applications filed concurrently with this application. The description of these features and functions are included in the present application for purposes of completeness, and to permit a full appreciation of the advantages and features of an multimedia set-top control system as disclosed herein.

Multimedia Communication System

Figure 1:
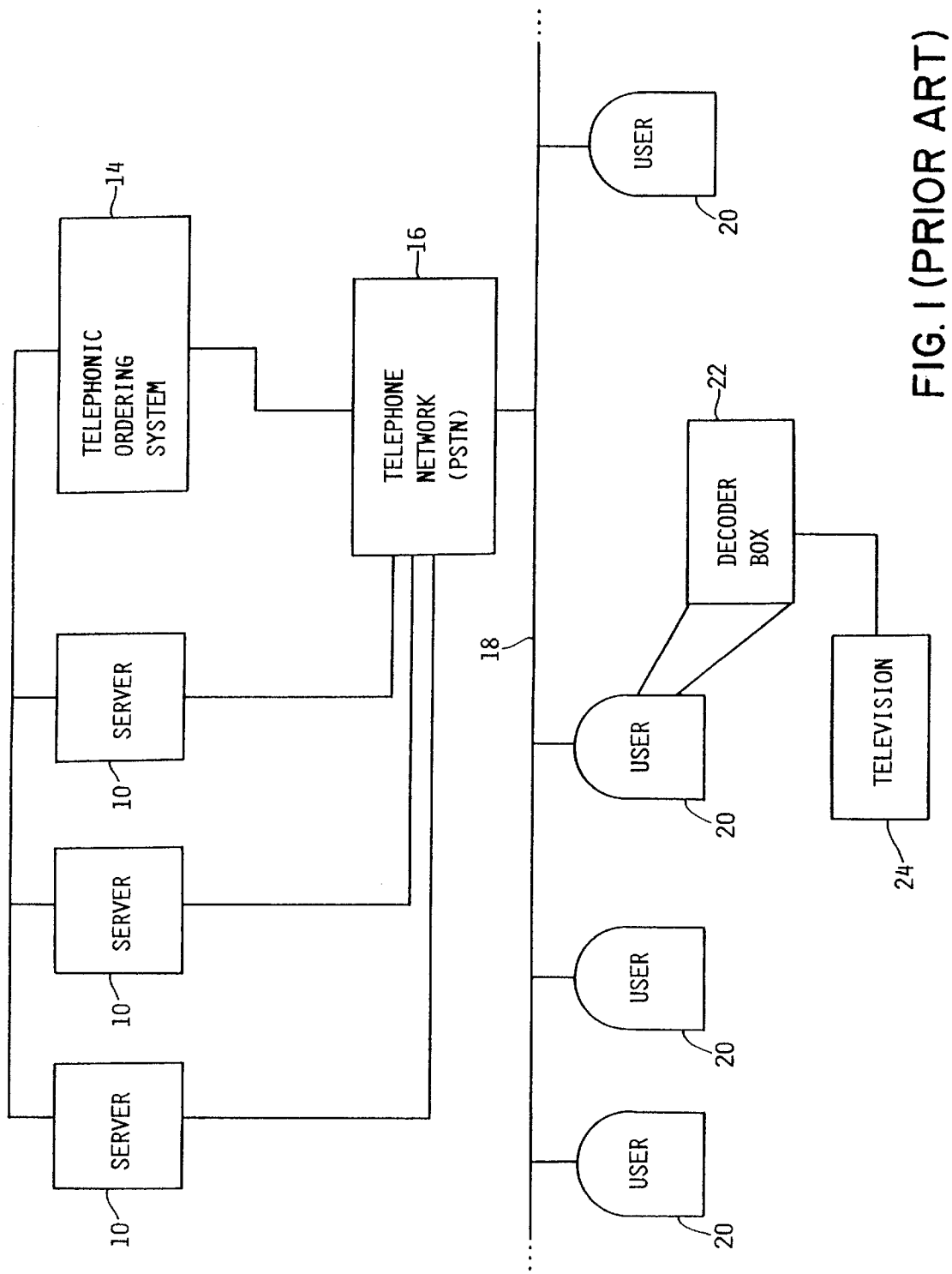
FIG. 1 is a block diagram of a conventional communication system for distributing selected video programs to a plurality of users.
Figure 2:
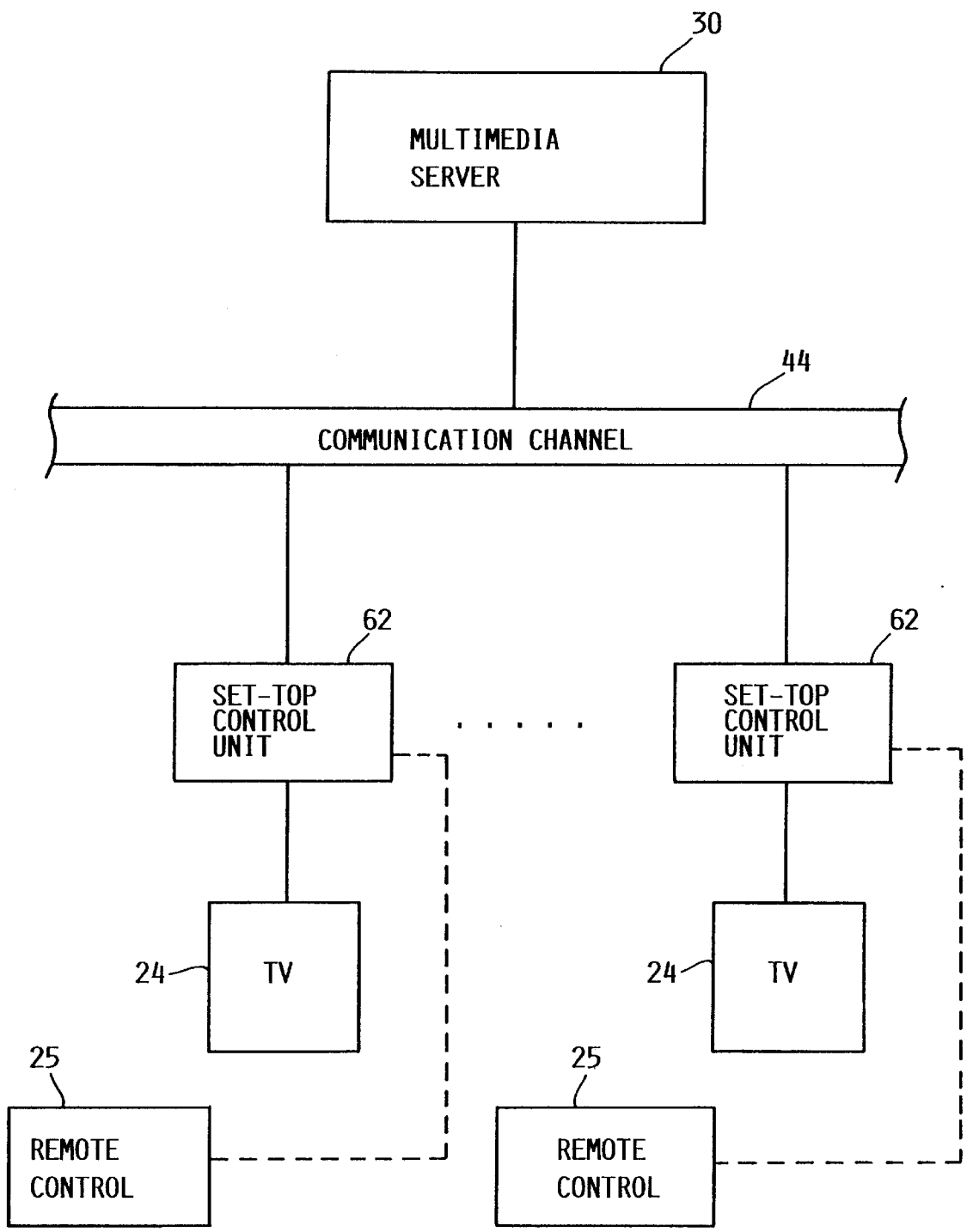
FIG. 2 is a generalized block diagram of a novel multimedia communication system for distributing multimedia programs concurrently to a plurality of subscriber set-top control systems preferably on an on-demand, pay-per-view basis.

Referring now to the drawings, and more particularly to FIG. 2, there is shown a system block diagram of a multimedia communication system employing a novel multimedia server 30 configured to communicate multimedia programs to a plurality of set-top control systems 62 concurrently over a communication channel 44. In one embodiment, the multimedia server 30 transmits a video program or other visual or audio presentation as a customized series of compressed digital source program segments to a subscribing customer's set-top control system 62 on an on-demand, pay-per-view basis. The program segments may be representative of video, animation, photographic, audio, textual, graphical, and other types information. A direct access storage device (DASD) is preferably coupled to the local set-top control system 62 for buffering a portion or all of the multimedia program received from the multimedia server 30.

A novel DASD formatting methodology is employed to buffer the customized series of compressed digital source program segments representative of a portion of the multimedia program to provide a subscriber with local VCR-type control of the presentation of the multimedia program portion buffered on the DASD, including presentation control functions such as fast forward, reverse, and pause. The multimedia program may, for example, be transmitted from the local set-top control system 62 to a subscriber's television 24, home stereo, or computer system by use of a standard household transmission line or pair of infrared transceivers. In one embodiment, the multimedia server 30 customizes the order of the source program segments in response to formatting and configuration parameters associated with the configuration and control functions of a subscriber's unique local set-top control system 62.

The novel formatting methodology provides for a significant decrease in the complexity and cost of operating and maintaining a central multimedia server system 30 adapted for distributing media-on-demand programming to a plurality of set-top control systems 62. It is noted that a set-top control system 62 may be located at a household, a business location, such as a restaurant or bar, or other private or public location. VCR-type presentation control functionality, including rewind, fast forward, pause, and other presentation modes, are locally coordinated directly by the set-top control system 62. By providing local control over the presentation of a multimedia program, the central multimedia server 30 need not be configured to effectuate VCR-type control functions typically desired by the subscribing customer.

Those skilled in the art will readily appreciate the significant difficulty of simultaneously servicing VCR-type presentation control function requests at a central media distribution site during the communication of user-selected programs transmitted concurrently to a plurality of customers on an on-demand, real-time basis. Providing the subscribing customer local control of a media presentation directly through the set-top control system 62 provides for a significant decrease in the bandwidth of the communication channel 44 and the amount of multimedia server 30 processing overhead that would otherwise be required to service VCR-type presentation control function requests from a plurality of pay-per-view customers.

A user of the set-top control system 62 preferably communicates with the multimedia server 62 over an existing communication channel 44, such as a cable television connection, for example. It is understood that a plurality of subscribing customers can concurrently communicate with the multimedia server 30 by use of the set-top control system 62, which may be situated proximate to or remotely from a television 24 or entertainment center within the subscribing customer's home or business establishment. A communications interface preferably couples the set-top control system 62 to a cable line or other communication line interfacing with the communication channel 44. The communications interface preferably includes a transceiver capable of both receiving and transmitting multimedia information, control, and other electrical signals communicated over the communication channel 44. Alternatively, the communications interface may include a separate receiver and transmitter for effectuating communication over the communication channel 44.

The multimedia information transmitted from the multimedia server 30 to a plurality of set-top control systems 62 is preferably transmitted in a digitally compressed format. A compression algorithm standard suitable for use by the novel media-on-demand communication system is one developed by the Moving Pictures Experts Group, and is generally referred to as an MPEG coding standard. The MPEG-1 standard (ISO/IEC IS 11172-1), for example, defines a format for compressed digital video which supports data rates of approximately 1.2 to 1.5 megabits per second (Mbps), resolutions of about 352 pixels (picture elements) horizontally to about 288 lines vertically, picture rates of about 24 to 30 pictures per second, and several VCR-like viewing functions, such as normal forward, play, slow forward, fast forward, fast reverse, and freeze. MPEG-1 coding provides compression ratios typically on the order of 100:1 to 150:1.

A new developing MPEG standard, referred to in the art as MPEG-2 (ISO/IEC IS 11172-2), is expected to support data rates on the order of approximately 2 to 15 Mbps over cable, satellite, and other broadcast channels. In addition to a video signal stream and an audio signal stream, MPEG-2 specifies an associated data signal stream that, together with the video and audio signal streams, comprise the multiplexed program bitstream. MPEG-2 will additionally support both non-interlaced and interlaced video signal formats, increased image quality over that provided by MPEG-1, multiple picture aspect ratios, and a number of other advanced features, including features to support High Definition Television (HDTV). It is noted that the MPEG-1 audio compression standard (ISO/IEC IS 11172-3) and developing MPEG-2 audio compression standard set forth audio compression specifications that are suitable for coding audio programs processed by the multimedia sever 30. It is to be understood that coding standards other than those conforming to one or more of the above-described MPEG standards may be employed to facilitate communication of video, audio, and other multimedia program signals between the multimedia server 30 and a plurality of customer set-top control systems 62 without departing from the scope and spirit of the present invention. For example, program signals transmitted over the communication channel 44 may be of a format other than a compressed digital format.

For purposes of explanation, the advantages and features of the disclosed media-on-demand communication method and apparatus will be discussed generally with reference to full-motion video. Full-motion video is useful for this purpose since video is generally a composite media comprising both video and audio components, and may also include other information components, such as subtitle or hearing-impaired information. Also, coding of full-motion video in accordance with an MPEG specification produces a multiplexed program signal stream that is well-suited for illustrating the advantages of the novel media-on-demand communication method and apparatus. It is to be understood that the references hereinbelow to video media are for purposes of explanation only, and do not represent limitations on the type and nature of multimedia programs and information stored on and processed by the multimedia server 30.

Multimedia Server

Figure 3:
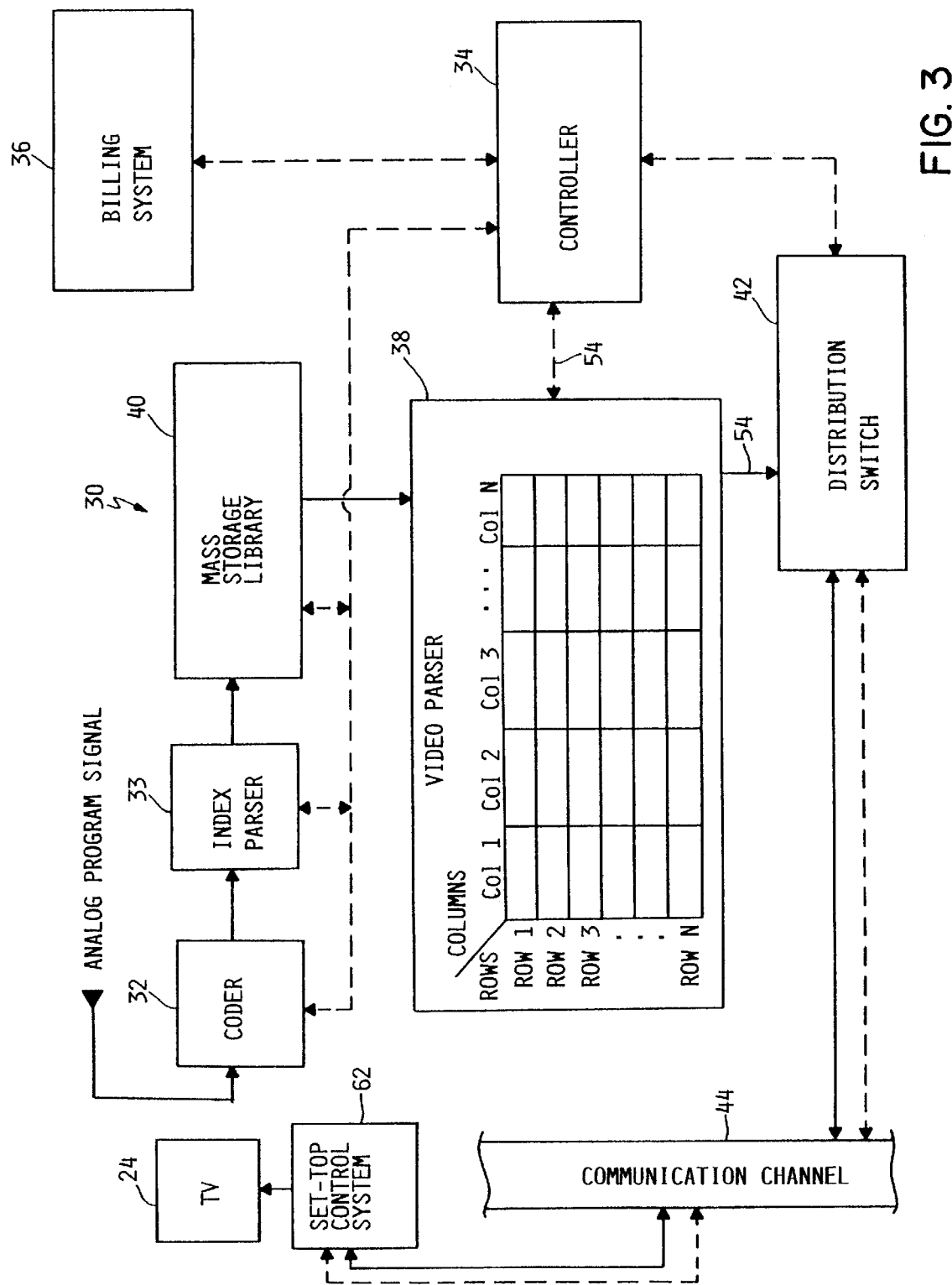
FIG. 3 is a generalized block diagram of a novel multimedia server for communicating a synchronous, asynchronous, or combined synchronous/asynchronous series of source program segments representative of a selected multimedia program to a plurality of subscriber set-top control systems preferably on an on-demand, pay-per-view basis.
Figure 4:
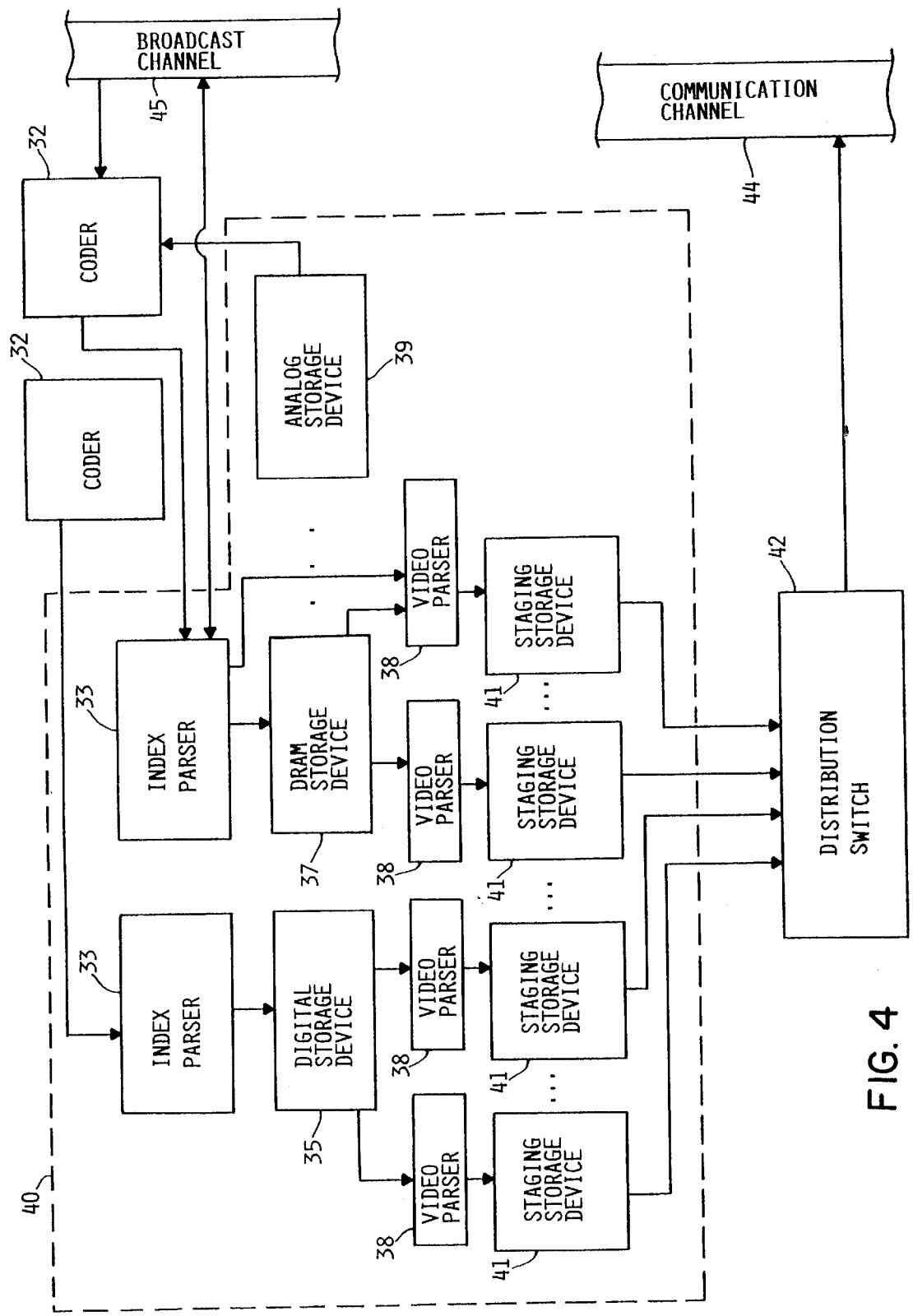
FIG. 4 is a generalized block diagram of a mass storage library portion of a novel multimedia server.

Turning now to FIGS. 3–4, there is illustrated an embodiment of a novel multimedia server 30 for storing and processing a variety of multimedia programs, and for distributing selected multimedia programs concurrently to a plurality of end-users, preferably on an on-demand, pay-per-view basis. The multimedia programs are preferably stored in a mass storage library 40 comprising one or more mass storage devices which, individually or cumulatively, include non-volatile memory devices capable of storing mass amounts of information, typically on the order of terabytes. The multimedia server 30 may include storage and distribution devices situated at a central media distribution site or may include a number of storage and distribution resources provided at a plurality of sites, with the remotely located resources communicating over a wide area network (WAN), for example.

Multimedia information is preferably stored in a compressed digital format on one or more digital storage devices 35. Suitable digital storage devices 35 include, for example, digital direct access storage devices (DASD) and digital audio tape (DAT) systems. In one embodiment, a plurality of digital DASDs may be configured as an array of DASDs operating in accordance with a known RAID (Redundant Array of Inexpensive Disks) protocol. Analog versions of multimedia programs may be stored on one or more analog storage devices 39, such as analog video tape systems and analog audio systems, for example. The mass storage library 40 may further include optical data storage systems or CD-ROM systems. It is to be understood that the mass storage library 40 may be configured with a variety of storage and processing devices covering a diverse range of technologies, and is not limited to those depicted in FIG. 4. In one embodiment, for example, the mass storage library 40 includes one or more Dynamic Random Address Memory (DRAM) storage devices 37 employed for storing multimedia information in two-dimensional or three-dimensional storage array configurations. In accordance with one embodiment, one or more DRAM storage devices 37 are employed to provide mass storage of a plurality of popular or frequently requested multimedia programs. In accordance with a novel media server formatting architecture and methodology disclosed hereinbelow, a DRAM storage device 37 advantageously provides for fast access to popular multimedia programs and high-speed asynchronous transfer mode distribution of popular multimedia programs to a plurality of end-users.

In addition to pre-recorded or pre-produced multimedia programs, the mass storage library 40 preferably communicates with a number of external communication channels for receiving real-time broadcast signals representative of programming made available over local, national, and international broadcast networks. Accordingly, a subscribing customer may request from a multiplicity of pre-produced and real-time multimedia programming selections.

In a preferred embodiment, multimedia programs stored in the mass storage library 40 are preferably initially converted from an analog format into a digital format, and then compressed or coded in accordance with an established coding algorithm. The compressed digital program segments are preferably structured in the form of a multiplexed program bitstream. A typical multiplexed bitstream comprises a video signal stream portion, an audio signal stream portion, and may further include other information signal stream portions. A multimedia program ordered by a subscribing customer is preferably transmitted to the customer location as a customized, multiplexed program bitstream representative of the selected multimedia program, preferably over an existing television channel, cable or optic television channel, digital or fiber optic telephone line, or satellite communication channel 44, for example. The discrete source program segments that comprise the subscriber-selected multimedia program bitstreams are preferably transmitted as packets of segments in an asynchronous manner over the communication channel 44 to a plurality of target set-top control system 62.

Figure 5:
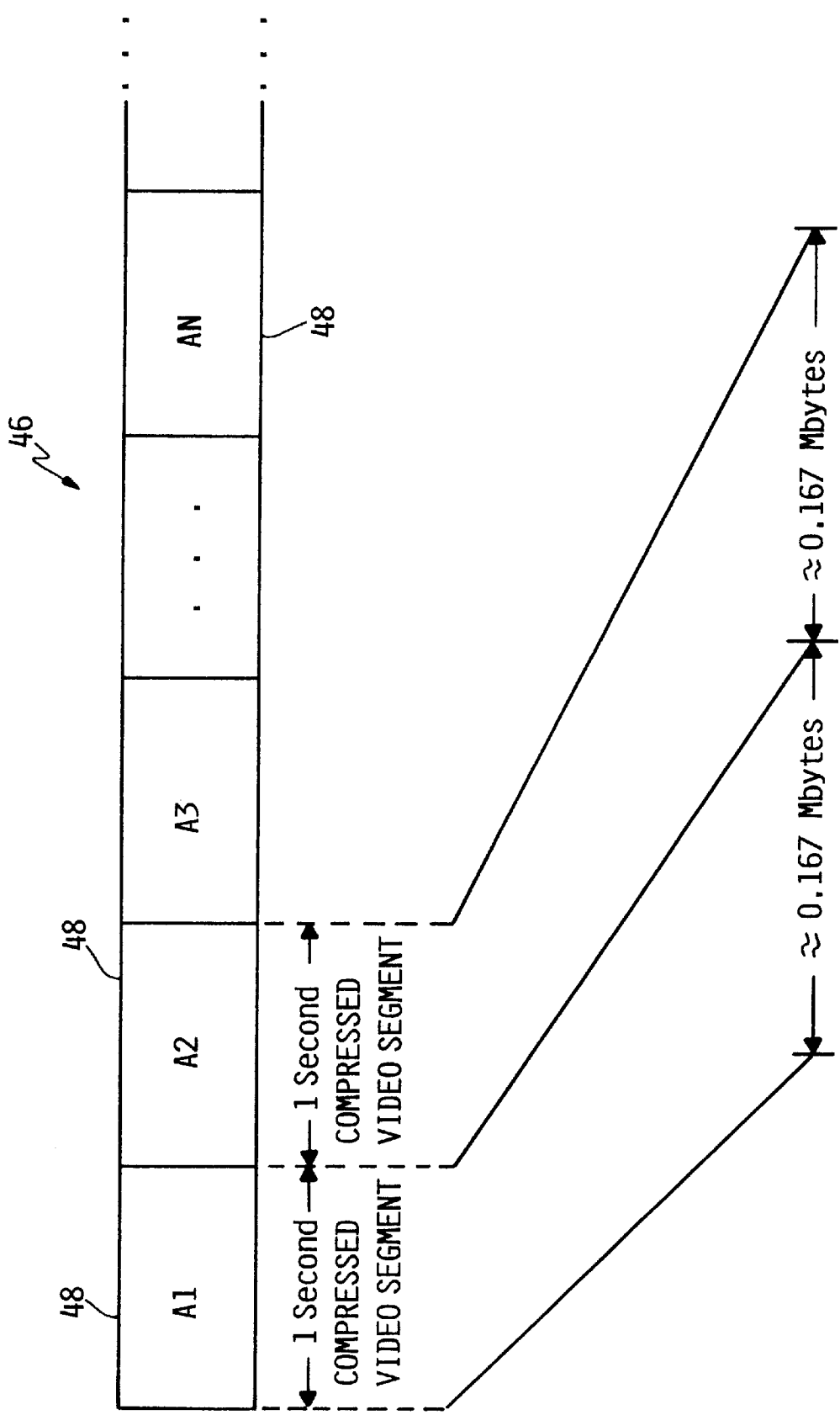
FIG. 5 is an illustration of a partial series of synchronous compressed source program segments, with each discrete program segment being representative of a predetermined time portion of a multimedia program.

As illustrated in FIGS. 3–5, an analog video signal, typically comprising a video signal portion and an audio signal portion, is preferably converted to a digital format and compressed by a coder 32 in accordance with an established coding algorithm. The compressed digitized program bitstream is then segmented or divided into a plurality of discrete video source program segments 48 by an index parser 33. Each discrete compressed digital video segment 48 is preferably representative of a predetermined amount of non-compressed, full-motion video. In one embodiment, one second of non-compressed, full-motion video is represented by each of the compressed video segments 48. In another embodiment, two seconds of non-compressed, full-motion video is represented by each of the compressed video segments 48. It is to be understood that each of the source video segments 48 may be representative of a full-motion video portion greater than or less than one second. Alternatively, a varying duration of non-compressed, full-motion video may be represented by each of the compressed video segments 48.

Referring now to FIG. 4 in greater detail, each of the mass storage devices 35, 37, and 39 may be coupled to a corresponding index parser 33. Each of the index parsers 33, in turn, are preferably coupled to a corresponding coder 32. It is noted that the coders 32 illustrated in FIG. 4 are shown as being external to the mass storage library 40. The coders 32 may alternatively be incorporated as internal components within the mass storage library 40. In a preferred embodiment, the multimedia programs that are made available in the mass storage library 40 are processed through the coder 32 and index parser 33 only once, and then stored on a mass storage device 35. An individual multimedia program may be stored on a single mass storage device, or, alternatively, stored across a plurality of mass storage devices. When processed by the index parser 33, each of the compressed digital video segments 48 is preferably encoded with a unique segment address. A first video segment 48, for example, may be encoded or tagged with an address identifier of "A1," while the second discrete video segment 48 may be encoded with an address of "A2." As such, each of the discrete source video segments 48 is preferably locatable within the storage device by reference to its unique address. An address table may be employed to provide mapping to physical storage locations associated with a particular virtual or indirect video segment address. Having indexed each of the video segments 48 with a unique address and stored the video segments on a mass storage device, such as a digital storage device 35, reference to specific video segment 48 addresses provides an efficient means for organizing the video segments 48 in a customized manner, and transmitting the video segments 48 to a target set-top control system 62.

As further illustrated in FIG. 4, each of the mass storage devices provided in the mass storage library 40 is preferably coupled to one or more staging storage devices 41. A significant advantage of the novel multimedia server 30 concerns the capability of organizing source video segments 48 in a customized manner for reception by a particular customer's set-top control system 62. A plurality of staging devices 41 permits each storage device, such as digital storage device 35, to concurrently service a plurality of customer requests and organize requested multimedia program in a customized manner. The staging devices 41 may comprise DRAM storage devices, an array of DASDs configured to operate as a RAID system, or other digital storage systems.

As mentioned previously, one or more analog storage devices 39 may be employed to store analog multimedia information. An analog multimedia program, when requested by a subscribing customer, is preferably transferred to the coder 32, coded by the coder 32, indexed in a manner previously discussed with respect to the index parser 33, and preferably transmitted to a staging storage device 41. It is noted that each of the storage devices 35, 37, and 39 may include a corresponding video parser 38 coupled between the storage device and a staging storage device 41. It is to be understood that a single video parser 38 or single index parser 33 may be employed rather than individual parsing devices. Further, the staging devices 41 may be accessible to all of the mass storage devices, and that the distribution of work load between the components comprising the mass storage library 40 may be distributed amongst the various components to optimize the overhead of the multimedia server 30. Further, analog and digital multimedia programming received over a local, national, or international broadcast channel 45 may be respectively directed to a coder 32 or directly to an index parser 33 for processing of real-time multimedia information.

In FIG. 5, there is shown an illustration of a partial series 46 of sequentially ordered one-second compressed video segments 48 provided at the output of the coder 32. It is noted that a sequentially ordered sequence or series of video segments 48 is representative of corresponding consecutively ordered full-motion video portions of a multimedia program. Conversely, a non-sequentially ordered sequence or series of video segments 48 is representative of a corresponding non-sequential or non-consecutively ordered full-motion video portion of a multimedia program. It is to be understood that all or only a portion of the video segments 48 representative of a multimedia program may be organized as a non-sequential series of video segments 48. Further, it may be desirable to organize a predetermined number of video segments 48 as a non-sequential video segment 48 series portion of a multiplexed signal bitstream followed by or, alternatively, preceded by a sequential video segment 48 series portion. In other applications, it may be desireable to produce a multiplexed signal bitstream comprising only sequentially ordered compressed video segments 48.

In a configuration employing an MPEG-1 coder 32, for example, video compression ratios of approximately 100:1 are typically achievable. On average, one minute of full-motion video can be digitally compressed into approximately ten megabytes, corresponding to an average of approximately 5.6 kilobytes per video frame and approximately 0.167 megabytes per second of full-motion video program time at an NTSC (National Television Systems Committee) compliant display rate of thirty frames per second. It is noted that individual one-second compressed movie segments 48 typically vary in terms of size or number of bytes. On average, it has been determined that for an MPEG-1 coded video program, approximately 0.167 megabytes of memory is required to store each of the one-second compressed movie segments 48. In order to store a two-second compressed movie segment 48, for example, 0.334 megabytes of memory would generally be required.

In one embodiment, the coder 32 produces a compressed digital video bitstream of a type conforming to one or more of the MPEG coding standards. A typical video bitstream includes a sequence of discrete video information packs, with each pack including a layer header, a system header, a sequence of information carrying packets, and an end code demarcating the end of each discrete pack. The pack layer header generally contains a pack start code, or sync code, used for synchronization purposes, and a system clock value. The system header generally contains a variety of information, such as system stream identification information, which is used to differentiate the video pack data from other data incorporated into the multiplexed signal stream. Each of the information carrying packets defined within a pack typically contains either encoded audio or encoded video signal stream data. It is noted that the information carrying packets typically include a video packet header, while packets containing audio information typically include an audio packet header. Generally, video signal data corresponding to a plurality of video frames is contained within each video packet, while corresponding audio signal data is contained within an associated audio packet.

In one embodiment, the coder 32 digitally compresses the video and audio information corresponding to a predefined duration of full-motion video, such as one-second of motion video, into each video and corresponding audio pack. By way of example, a one-second portion of full-motion video conforming to an NTSC video format contains thirty frames of motion video. In this example, it will be assumed that each pack contains six video packets. Accordingly, one second of motion video may be represented by five packs, each of which contains six video packets. It is to be understood that the MPEG coding standard, as well as other coding standards, provide for an appreciable amount of flexibility when packetizing multimedia information in a compressed digital format.

Accordingly, the coder 32 preferably cooperates with the index parser 33 to produce a multiplexed signal bitstream at the output of the index parser 33 which includes a plurality of compressed video segments 48, with each segment 48 representing a predefined duration of full-motion video. Additionally, the coder 32 and index parser 33 cooperate to generate a unique index address for each of the discrete video segments 48. The unique address information may be incorporated into the pack layer header or system header portion of each pack or segment. As previously mentioned, the indexed sequential series of compressed video segments 48 is then preferably stored on a suitable mass storage device, such as the digital storage device 35 or DRAM storage device 37 illustrated in FIG. 4. Since each of the discrete video segments 48 contains a unique index address, the video parser 38 effectuates efficient reorganization of a sequential series of stored, compressed video segments 48 into a custom ordered series of video segments 48 by referencing the unique address of specific video segments 48.

Figure 6:
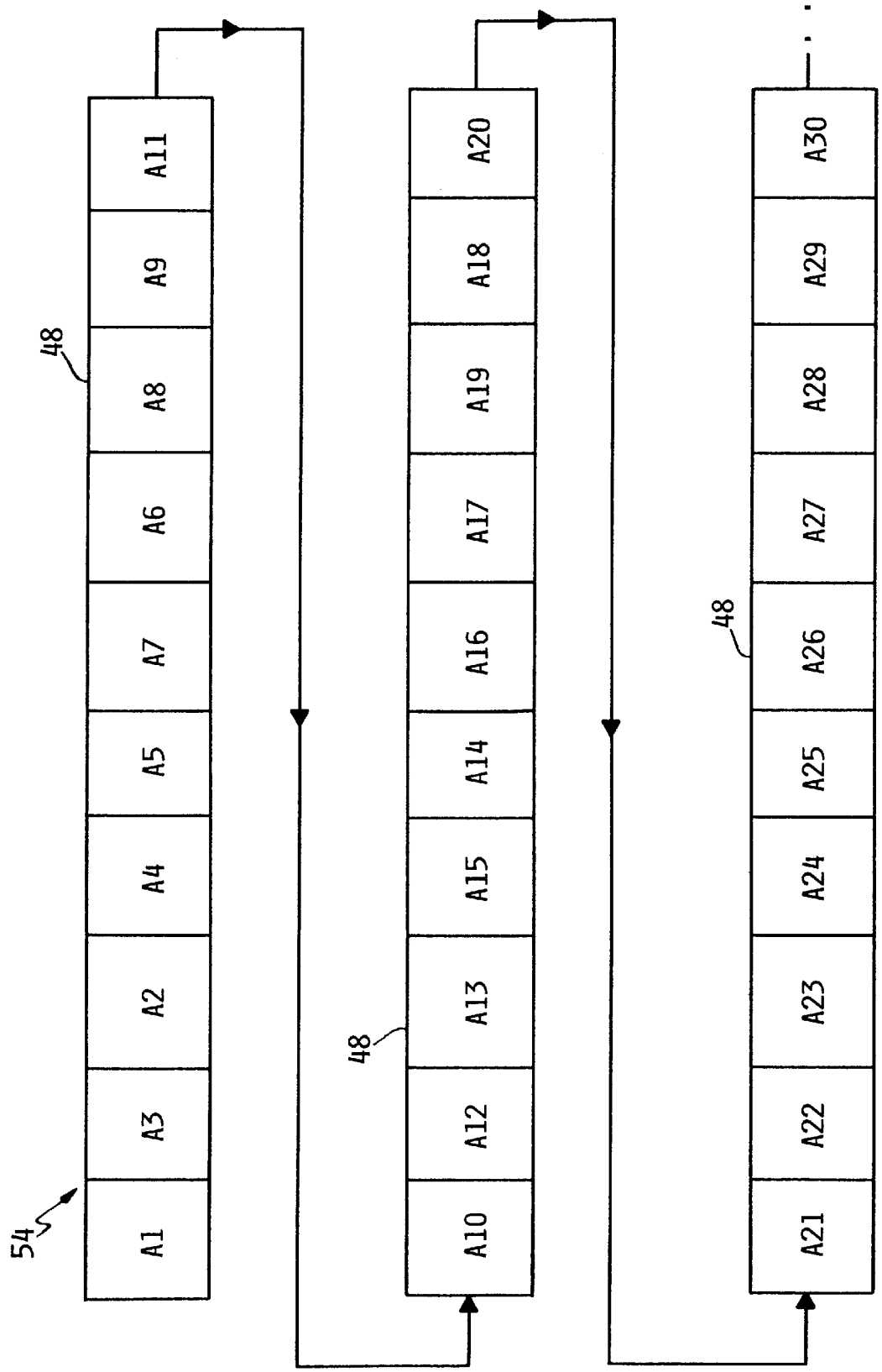
FIG. 6 is an illustration of a customized series of discrete source program segments including an asynchronous source program segment series portion followed by a synchronous source program segment series portion, with each discrete source program segment being representative of a predetermined time portion of a multimedia program.

A sequential series 46 of compressed digital video segments 48 provided at the output of the coder 32 is preferably transmitted to the input of an index parser 33, as shown in FIG. 4. A controller 34, coupled to the coder 32 and video parser 38, preferably coordinates the transfer of the compressed video segments 48 from the coder 32 and index parser 33 to a mass storage device 35 provided in the mass storage library 40. The video parser 38 is preferably employed to perform various re-ordering operations on a sequential series 46 of compressed video segments 48 associated with a selected multimedia program stored on the mass storage device 35. The video parser 38 operates to positionally translate particular discrete video segments 48 of a sequential video segment series 46 to produce a custom ordered series 54 of video segments 48. The custom ordered video segment series 54 shown in FIG. 6, for example, depicts the first thirty compressed video segments 48 of a customized video signal stream 54, representative of the first thirty seconds of a two-hour movie, produced at the output of the video parser 38 for temporary storage on a staging storage device 41. As will be described in greater detail hereinbelow, the manner in which the video parser 38 parses the video segments 48 to produce a customized video signal stream 54 is preferably dependent on a number of factors, including the storage capacity and functionality of a subscriber's local set-top control system 62 adapted to receive and process the customized video signal stream 54, and the manner in which a subscribing customer desires to control the presentation of a requested multimedia program.

The controller 34 preferably controls the transfer of a customized video segment series 54 from the video parser 38 to a staging storage device 41 for temporary storage thereon prior to transmission to a distribution switch 42. The distribution switch 42, which is coupled to a communication channel 44, is preferably an ATM (Asynchronous Transfer Mode) distribution switch which operates to asynchronously distribute packets, or packs in accordance with MPEG terminology, of video segments 48 concurrently to one or more customer set-top control systems 62 over the communication channel 44. It is to be understood that one or more buffer memory devices (not shown) may be employed when synchronizing the transmission of video segments 48 comprising a multiplexed signal stream between the video parser 38 and the distribution switch 42, and for synchronizing segment packet transmission between the distribution switch 42 and the communication channel 44.

It is to be further understood that a customized video segment sequence 54 representative of a multimedia program may alternatively be stored on the mass storage device 35 to facilitate efficient transmission of one or more pre-processed, standard customized video signal streams 54 to customer set-top control systems 62 having a predefined storage capacity and control function capability. Use of such pre-processed customized video signal streams retrieved from the mass storage device 35 obviates repetitive parsing operations that would otherwise be performed by the video parser 38 to accommodate a particular set-top control system's unique configuration and presentation control functionality. Generally, the process of encoding a multimedia program requires significantly greater processing resources and a correspondingly greater processing cost as compared to decoding operations. Pre-processing or encoding multimedia programs in a manner amenable to such standardized set-top control system 62 disproportionately shifts the processing overhead to the multimedia server 30, as well as the concomitant processing costs which can be shared by the subscribing customers. It is noted that prior to transmitting a video program to a subscribing customer's set-top control system 62, the subscriber's account status is preferably verified by a billing system 36 coupled to the controller 34 of the multimedia server 30. After proper account verification is confirmed, the subscribing customer is granted authorization rights to receive multimedia programming from the multimedia server 30 preferably on a pay-per-view basis.

Figure 8:
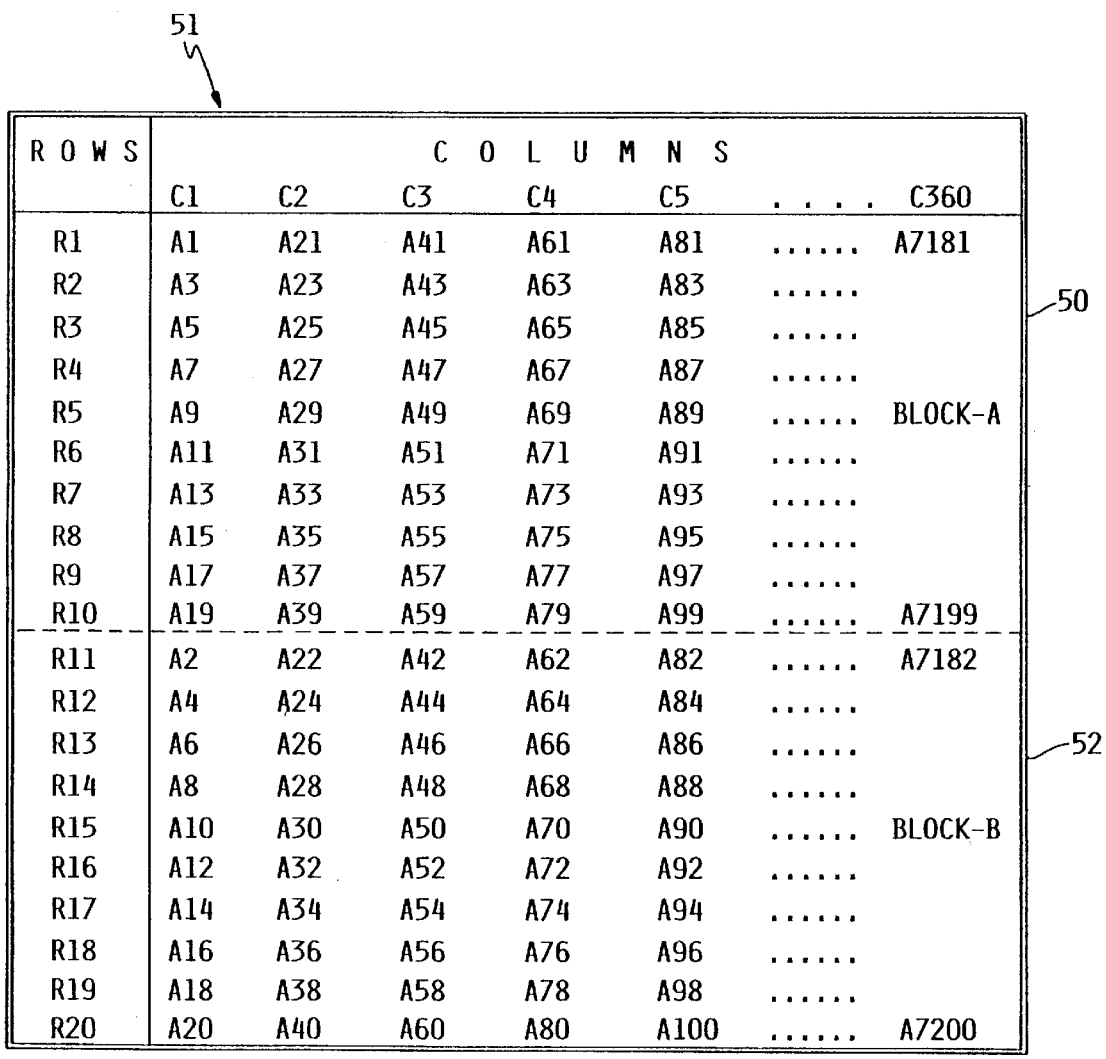
FIG. 8 is an illustration of 7,200 discrete one-second source program segments representative of a two-hour multimedia program arranged in a 20×360 customized matrix comprising two 10×360 sub-matrices or blocks, with each block containing 3,600 asynchronously ordered discrete one-second source program segments.

In FIGS. 7 and 8, there are illustrated matrices of discrete compressed video segments 48 shown in row-column array formats. In one embodiment, an entire video program, such as a feature-length movie or theatrical performance, for example, is processed by the coder 32 and index parser 33 into a sequential series 46 of compressed video segments 48 which is subsequently organized by the video parser 38 into a matrix of rows and columns, as illustrated in FIGS. 7 and 8. It is noted that various known matrix manipulation techniques may be employed by the video parser 38 when re-organizing the ordering of the video segments 48 representative of all or a portion of a multimedia program. Techniques other than those that employ matrix manipulation may also be utilized. In accordance with the embodiments illustrated in FIGS. 7 and 8, the video parser 38 initially organizes a sequential series of discrete compressed video segments 48 into a matrix having 60 rows and N columns, where N is the number of minutes of total playing time for a particular video program, rounded upward.

For purposes of clarity and simplicity of explanation, the matrix illustrated in FIG. 7 is shown as containing all of the discrete compressed video segments 48 of a two-hour segmented movie, with each video segment 48 representing a one-second portion of non-compressed, full-motion video. A two-hour movie segmented into such one-second, full-motion video portions is thus represented by 7,200 discrete compressed video segments 48. The 7,200 compressed movie segments 48 are preferably organized by the video parser 38 as a matrix of 60 rows and 120 columns. It is noted that the value of N for a two-hour movie is equal to 120 minutes, thereby accounting for the 120 columns of the matrix depicted in FIG. 7. In one embodiment in which a multimedia program is to be transmitted exclusively as a sequential series of video segments 48 without a non-sequential series portion, as further illustrated by the matrix configuration illustrated in FIG. 7, the video parser 38 preferably transmits the compressed video segments 48 sequentially arranged in the 60×120 matrix to the distribution switch 42 in a column-by-column manner. The video segments A1 through A7200 representing a two-hour movie 48 may then be transmitted in a sequential manner over the communication channel 44 to a subscribing customer's set-top control system 62. A subscribing customer's set-top control system 62 preferably includes a moderate amount of local storage, typically on the order of 5 to 10 megabytes, for receiving the compressed sequential video signal stream 46 transmitted from the multimedia server 30. Dynamic Random Access Memory (DRAM) or a DASD may be employed to buffer the 5 to 10 megabytes of the received compressed sequential video signal stream 46.

In accordance with this embodiment the multimedia server 30 preferably communicates concurrently with a plurality of set-top control systems 62 over a communication channel 44. A typical coaxial cable communication channel 44 transmits information signals at a data rate on the order of approximately 100 megabytes per second. Assuming that each of a plurality of set-top control system 62 includes approximately ten megabytes of internal memory, for example, the distribution switch 42 of the multimedia server 30 preferably asynchronously transmits approximately ten megabytes of multimedia program information each minute to some 600 subscribing customer locations. It is noted that a set-top control system 62 configured with a minimal amount of local memory is capable of receiving and processing the sequentially ordered compressed video signal stream 46 transmitted by the multimedia server 30, but will typically lack sufficient local memory to provide a subscriber with VCR-type control over the presentation of the video program.

In accordance with two other embodiments, as illustrated in FIGS. 8 and 9, the video parser 38 preferably arranges a sequential stream 46 of compressed video segments 48 received from a mass storage device 35 into a customized sequence of compressed video segments 48. In FIG. 8, there is illustrated a customized matrix of 7,200 compressed video segments 48 representing 7,200 discrete one-second full-motion video portions of a two-hour video program. In the embodiment illustrated in FIG. 8, the video parser 38 organizes the 7,200 compressed video segments 48 into two sub-matrices 50 and 52 of odd and even address indices. Each of the two sub-matrices 50 and 52 is preferably arranged as a sub-matrix comprising ten rows and 360 columns (10×360). Each of the sub-matrices 50 and 52 thus contains 3,600 discrete video segments 48 of the total 7,200 segments 48 comprising the two-hour video program. The odd sub-matrix 50 and the even sub-matrix 52 are then concatenated along the first dimension (rows) to form a single customized matrix 51 of twenty rows by 360 columns (20×360). In response to a transmission control signal produced by the controller 34, the video parser 38 preferably transmits the compressed video segments 48 arranged in the customized matrix 51 to a staging storage device 41 which, in turn, transmits the customized non-sequential video segments 48 to the distribution switch 42 in a column-by-column manner for subsequent transmission over the communication channel 44.

For example, the video parser 38 preferably transmits the video segments 48 of the customized matrix 51, shown in FIG. 8, to the distribution switch 42 as the customized sequence of A1, A3, A5, A7, A9 ... A19; A2, A4, A6, A8 ... A20; A21, A23, A25 ... A39; A22, A24, A26, A28 ... A40; A41, A43 ... A7200. Each of the sub-matrices 50 and 52 defining the customized concatenated matrix 51 will hereinafter be respectively referred to as block 50 and block 52. Preferably, each block 50 and 52 will exclusively contain video segments 48 having either even or odd address indices. It is noted that this preferred block organization is not necessarily required in order to realize the advantages of the novel multimedia server 30. In the embodiment illustrated in FIG. 8, the video segments 48 processed by the video parser 38 are subdivided into one odd block, Block-A 50, and one even block, Block-B 52, for a total of two such blocks. The total number of blocks within which the video segments 48 are organized will be referred to herein in connection with the Block Indexing Coefficient (BI) associated with the customized video segment matrix 51. The customized matrix 51 of FIG. 8 includes two blocks of odd and even indices, and as such, represents a customized matrix 51 having a Block Indexing Coefficient of modulo-2. It is to be understood that the compressed video segments 48 may be organized into a plurality of odd and even blocks to define customized matrices 51 having Block Indexing Coefficients in excess of modulo-2. Also, each block of a plurality of blocks may include a combination of odd and even video segment address indices.

As will be discussed in detail hereinbelow, the length of each segment block (L), measured in terms of video segments 48, is an important formatting parameter. The segment block length (Z) is a function of the size of an input buffer typically provided in a subscribing customer's set-top control system 62 for the purpose of buffering packets of video segments 48 received from the multimedia server 30. The organization of each of the blocks 50 and 52 formatted as shown in FIG. 8, for example, would generally correspond to a maximum block length of ten video segments 48, and a maximum packet size of ten video segments 48. As such, the input buffer of a customer's set-top control system 62 would typically be configured to store at least ten video segments 48. By way of further example, the organization of each of the blocks 53, 55, 57, and 59 formatted as shown in FIG. 9 would correspond generally to a maximum block length of five video segments 48, and a maximum packet size of five video segments 48. As such, the input buffer of a customer's set-top control system 62 would typically be configured to store at least five video segments 48. It is noted that the average size of the discrete video segments 48 must be considered when determining the adequacy of the input buffer 66 storage capacity. Each of the video segments 48 shown in FIG. 8, for example, represents a one-second portion of full-motion video, while each of the video segments 48 shown in FIG. 9, for purposes of illustration, represents a two-second portion of full-motion video.

Generally, the input buffer 66 should be configured to store at least twice the number of video segments contained in the largest video segment packet transmitted by the multimedia server 30. The additional input buffer 66 storage capacity provides for enhanced synchronization of video segments 48 being processed through the input buffer 66, and provides the multimedia server 30 with additional flexibility when asynchronously distributing video segment packets to a plurality of customer set-top control systems 62. It may be advantageously efficient, for example, for the multimedia server 30 to transmit two packets during a single transmission window to a particular set-top control system 62 to reduce server 30 processing overhead during periods of peak utilization.

Referring now to FIG. 9, there is illustrated a customized matrix 51 having a Block Indexing Coefficient of modulo-4 and comprising four blocks 53, 55, 57, and 59 of compressed two-second video segments 48 having alternating odd and even address indices. In the embodiment of FIG. 9, the two-hour video program segmented by the coder 32 and the index parser 33 has been organized by the video parser 38 into four blocks, Block-A 53, Block-B 55, Block-C 57, and Block-D 59. In response to a transmission control signal produced by the controller 34, the compressed video segments 48 arranged in the four blocks 53, 55, 57, and 59 are read out of the video parser 38 in a column-by-column manner and transferred to a staging storage device 41 for subsequent transmission over the communication channel 44 by the distribution switch 42. In accordance with one formatting scheme, the video parser 38 preferably transmits the video segments 48 of the customized matrix 51 to the staging storage device 41 as the customized sequence of A1, A5, A9, A13, A17; A2, A6, A10, A14, A18; A3, A7, A11, A15, A19; A4, A8, A12, A16, A20; . . . A3600. It can be seen that the ordering of the video segments 48 comprising a customized video signal stream 54 becomes more asynchronous or non-sequential as the Block Indexing Coefficient of the customized matrix 51 increases. As will be described in detail hereinbelow, the organization of the video segments 48 comprising a customized video signal stream 54 is preferably governed by general asynchronous formatting equations and guidelines that have been developed by the inventors. These formatting equations and guidelines are preferably employed by the multimedia server 30 to optimally organize a segmented multimedia program in response to various performance and functional characteristics of each unique set-top control system 62 adapted to receive the multimedia program transmission from the multimedia server 30.

In general, a customized video signal stream 54 preferably includes an initial asynchronous or non-sequential video segment 48 portion followed by a synchronous or sequential video segment 48 portion. More particularly, an introductory portion of a selected multimedia program signal stream preferably includes a plurality of non-sequentially ordered video segments 48, while the remaining portion preferably includes a plurality of sequentially ordered video segments 48. In a preferred embodiment, the duration of the introductory non-sequential portion of the multimedia program signal stream corresponds to the duration of the multimedia program that is to be buffered on the subscriber's set-top control system 62, and is preferably the portion of the multimedia program over which a customer has full local VCR-type presentation control. Further, as will be discussed in detail hereinbelow, the asynchronous portion of the multimedia program is concurrently buffered on the customer's set-top control system 62 while being processed for immediate display on an attached television 24 or monitor, thereby providing a subscribing customer with true on-demand viewing of a selected multimedia program. It is to be understood that a customized video signal stream may comprise only asynchronously ordered video segments 48, combined synchronous and asynchronous video segment 48 portions, or exclusively synchronously ordered video segments 48.

In accordance with the embodiments illustrated in FIGS. 8 and 9, a set-top control system 62 adapted to receive a customized video signal stream 54 transmission from the multimedia server 30 must generally include sufficient memory to buffer all or at least a portion of the video signal stream 54 and include means for reorganizing the asynchronous video stream portion into a sequentially ordered video signal stream 46 in order to properly display the multimedia program in accordance with its original temporal organization. It is important to note that cooperative operation between the multimedia server 30 and a set-top control system 62 provides for a media-on-demand communication system capable of concurrently servicing a plurality of subscribing customers, with each customer having full local VCR-type control over the presentation of a portion of the multimedia program or, if desired, the entire multimedia program. It is further noted that the novel parsing or formatting of a segmented multimedia program by the video parser 38 and concurrent asynchronous transmission of one or more multimedia programs by the distribution switch 42 provides for a dramatic reduction in communication channel 44 bandwidth and multimedia server 30 processing overhead in comparison to conventional video communication systems. By transmitting each of the compressed video segments 48 generally only once, repetitive transmission of video segments 48 over the communication channel 44 that would otherwise be required to provide local VCR-type control over the media presentation is altogether avoided.

The distribution switch 42 preferably transmits a plurality of selected multimedia programs concurrently to a plurality of set-top control systems 62. In order to effectuate high-speed, high-volume multimedia program transmission, the distribution switch 42 preferably employs an Asynchronous Transfer Mode (ATM) switching methodology. Generally, ATM is a cell-based switching and multiplexing methodology designed to be a general-purpose, connection-oriented transfer mode for a wide range of communication services. ATM is widely utilized for effectuating communication over local area networks (LANs) and private networks.

ATM handles both connection-oriented traffic and connectionless traffic through the use of adaptation layers. ATM virtual connections may operate at either a constant bit rate (CBR) or a variable bit rate (VBR). Each ATM cell transmitted over a communication channel 44 contains addressing information that establishes a virtual connection from origination to destination. All cells are then transferred, in order, over this virtual connection. ATM provides bandwidth-on-demand, and also supports LAN-like access to available bandwidth. ATM is asynchronous because the transmitted cells need not be periodic as time slots of data are in accordance with known Synchronous Transfer Mode (STM) methodologies.

The primary ATM information unit is the cell. ATM standards define a fixed-size cell with a length of 53 octets (or bytes) comprised of a 5-octet header portion and a 48-octet payload portion. The bits in the cells are transmitted over the transmission path 44 in a continuous stream. Cells are mapped into a physical transmission path, such as the North American Digital Signal Level 1 (DS1), DS3, or SONET, International Telecommunications Union—Telecommunications standardization sector (ITU-T) STM standards, and various other local fiber and electrical transmission systems.

All information is switched and multiplexed in an ATM distribution network typically by using these fixed-length cells. The cell header identifies the destination, such as a subscriber's set-top control system 62, cell type, and priority. Fields of the cell header include the virtual path identifier (VPI) and virtual circuit identifier (VCI) which identify the destination. The generic flow control (GFC) field allows a multiplexer, such as the distribution switch 42, to control the rate of cell transmission. The payload type (PT) indicates whether the cell contains user data, signaling data, or maintenance information. The cell loss priority (CLP) bit indicates the relative priority of the cell. It is noted that higher priority cells are granted preferred processing status over lower priority cells during congested intervals.

Each cell typically includes a header error check (HEC) which detects and corrects errors in the header. The payload field is passed through the network intact, generally without undergoing error checking or correction. ATM relies on higher layer protocols to perform error checking and correction on the payload portion. The fixed cell size simplifies the implementation of ATM switches and multiplexers while providing very high speeds. When using ATM, longer packets cannot delay shorter packets as in other switching implementations because long packets are segmented into many cells. This enables ATM to carry constant bit rate (CBR) traffic together with variable bit rate (VBR) data traffic.

As will be appreciated by those skilled in the art, an ATM communication network suitable for communicating a plurality of multimedia programs from a multimedia server 30 concurrently to a plurality of set-top control systems 62 preferably conforms to the Open Systems Interconnection (OSI) model. The OSI model defines seven layers, including an application, presentation, session, transport, network, link, and physical layer, for describing the operations of an OSI communication network. The OSI model was developed by the International Organization for Standardization (ISO) and is described in "The Basics Book of OSI and Network Management" by Motorola Codex from Addison-Wesley Publishing Company, Inc., 1993 (First Printing September 1992). In one embodiment, the distribution architecture and method for distributing multimedia information from the multimedia server 30 to a plurality of distantly located set-top control systems 62 preferably conforms to one or more of the OSI communication models.

In accordance with one embodiment, the distribution switch 42, illustrated in FIGS. 3 and 4, preferably transmits each packet of discrete video segments 48 to a target set-top control system 62 within a predetermined transmission window, the duration of which is preferably determined by the configuration and functional attributes of a particular customer's set-top control system 62. The customized non-sequential series of video segments 48 illustrated in FIG. 6, for example, represents a video segment series portion exhibiting a relatively modest degree of asynchronous organization. For this example, each video segment packet transmitted by the distribution switch 42 over the communication channel 44 preferably contains two video segments 48, one of which has an odd address index, such as A1, and the other of which has an even address index, such as A2. Accordingly, an input buffer provided in a customer's set-top control system 62 would be configured to store at least two video segments 48. Assuming that each of the two video segments 48 buffered in the input buffer contain a one-second portion of motion video, the input buffer would be emptied after two seconds, which corresponds to the time required to display the two one-second video segments 48.

In order to provide uninterrupted presentation of the multimedia program, the next packet containing another two one-second video segments 48 would have to be transmitted by the distribution switch 42 and received by the set-top control system 62 within a two second transmission window. Accordingly, after the second video segment 48 of a particular video packet is being read out of the input buffer, the first and second video segments of the subsequently received video packet is preferably read into the input buffer. It is noted that the input buffer is preferably configured to store in excess of the minimum required capacity to provide for increased multimedia server 30 transmission flexibility and enhanced input buffer processing synchronization. In this example, an input buffer configured to store three or four video segments 48, rather than the required minimum of two video segments 48, is preferred. Alternatively, an overflow buffer or transfer buffer could also be employed in cooperation with the input buffer to facilitate efficient synchronization.

By way of further example, a customized non-sequential series of video segments 48 read out of the customized matrix 51 illustrated in FIG. 9 represents a video segment series portion exhibiting a relatively moderate degree of asynchronous organization. For this example, as further illustrated in FIG. 10, each video segment packet transmitted by the distribution switch 42 over the communication channel 44 preferably contains at least five video segments 48.

After the first four packets have been transmitted, each of the packets for this example would contain only four video segments 48. As such, the input buffer provided in a customer's set-top control system 62 would be configured to store at least five video segments 48. Assuming that each of the five video segments 48 buffered in the input buffer represents a two-second portion of motion video, the input buffer would be emptied after ten seconds of equivalent viewing time for the first four packet transmissions, and would be emptied after eight seconds of equivalent viewing time for subsequently transmitted video segment packets.

In order to provide uninterrupted presentation of the multimedia program for this example, Packets 2 through 5 would have to be transmitted by the distribution switch 42 and received by the set-top control system 62 within a ten second transmission window. The transmission of the packets following Packet 5 would have to be transmitted by the distribution switch 42 and received by the set-top control system 62 within an eight second transmission window. It is considered desirable for purposes of simplicity that the number of video segments 48 contained within each packet be an integral multiple of a one-second video segment 48. It is noted that information packets unrelated to the instant multimedia program selection may also be transmitted to a customer's set-top control system 62 from the multimedia server 30. The packets containing the unrelated information, such as a message indicating that a video conferencing call has been received or reception of some other unrelated data, may be interleaved with the video segment packets and transmitted within an appropriate transmission window. Further, the unrelated information may be interleaved between discrete video segments 48 contained within a video segment packet.

Conventional coaxial transmissions cables are generally capable of supporting burst transmission rates on the order of 100 MB/sec. Fiber optic transmission lines, in contrast, can be employed to support burst transmission rates on the order of gigabytes per second. Accordingly, transmission window durations on the order of several seconds can easily be accommodated using existing coaxial and fiber optic communication networks. It is readily apparent to those skilled in the art that various known asynchronous transmission mode distribution techniques are well-suited for distributing video segment packets asynchronously during successive transmission windows or transmission time slots over a relatively high burst rate communication channel.

The service costs associated with receiving on-demand multimedia programs on a pay-per-view basis preferably vary depending on the formatting of the source program signal stream transmitted from the multimedia server 30. In general, a subscribing customer's service costs decrease as the video segment packet size transmitted by the multimedia server 30 increases. Video segment packets containing two one-segment video segments 48, for example, must be transmitted within a relatively short transmission window of approximately two seconds. The multimedia server 30 must, therefore, transmit video packets on a frequent basis. In contrast, a source multimedia program formatted such that four or five video segments 48 are contained within each video segment packet, for example requires significantly fewer packet transmissions, with each transmission being accomplished within a significantly longer transmission window of approximately ten and eight seconds, respectively. Although increasing the size of the input buffer generally increases the cost of the set-top control system 62, the amortized cost of receiving on-demand multimedia programming over time is reduced due to the ability to buffer larger video segment packets.

Intelligent Set-Top Control System

Figure 11:
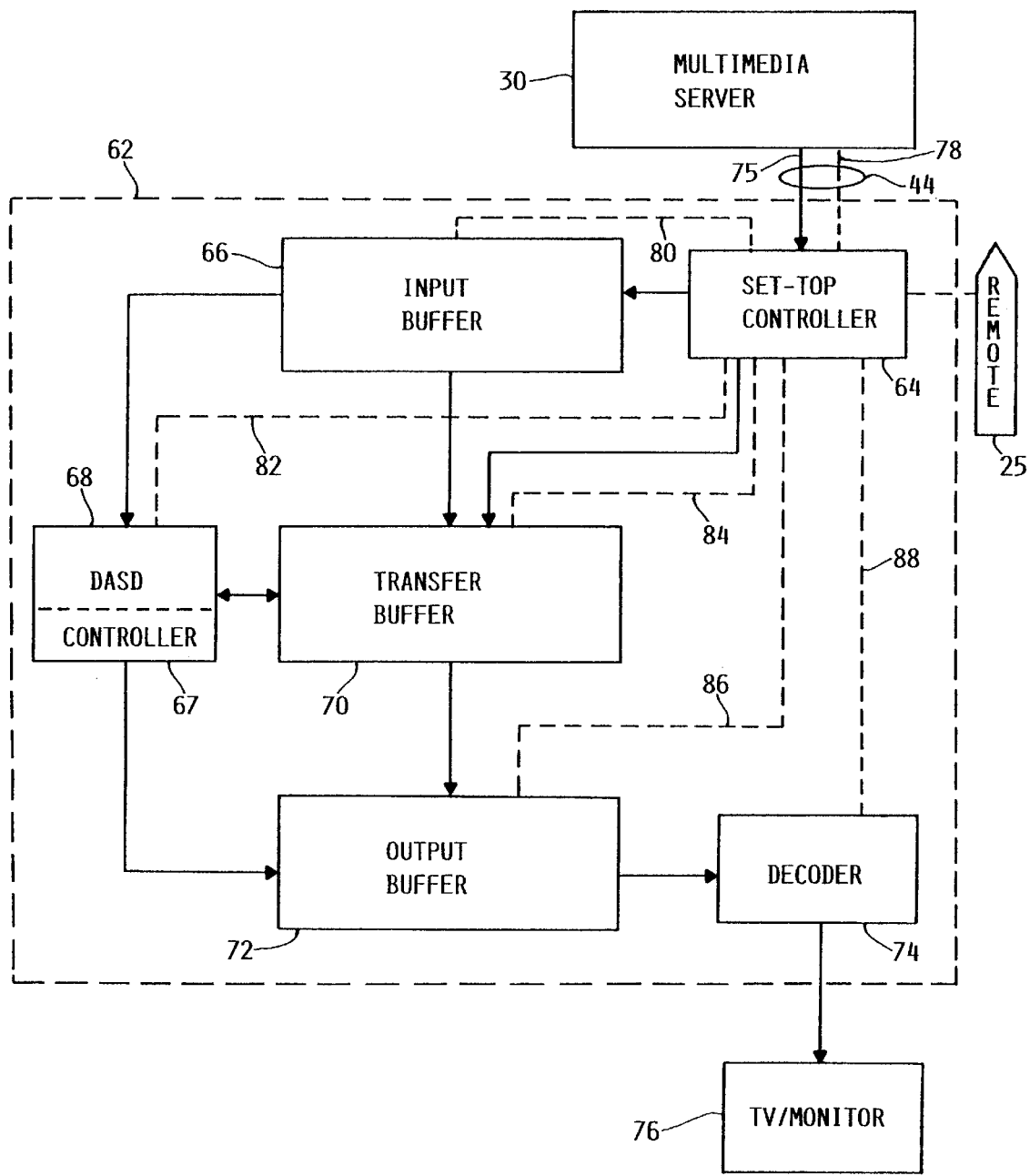
FIG. 11 is a generalized block diagram of a novel intelligent set-top control system adapted to communicate with a remote multimedia server to facilitate asynchronous formatting of source program segments on a multimedia DASD received from the multimedia server preferably on an on-demand, pay-per-view basis.

Referring now to FIG. 11, there is illustrated a system block diagram of a novel intelligent set-top control system 62 adapted for communicating with a remote multimedia server 30 preferably of the type described hereinabove. In accordance with one embodiment, a relatively low-cost set-top control system 62 configuration includes a moderate amount of local memory, preferably on the order of 5 to 10 megabytes, for receiving a coded video signal stream 46 comprised of sequentially ordered discrete video segments 48 transmitted from the multimedia server 30 over a communication channel 44. The set-top control system 62 preferably includes a set-top controller 64 that communicates with an input buffer 66, output buffer 72, and a decoder 74 to coordinate decoding of the received coded video signal stream 46 for presentation on a local monitor or television 76. As previously discussed, the relatively small storage capacity of the input buffer 66 of the low-cost set-top control system 62 will generally require relatively frequent packet transmissions for the multimedia server 30, thereby resulting in higher service costs in comparison to set-top control systems employing large storage capacity input buffers 66.

In a preferred embodiment, the set-top control system 62 preferably includes a novel multimedia direct access storage device (DASD) 68 adapted to buffer compressed video segments 48 representative of a portion or all of a multimedia program received from a communication channel 44 in accordance with a novel formatting methodology disclosed hereinbelow. An important feature afforded a subscribing customer when employing a set-top control system 62 in accordance with this embodiment concerns the capability to effectuate full local VCR-type control over the presentation of a portion of a selected multimedia program on a real-time basis. Full VCR-type control over the presentation of the entire multimedia program may also be realizable provided a sufficient amount of DASD 68 storage capacity is allocated for this purpose.

Figure 12:
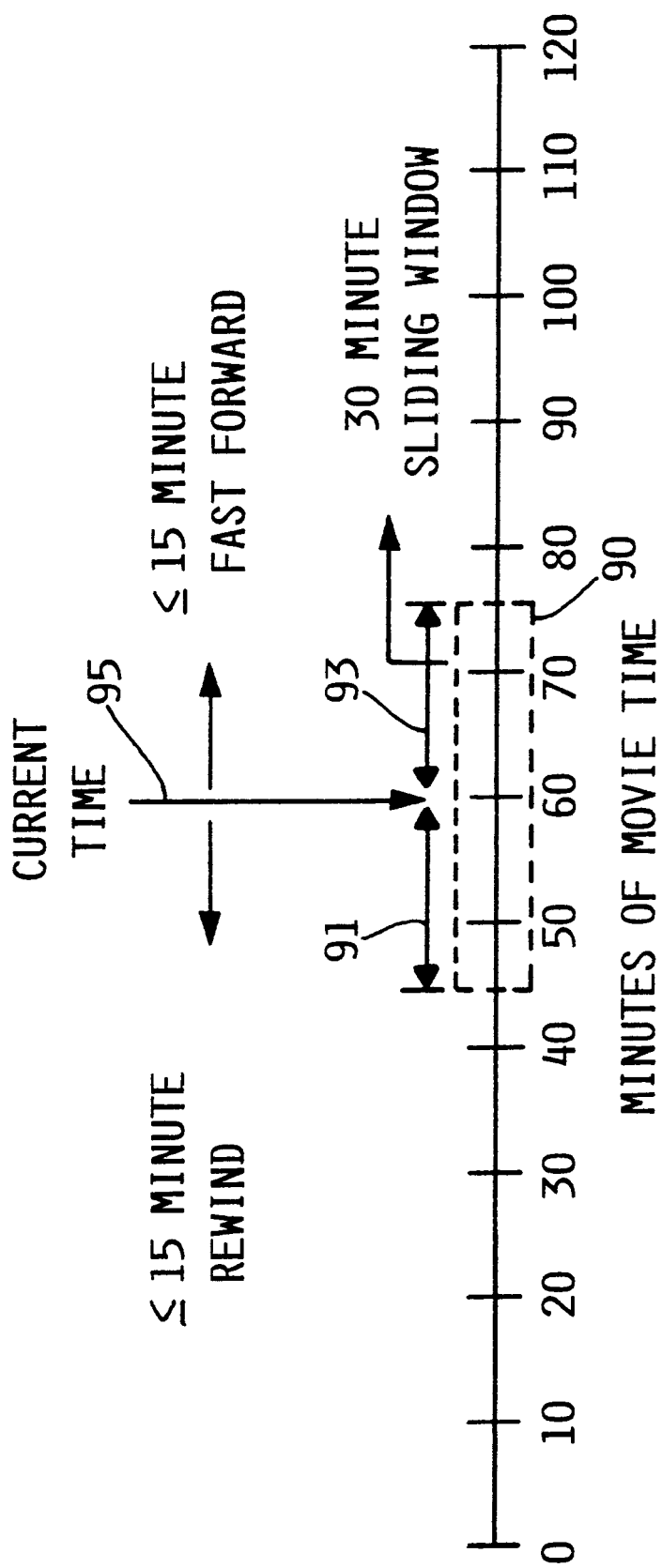
FIG. 12 is a depiction of a novel presentation control window effectuated using a novel intelligent set-top control system for controlling a portion of a multimedia program presentation in a plurality of presentation modes, including forward, reverse, and pause modes.

The amount of available DASD 68 storage capacity generally impacts the degree to which a subscribing customer can effectuate VCR-type control over the presentation of a selected multimedia program. As illustrated in FIG. 12, a subscriber preferably controls the presentation of a portion of a multimedia program defined within a virtual presentation control window 90. The functionality of the virtual presentation control window 90 is facilitated by a novel asynchronous formatting methodology and storage architecture associated with the multimedia DASD 68. The presentation control window 90 depicted in the embodiment illustrated in FIG. 12, for example, is shown as encompassing a thirty minute portion of a two-hour (120 minute) movie. The portion of the movie represented within the presentation control window 90 is locally manipulatable by the subscriber. The subscriber, for example, may progress through the movie portion defined within the presentation control window 90 in a forward and a reverse temporal direction, and may also pause the presentation of the movie.

The presentation control window 90 preferably advances in time as the movie is being presented. In this regard, the virtual presentation control window 90 may be viewed as a temporally translatable buffer. The presentation control window 90 preferably comprises a forward window portion 93 and a reverse window portion 91 defined respectively on either side of a current viewing time reference 95. At a current viewing time of sixty minutes into a two-hour movie, for example, the forward window portion 93 of the thirty minute presentation control window 90 provides control over the succeeding fifteen minutes (minutes sixty through seventy-five) of the movie with respect to the current viewing time reference 95, while the reverse window portion 91 provides control over the preceding fifteen minutes (minutes forty-five through sixty) with respect to the current viewing time reference 95.

The thirty minute presentation control window 90 is translated in either a forward or reverse temporal direction in accordance with the forward and reverse progression of the current viewing time reference 95. As such, for current viewing time references 95 within the two-hour movie in excess of fifteen minutes and less than 105 minutes, a viewer may progress forward or backward through a maximum of fifteen minutes in either temporal direction with respect to the current time reference 95. The time increments associated with progressing in a forward or reverse temporal direction within the presentation control window 90 are typically determined by a number of factors, including the storage capacity of the DASD 68 and the number of disk surfaces and disk surface portions or blocks allocated for supporting the presentation control window 90, the size of the input buffer 66 of the set-top control system 62, the size of each discrete video segment 48, and the size of each video segment packet. As long as the viewer operates within the thirty minute presentation control window 90, each of the 7,200 compressed video segments 48 comprising the two-hour movie is transmitted only once from the multimedia server 30 to the subscriber's set-top control system 62. Moving outside of the presentation control window will generally require re-transmission of previously transmitted compressed video segments 48. Such incidents of re-transmission preferably result in additional costs being charged to the subscriber's account.

With further reference to FIG. 11, the set-top controller 64 of the set-top control system 62 preferably communicates with a remote multimedia server 30 over a communication channel 44, and coordinates the operation of the set-top control system 62. Media-on-demand data is generally transmitted from the multimedia server 30 to the set-top control system 62 over the communication channel 44 at a very high burst data rate, typically on the order of 100 megabytes per second (MB/sec) for a conventional coaxial transmission cable. The set-top controller 64 preferably communicates with other components of the set-top control system 62 to coordinate the reception, storage, and decoding of compressed video segments 48 received from the multimedia server 30, and the presentation of the decoded video segments 48 on a subscribing customer's television 76. The set-top controller 64 preferably communicates control signals to the multimedia server 30 over a server control line or channel 78 of the communication channel 44 to initiate transmission of a pay-per-view multimedia program and to regulate the rate at which the compressed video signal stream is received from the multimedia server 30 over the data channel 75 to avoid an input buffer 66 overflow condition.

During the presentation of a multimedia program, for example, the viewer may temporarily stop the presentation of a program by communicating a pause command to the set-top control system 62, typically by use of an IR remote control handset 25. During the pause mode, a control signal is preferably issued by the set-top controller 64 to the multimedia server 30 over the server control line 78 to request temporary halting of source video signal stream transmission, thus causing the translatable presentation control window 90 to temporarily remain stationary. The set-top controller 64 preferably issues a resume control command over the server control line 78 when requesting the multimedia server 30 to resume transmission of the source video signal stream. By way of further example, a subscribing customer may view portions of the multimedia program outside of the presentation control window 90 by selectively activating a forward or reverse control button disposed on the IR remote control handset 25. In accordance with a novel multimedia DASD 68 video signal stream buffering methodology, only the compressed video segments 48 corresponding to portions of the multimedia program defined within the presentation control window 90 are locally stored in the DASD 68. Thus, moving beyond the presentation control window portions 93 and 91 generally requires re-transmission of video segments 48 corresponding to portions of the movie outside of the presentation control window 90.

The set-top control system 62 preferably includes an annunciator that alerts a subscriber to a condition in which a forward or reverse control request issued from the IR remote control handset 25 can not be satisfied within the currently defined presentation control window 90. The annunciator also preferably alerts the subscriber that satisfying the request will require additional video data from the multimedia server 30 and result in an associated charge to the subscriber's account. A subscriber may initiate transmission of the additional video data preferably by activating a combination of control buttons in order to ensure that the subscriber intends to incur the additional expense.

As the set-top controller 64 receives compressed video segments 48 from the communication channel 44, typically in the form of segment packets, the controller 64 coordinates the transfer of the segments 48 to an input buffer 66. The set-top controller 64 communicates control signals to the input buffer 66, DASD 68, output buffer 72, decoder 74, and multimedia server 30 to regulate timing and data transmission within the set-top control system 62 respectively over control lines 80, 82, 86, 88, and 78. The operation of the transfer buffer 70 is also controlled by the set-top controller 64 over control line 84. The transfer buffer 70 may be used for an number of purposes, including receiving video segments 48 from the input buffer 66 in response to an input buffer overflow condition, temporarily buffering video segments being transferred into and out of the DASD 68 to enhance synchronization, and to buffer information packets and other data unrelated to the video segment 48 data prior to being stored on or read from the DASD 68. Transferring of such non-related data to and from the DASD 68 is preferably accomplished during periods of low DASD 68 utilization, such as during a pause mode or other period of low DASD 68 usage.

In one embodiment associated with a relatively low-cost set-top control system 62, the size of the input buffer 66 is preferably sufficient to accommodate at least two one-second compressed video segments 48. As previously discussed, one second of full-motion video corresponds on average to an MPEG-1 compressed video segment 48 of approximately 0.167 MB in size. Accordingly, 0.333 MB of input buffer 66 storage capacity is required to accommodate two one-second compressed video segments 48. Data from the input buffer 66 is then transmitted to the DASD 68 preferably at a burst data rate of approximately 5 MB/sec and stored therein in a novel manner that provides full local VCR-type control of the multimedia program presentation. The size of the input buffer may be configured to store in excess of two video segments 48, and may comprise several megabytes of memory. An input buffer 66 configured to store fifteen one-second MPEG-1 compressed video segments 48 would, for example, require approximately 2.5 MB of memory.

Immediate viewing of a requested multimedia program is facilitated by the concurrent transferring of video data from the input buffer 66 to both the DASD 68 and the output buffer 72. Compressed video segments 48 transmitted from the DASD 68 or the transfer buffer 70 are received in sequential order by the output buffer 72. The output buffer 72 preferably stores a predetermined number of compressed video data and ensures that a prescribed input video data rate to the decoder 74 is maintained. Each of the sequential compressed video segments 48 received by the output buffer 72 is then decoded by the decoder 74, and transmitted to a subscriber's television or video monitor 76 at the required frame rate, typically 30 frames per second for an NTSC formatted video signal, or 25 frames per second for a PAL (Phase Altering Line) formatted video signal. In a preferred embodiment, the decoder 74 is configured to decode a compressed MPEG video bitstream. The output buffer 72, for example, preferably transfers an MPEG-1 video bitstream to the input of an MPEG-1 decoder 74 at a rate of approximately 0.2 MB/sec, thus ensuring that the decoder 74 transmits a corresponding decoded video signal to the subscriber's television 76 at a data rate of approximately 20 MB/sec. The output buffer 72 is preferably configured to buffer at least two compressed video segments 48. As such, two one-second compressed video segments 48 would require approximately 0.334 MB of output buffer 72 storage, for example, while two three-second compressed video segments 48 would require approximately 1.0 MB of output buffer 72 memory.

In one embodiment, each set-top control system 62 is identified by a unique serial number. This serial number is preferably used as an identification address when routing video data from the multimedia server 30 to the set-top control system 68 of the subscribing customer who placed the pay-per-view order. As discussed previously hereinabove, an ATM information cell typically includes a cell header that identifies the destination of the cell and its associated information payload. The unique serial number or other type of unique identifier may be incorporated into the cell header to facilitate proper routing of cells, which can be viewed as equivalent to or incorporating the discrete packets of video segments 48 transmitted to a particular subscriber's set-top control system 62. 48

Multimedia Direct Access Storage Device (DASD)

Figure 13:
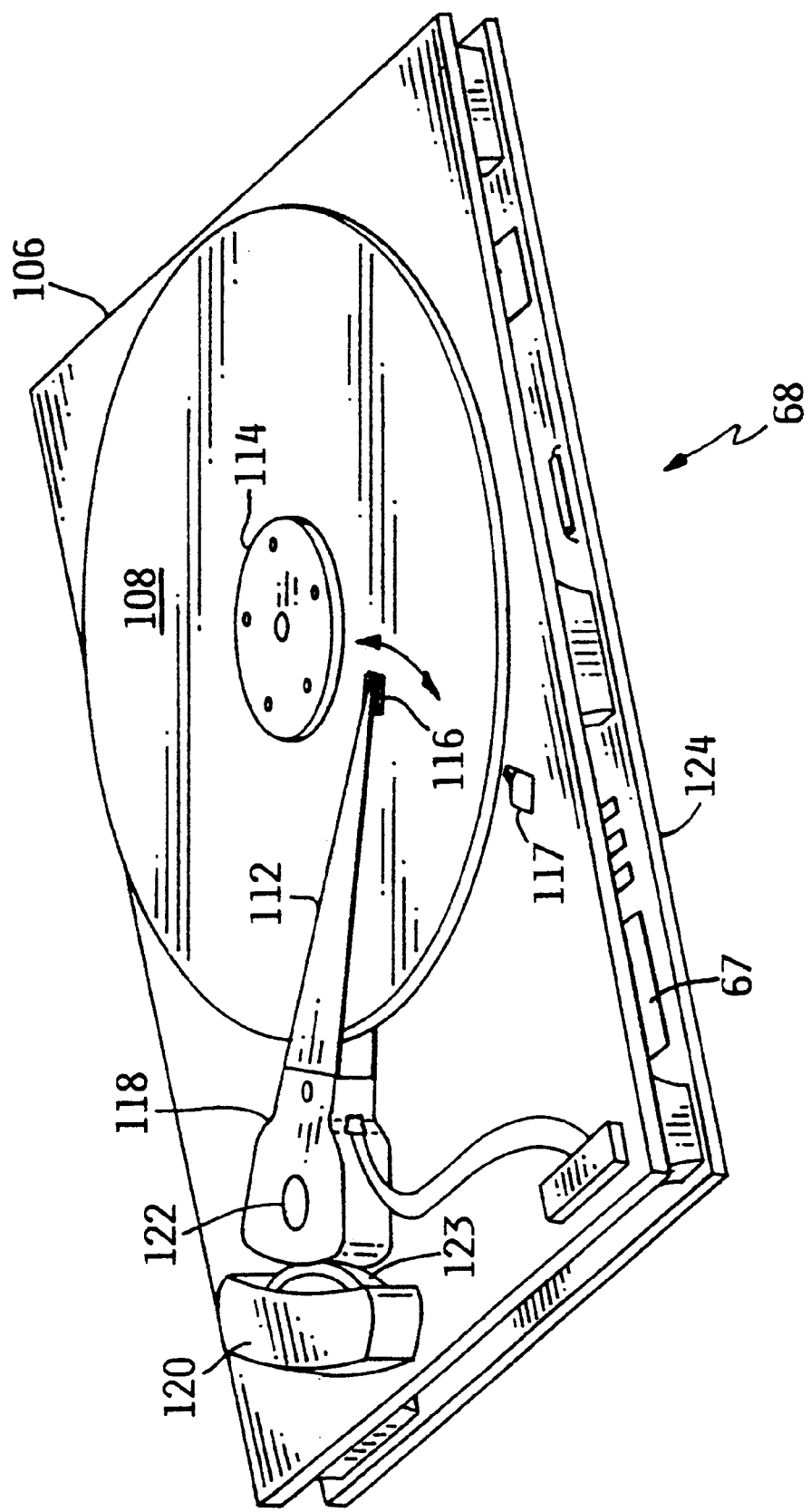
FIG. 13 is an illustration of a novel multimedia direct access storage device of a set-top control system adapted for buffering a predetermined number of discrete source program segments representative of at least a portion of a multimedia program to provide full local VCR-type control of the buffered portion of the selected multimedia program.
Figure 14:
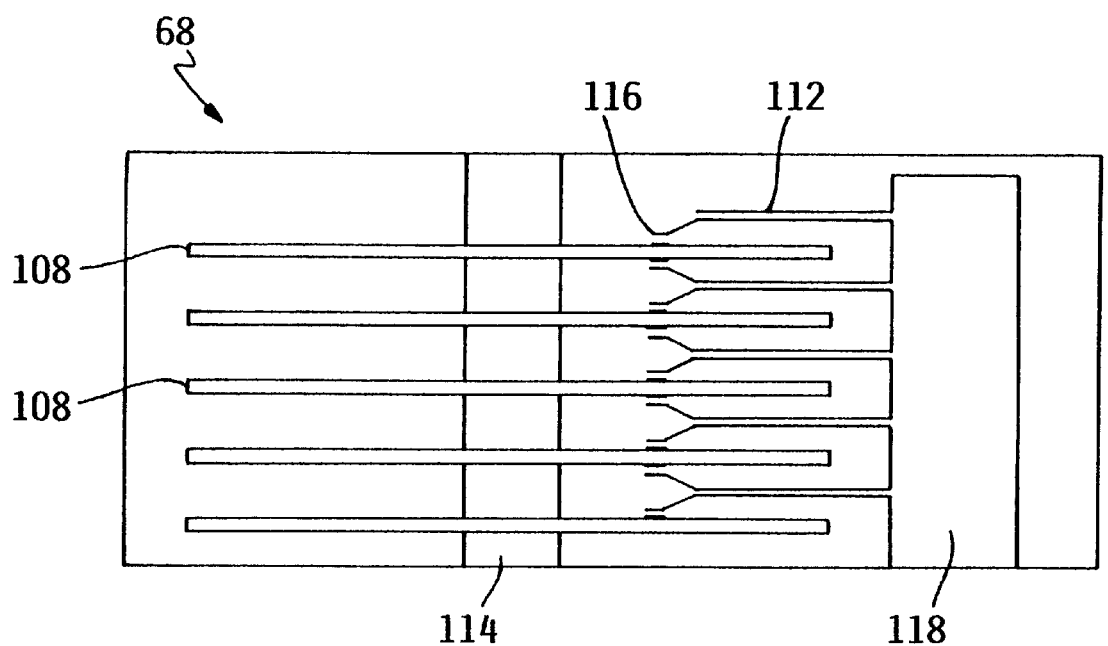
FIG. 14 is an exaggerated side plan view of a novel multimedia direct access storage device of a set-top control system including a plurality of data storage disks adapted for buffering discrete source program segments representative of at least a portion of a multimedia program.

Turning now to FIGS. 13 and 14, there is illustrated a novel multimedia DASD 68 adapted for use in a set-top control system 62 preferably of the type previously disclosed. The multimedia DASD 68 preferably includes one or more rigid data storage disks 108 which are stacked coaxially in a tandem spaced relationship and rotated about a hub of a spindle motor 114. An actuator 118 typically includes one or more outwardly extending actuator arms 112, with each arm having one or more transducer/slider assemblies 116 mounted thereto for writing and reading information to and from the data storage disks 108. The transducer/slider assembly 116 is typically designed as an aerodynamic lifting body that lifts the transducer off of the surface of the disk 108 as the rate of spindle motor 114 and disk 108 rotation increases, thus causing the transducer/slider assembly 116 to hover above the disk 108 on an air bearing produced by the disk 108 rotation. For a DASD 68 configuration employing a constant contact transducer/slider assembly 116 arrangement, a conformal lubricant is preferably disposed on the disk surface 108 to reduce static and dynamic friction between the transducer/slider assembly 116 and the disk surface 24.

The actuator 118 is usually mounted to a stationary actuator shaft 122, and rotates on the shaft 122 to move the actuator arms 112 into and out of the stack of data storage disks 108. A coil assembly 123, mounted to the actuator 118, generally interacts with a permanent magnet structure 120, causing the actuator arms 112, in turn, to sweep over the surface of the data storage disks 108. The spindle motor 114 typically includes a poly-phase a.c. motor or, alternatively, a brushless d.c. motor adapted for rotating the data storage disks 108.

The coil assembly 123 and the permanent magnet structure 120 operate in cooperation as an actuator voice coil motor responsive to control signals produced by a DASD controller 67 typically mounted on a circuit card 124. Various other electronic modules for controlling the operation of the multimedia DASD 68 and for communicating with other devices, such as a DASD array controller or communication channel 44 interface, for example, are also typically mounted to the circuit card 124. The actuator voice coil motor produces a torquing force on the actuator coil assembly 123 when control currents of varying direction and magnitude flow in the coil assembly 123 in the presence of a magnetic field produced by the permanent magnet structure 120. The torquing forces imparted on the actuator coil assembly 123, in turn, cause corresponding rotational movement of the actuator arms 112 in directions dependent on the polarity of the control currents flowing in the coil assembly 123. The DASD controller 67 preferably includes control circuity to coordinate the transfer of data to and from the data storage disks 108, and cooperates with the actuator voice coil motor to move the actuator arms 112 and transducer/slider assemblies 116 to prescribed locations on the disk 108 when writing and reading data to and from the disks 108.

Figure 15:
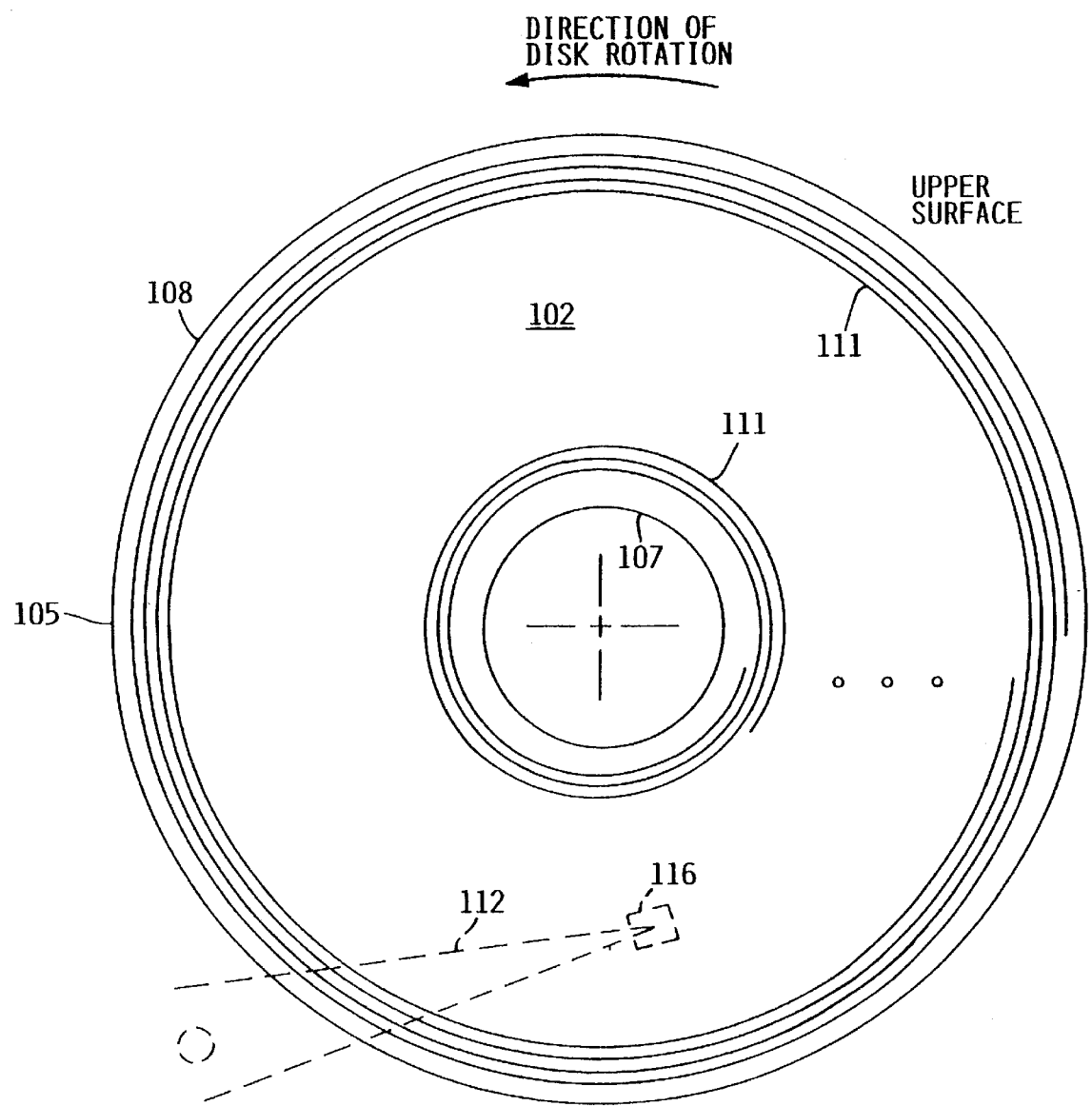
FIG. 15 is an illustration of a novel data storage architecture for buffering synchronously and asynchronously ordered discrete source program segments on an outwardly spiralling data track disposed on an upper surface of a data storage disk.
Figure 16:
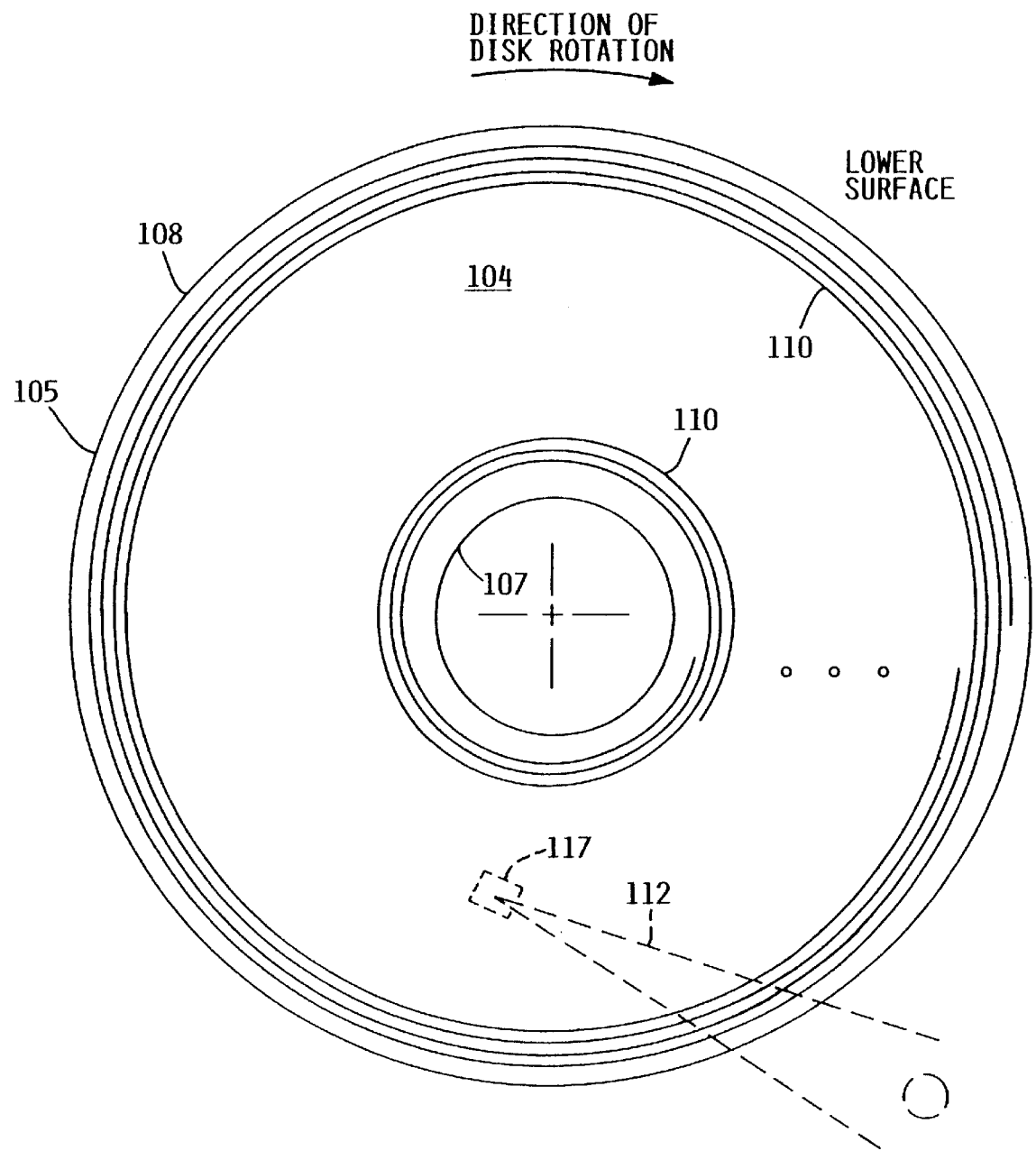
FIG. 16 is an illustration of a novel data storage architecture for buffering synchronously and asynchronously ordered discrete source program segments on an inwardly spiralling data track disposed on a lower surface of a data storage disk.

Referring now to the embodiment illustrated in FIGS. 15 and 16, video data transferred from the set-top controller 64 to the multimedia DASD 68 is preferably stored on both the upper surface 102, shown in FIG. 15, and lower surface 104, shown in FIG. 16, of the data storage disks 108. Upper and lower transducer/slider assemblies 116 and 117 are preferably provided for respectively writing and reading data to and from each of the upper and lower disk surfaces 102 and 104. It is noted that the number of data storage disks 108 may vary, and that it is not generally essential to utilize both disk surfaces 102 and 104 for purposes of storing the video data. Further, only a portion of a disk's data band may be allocated for purposes of storing video segment information, while reserving other portions of the data band for storing other types of information. Also, several non-contiguous portions of the data band may be utilized for storing video data.

With further reference to FIGS. 15 and 16, there is shown in greater detail a preferred orientation of the data tracks disposed on the upper and lower disk surfaces 102 and 104, respectively. FIG. 15 depicts the upper surface 102 of the disk 108 as viewed from above, while FIG. 16 depicts the lower surface 104 of the disk 108 as viewed from below. For clarity of orientation with respect to FIGS. 15 and 16, the direction of disk rotation is indicated by the arrows, and the actuator arms 112 are shown outlined against the respective disk surfaces 102 and 104. In a preferred embodiment, the data tracks of the upper and lower disk surfaces 102 and 104 respectively include spiral data tracks 111 and 110 for storing video information and other data. As discussed previously, the advantages of the novel media-on-demand communication system described herein are addressed with general reference to a video program for purposes of explanation, and not of limitation. Accordingly, the preferred spiral data track configuration illustrated in FIGS. 15 and 16 may be employed to store audio, textual, graphical, image, animation, and combinations of these and other types of multimedia information.

The spiral data track 110 disposed on the lower surface 104 of the disk 108 preferably contains a sequence of data storing blocks originating near the outer edge 105 of the disk 108 and spiraling inwardly toward the inner edge 107 of the disk 108. A spiral data track 111 disposed on the upper surface 102 of the disk 108 preferably contains a sequence of data storing blocks originating near the inner edge 107 of the disk 108 and spiraling outwardly toward the outer edge 105 of the disk 108. It is to be understood that only a portion of the data band may be formatted to include spiral data tracks, and that this spiral formatted portion may be situated at any radial location on the disk surface. It may be advantageous in other configurations to allocate the entire data band for the purpose of storing multimedia data in spiral data tracks. The portion of a data band formatted to include spiral data tracks for storing multimedia data will hereinafter be defined as the data band portion disposed between an inner spiral diameter location (ISDL) and an outer spiral diameter location (OSDL) on a surface of a data disk 108.

Data tracks 110 and 111 additionally contain a plurality of servo sectors interleaved with the data storing blocks to enable the DASD controller 67 to identify track location and to follow the centerline of the data track. It is noted that various known methods for effectuating data track following using embedded servo sectors are known in the art. It is further noted that only portions of the data tracks 111 and 110 are depicted in FIGS. 15 and 16, and that the tracks are exaggerated in size and configuration for illustrative purposes. It should be understood that a pair of recording data surfaces having oppositely spiraled data tracks need not necessarily be located on opposite sides of the same disk 108. In an alternative configuration, both surfaces of one disk may be formatted with inwardly spiraling data tracks, while both surfaces of another disk may be formatted with outwardly spiraling data tracks.

An important advantage of the spiral data track configuration illustrated in FIGS. 15 and 16 concerns the obviation of the need to perform rapid seek operations, primarily because the video data is formatted in long spiralled data tracks. The novel multimedia DASD 68 normally operates by writing and reading video data progressively along a predefined length of the spiral tracks from beginning to end. As such, the actuator voice coil motor need not perform rapid seek operations typically associated with data storage disks 108 formatted with a plurality of concentric data tracks in accordance with a conventional data storing configuration. Accordingly, the actuator voice coil motor of a novel multimedia DASD 68 is generally considerably smaller than that of a conventional DASD, thereby reducing the cost, weight, and power consumption of the multimedia DASD 68. Improved tracking is also realizable due a substantial reduction in the amount of mechanical vibration and undesirable resonance resulting primarily from the elimination of rapid seek operations.

Further, a conventional DASD employs a spindle motor 114 that is designed to rotate one or more data storage disks 108 at a high rate of speed in order to minimize latency time when accessing data. Latency time is generally understood as a period of delay associated with the amount of time required to rotate a specific data storage area on the disk surface into proximity with a read/write transducer. A spindle motor of a conventional DASD employing 3.5" data storage disks 108, for example, typically rotates the disks at a rate of approximately 5,400 to 7,200 RPM, and represents a major power consuming component of the conventional DASD. In accordance with one embodiment, the spindle motor 114 of the multimedia DASD 68 rotates the disks 108 at nominal rotational rates of 3,600 RPM or lower. Accordingly, a substantial reduction in the size, power consumption, cost, and complexity of a multimedia DASD 68 adapted for providing full VCR-type control over the presentation of a requested multimedia program is realizable.

It is noted that presentation control windows 90 of longer duration will generally require higher disk 108 rotation rates, as indicated by the formatting equations and guidelines developed by the inventors and disclosed hereinbelow. For a relatively low-cost DASD 68, it may be desirable to design the spindle motor 114 to operate at a fixed speed, such as 3,600 RPM, for example. For other configurations employing an air bearing to support the transducer/slider assembly 116, it may be desirable to rotate the disk 108 at a rotational rate sufficient to ensure that a nominal disk-to-transducer clearance distance is maintained on the air bearing. The particular aerodynamic characteristics of the transducer/slider assembly 116 will, of course, become an important factor in determining the nominal flying height of the transducer/slider assembly 116 above the rotating disk 108 and the corresponding desired spindle motor 114 rotation rate. In an embodiment of the multimedia DASD 68 that employs a lubricant-based system for reducing static and dynamic friction between the disk surface 108 and a constant contact-type transducer/slider assembly 116, disk velocities significantly lower than 1,200 RPM may be advantageous for reducing the size, cost, and power demands of the DASD 68. A load/unload ramp 117 is generally employed to unload the transducer/slider assembly 116 from the lubricated disk surface during periods of extended non-use.

For example, disk 108 rotational rates at or near zero velocity may be desirable during a pause presentation mode. Also, the rotational rate of the spindle motor 114 and disks 108 may be varied depending on the type of multimedia information being buffered by the DASD 68. In such a case, the nominal rate of disk 108 rotation may be determined by the DASD controller 67 or by the set-top controller 64. It is noted that the nominal disk 108 rotation rate may be selected from a range of suitable rotation rates which are typically dictated by the flying characteristics of the particular transducer/slider assembly 116 employed. Also, the optimal portion of the disk data band allocated for storing the video data may be determined by the DASD controller 67. Depending on the particular transducer/slider assembly 116 flying characteristics, the optimal data band location may be situated at an outer diameter disk location, an inner diameter disk location, or an intermediate diameter disk location. It is noted that a nominal disk 108 rotation rate should be appropriately selected to ensure that the output buffer 72 and decoder 74 are provided with a sufficient rate of video data input to assure uninterrupted presentation of the multimedia information. It is further noted that lower disk 108 rotational rates generally correspond to lower sampling rates of the servo information typically embedded between information storing sectors on the surface of the disk 108. As such, a nominal spindle motor 114 rotation rate should be selected to provide a sufficiently high servo information sampling rate.

Another important advantage of the preferred spiral data track configuration illustrated in FIGS. 15 and 16 concerns a significant increase in the linear bit density of a data storage disk 108. The spiral data tracks 110 and 111 are typically narrower than conventional concentric data tracks, thus affording a significant increase in track density for each surface of the disk 108. In a conventional DASD, for example, the width of a data track becomes a limiting factor on the seek time of the DASD. When the actuator performs a seek to locate a new track, it must generally decelerate and settle to a position in which it is following the centerline of the data track. Generally, a longer period of time is required for the actuator to settle at the end of a seek operation for narrower track widths, thereby increasing the overall seek time of the DASD. In accordance with a preferred spiral data track configuration of the novel multimedia DASD 68, no such seek operations are performed, and, as a result, the time required for the actuator 112 to settle is no longer a significant factor that might otherwise limit the degree to which the track width can be reduced.

Another reason increased data density is realizable when storing multimedia data on the disk 108 of a multimedia DASD 68 concerns the relatively low data error rate associated with multimedia data as contrasted to conventionally stored digital data. It is well-understood that even slight alterations to conventional digital data resulting from soft and hard read errors can have adverse results of varying severity. In the case of multimedia data, however, read error rates on the order of several magnitudes higher than those allowable for conventional data are generally acceptable. In many multimedia applications, for example, audio and video information must generally be transferred from the data storage disk 108 to the viewers television 24 or monitor. In general, a read error associated with multimedia data storage in a DASD 68 typically results in only a minor degradation in the quality of the effected audio or video presentation. Many read errors are often imperceivable to the viewing or listening observer. Moreover, various signal processing and smoothing techniques may be employed to enhance the audio and video presentation upon the occurrence of a hard read error, thereby making the hard read error imperceivable to the viewed or listener.

It is therefore possible to substantially increase the data density of a multimedia data storage disk 108 by tolerating higher read error rates. In a preferred embodiment, a 3.5" data storage disk 108 is employed having a linear bit density of approximately 165 Kbpi (Kilobits per inch). It is noted that more data can be stored per linear unit of track length in a spiral data track in comparison to conventional concentric tracks due to increased formatting efficiency. By eliminating the need to perform seek operations, certain information in the data sector headers and servo sectors is no longer needed. In particular, it is possible to eliminate the gray code track identifier in each servo sector which is normally used to identify tracks when performing seek operations in a conventional DASD. It is also possible to eliminate track identifying information in the data servo headers. Although it may still be desirable to include track identifying information at intervals, such as an index mark per disk revolution, this information requires substantially less storage space when compared to including a conventional gray code track identifier in each of the embedded servo sector headers. It is believed that the combined benefits of increased linear data density and improved formatting efficiency can more than double the total amount of data that can be stored on a spiral disk 108 surface in comparison to conventional data storage disks.

In a preferred embodiment, servo sectors are preferably written to the disk 108 in a conventional concentric manner, rather than using a spiral pattern. Preferably, a concentric track of servo sectors is written to the disk surface 108, and, at an index position, the servo writer increments its location by one track width in order to write the next circular track that is concentric with respect to the first track. Successive tracks are written in this manner until the disk surface is completely traversed. Spiral data track reading or writing is preferably accomplished by adding a spiral track position error offset signal to the position error signal generated when reading the servo sectors, where the magnitude of the spiral track position error offset signal is dependent on the angular position of the servo sector with respect to an index position. It is noted that the position error offset signal is often referred to as a feed forward signal which is applied to the actuator servo control to compensate for inherent disk 108 eccentricity. During the servo writing procedure, disk 108 eccentricity is typically measured by reading servo patterns with the actuator 118 usually registered an outer or inner diameter crash stop location. The central aperture of a disk 108 may be slightly askew from the physical central axis of rotation typically resulting from manufacturing tolerance variations and a small amount of disk slippage that often occurs when the disk is rotated after being mounted on the hub of the spindle motor 114. For example, at the index position, the position error offset signal will be zero. As the disk 108 rotates beyond the index position, a spiral track position error offset signal increases in magnitude, and is added to or subtracted from the position error signal, depending on whether the track spirals inwardly or outwardly. At a position 180 degrees from the index position, for example, the magnitude of the offset signal will result in displacement of the actuator by exactly one-half the track width. Concentric servo sectors are preferred because they simplify the task of initially writing servo sectors to the disk surface 108. By writing concentric servo patterns to the disk surface 108, it is possible to write to all disk surfaces in a single pass, regardless of the direction of the spiral. However, it would be alternatively possible to write servo sectors in spiral patterns.

Other advantages realizable when employing spiral data tracks for storing multimedia data, as well as other alternatives approaches for effectuating multimedia data storage on spiral data tracks, are more thoroughly discussed in the previously identified related U.S. patent application Ser. No. 08/288,525 entitled "Apparatus and Method for Providing Multimedia Data."

Multimedia DASD Data Storage Architecture

Local customized control over the presentation of a multimedia program is preferably effectuated by a novel multimedia DASD data storage architecture that provides for the buffering and accessing of non-sequentially ordered and sequentially ordered video segments 54 received from a multimedia server 30 preferably of the type previously described. For purposes of clarity and simplicity of explanation, the novel DASD data storage architecture will be discussed in accordance with a number of assumptions. It is to be understood, however, that these assumptions are for illustrative purposes only, and do not represent limitations as to the scope of the disclosed method and apparatus.

Referring now to FIGS. 15–19, it is assumed, for purposes of explanation, that the multimedia DASD 68 includes a single data storage disk 108 having an inbound spiral data track 110 and an outbound spiral data track 111 respectively disposed on the lower and upper surfaces 104 and 102 of the disk 108. In this illustrative example, the capacity of the presentation control window 90 for effectuating full VCR-type presentation control functions is twenty seconds, and the customer selected movie is two-hours in duration. It is noted that a typical presentation control window 90 in actual use will generally comprise, for example, between a twenty and fifty minute portion of a two-hour multimedia program.

Also, it is assumed that the input buffer 66 of the set-top control system 62 is configured to store two discrete video segments 48. Accordingly, the multimedia server 30 transmits video segment packets containing no more than two video segments 48 to the set-top control system 62 during each transmission window. As discussed previously hereinabove, a set-top control system 62 configuration employing a relatively small input buffer 66 that can store only two video segments 48 represents a relatively low-cost configuration. Such a low-cost configuration typically requires frequent packet transmissions from the multimedia server 30, thereby increasing the service costs associated with receiving multimedia programming from the multimedia server 30.

Further, it is assumed that the MPEG-1 compression standard is employed to obtain compression ratios on the order of 100:1. Also, it is assumed that the two-hour movie has been indexed and parsed into 7,200 discrete compressed video segments 48, with each video segment 48 representing a one second, full-motion video portion of the movie. At an assumed NTSC video frame rate of thirty frames per second, a one second, full-motion video portion of the movie can be compressed on average to approximately 0.167 MB (167 KB). The input buffer, therefore, must include at least 0.334 MB of memory in order to store two 0.167 MB video segments 48. The disk 108 preferably has a diameter of 3.5" and a linear bit density of approximately 165 Kbps. Accordingly, a compressed video segment 48 can generally be stored within two revolutions of the spiral data track 110 or 111.

Assuming that a twenty-second translatable presentation control window 90 is employed, a total of twenty one-second compressed video segments 48 are buffered on the multimedia DASD 68 at any one time. A total of ten one-second compressed video segments 48 respectively define an odd block, Block-A 50, and an even block, Block-B 52. The video segments associated with Block-A 50 and Block-B 52 are respectively stored on each of the lower and upper disk surfaces 104 and 102. It is noted that the two blocks, Block-A 50 and Block-B 52, each encompass approximately twenty revolutions of the spiral tracks respectively disposed on the lower and upper disk surfaces 104 and 102, for a total of forty revolutions for the entire presentation control window buffer 90. Further, it will take approximately two seconds for the actuator 112 to traverse both the inbound and outbound spiral data tracks 110 and 111. One completed progression along the inbound and outbound spiral tracks comprising the presentation control window 90 buffer will be referred to hereinafter as a RUN.

In order to complete one RUN in two seconds for a multimedia DASD 68 employing a single disk 108 in a modulo-2 configuration (e.g., 2 blocks, Block-A 50 and Block-B 52), the disk 108 must be rotated for a total of forty revolutions (2 revolutions/segment×10 segments/surface×2 surfaces=40 revolutions). This corresponds to a relatively slow disk 108 rotation rate of approximately 1,200 RPM (40 revs/2 sec×60 sec/min). As mentioned previously, a typical minimal nominal rate of disk 108 rotation for a DASD 68 configuration employing an air bearing rather than a conformal lubricant bearing generally falls within the range of approximately 1,600 RPM to 1,800 RPM.

Figure 17:
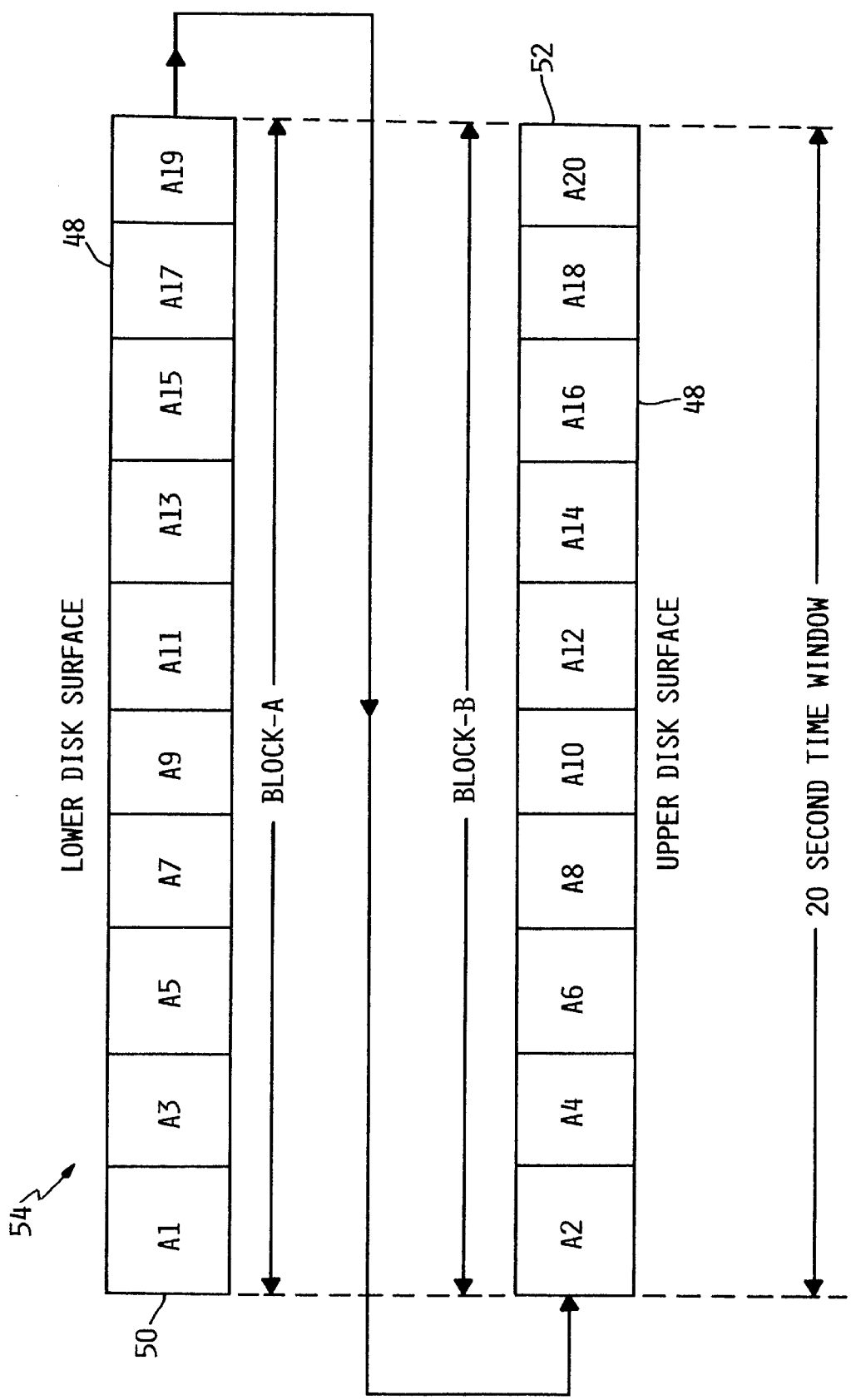
FIG. 17 is an illustration of the first twenty asynchronously ordered source program segments defining a twenty second presentation control window buffer to be distributed on a lower and an upper surface of a data storage disk, with each discrete source program segment being representative of a one-second time portion of a multimedia program.
Figure 19A:
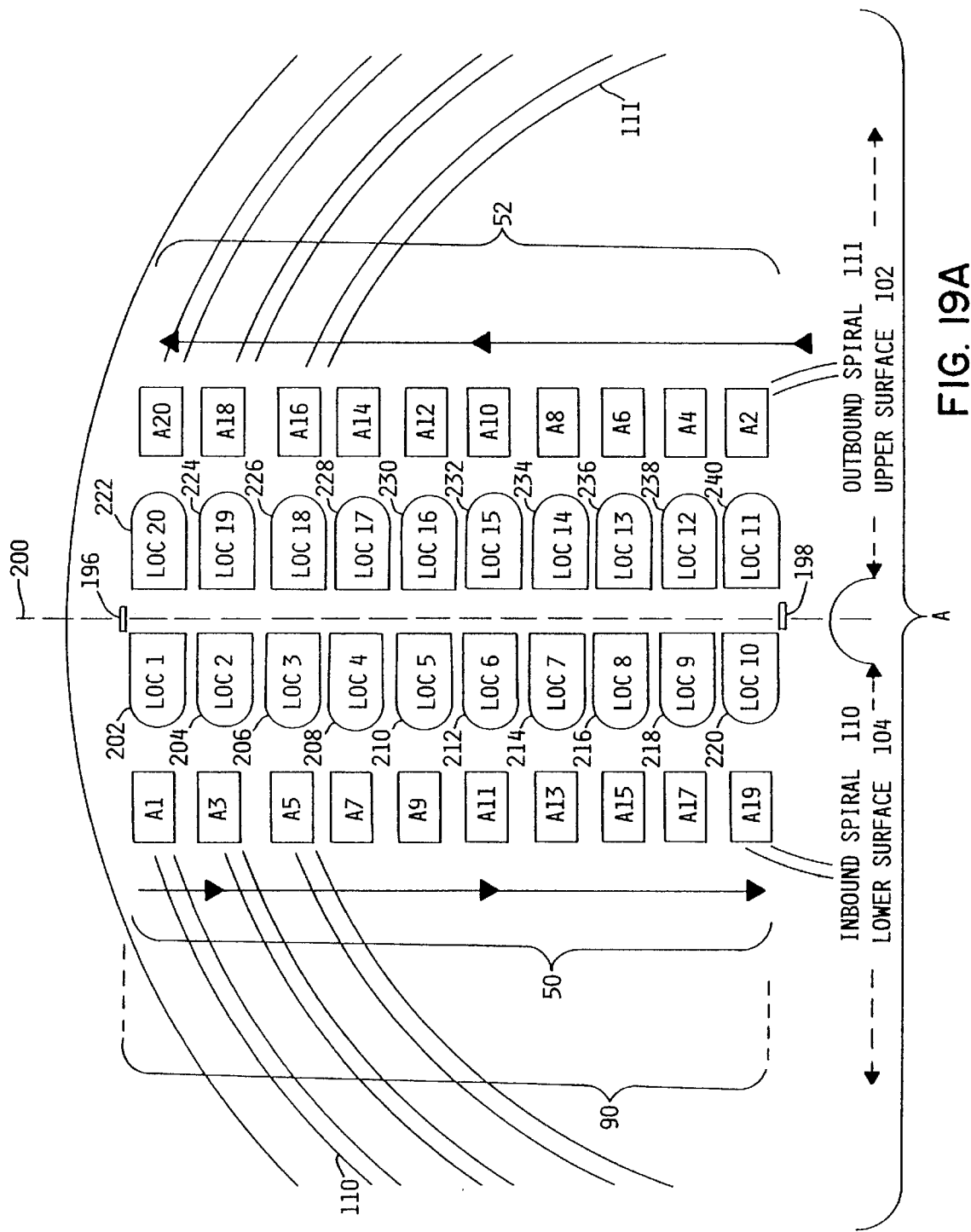
FIG. 19a–FIG. 19b are a composite illustration of a lower surface of a data storage disk superimposed along side of an upper surface of the data storage disk, with ten data storage locations disposed on each of the lower and upper disk surfaces for buffering at any one time twenty discrete source program segments comprising a twenty second presentation control window buffer in accordance with a novel formatting methodology.
Figure 19B:
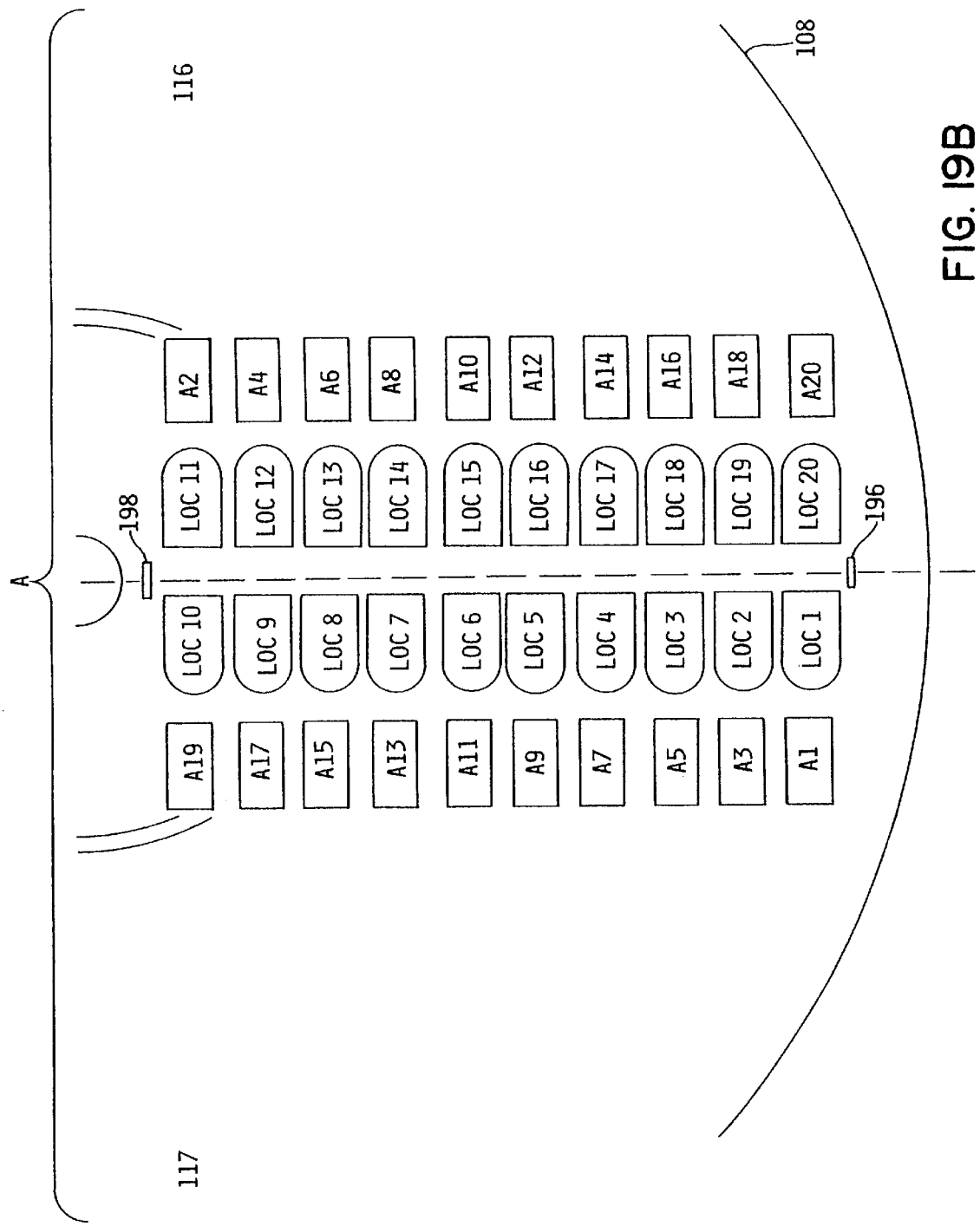
Figure 21:
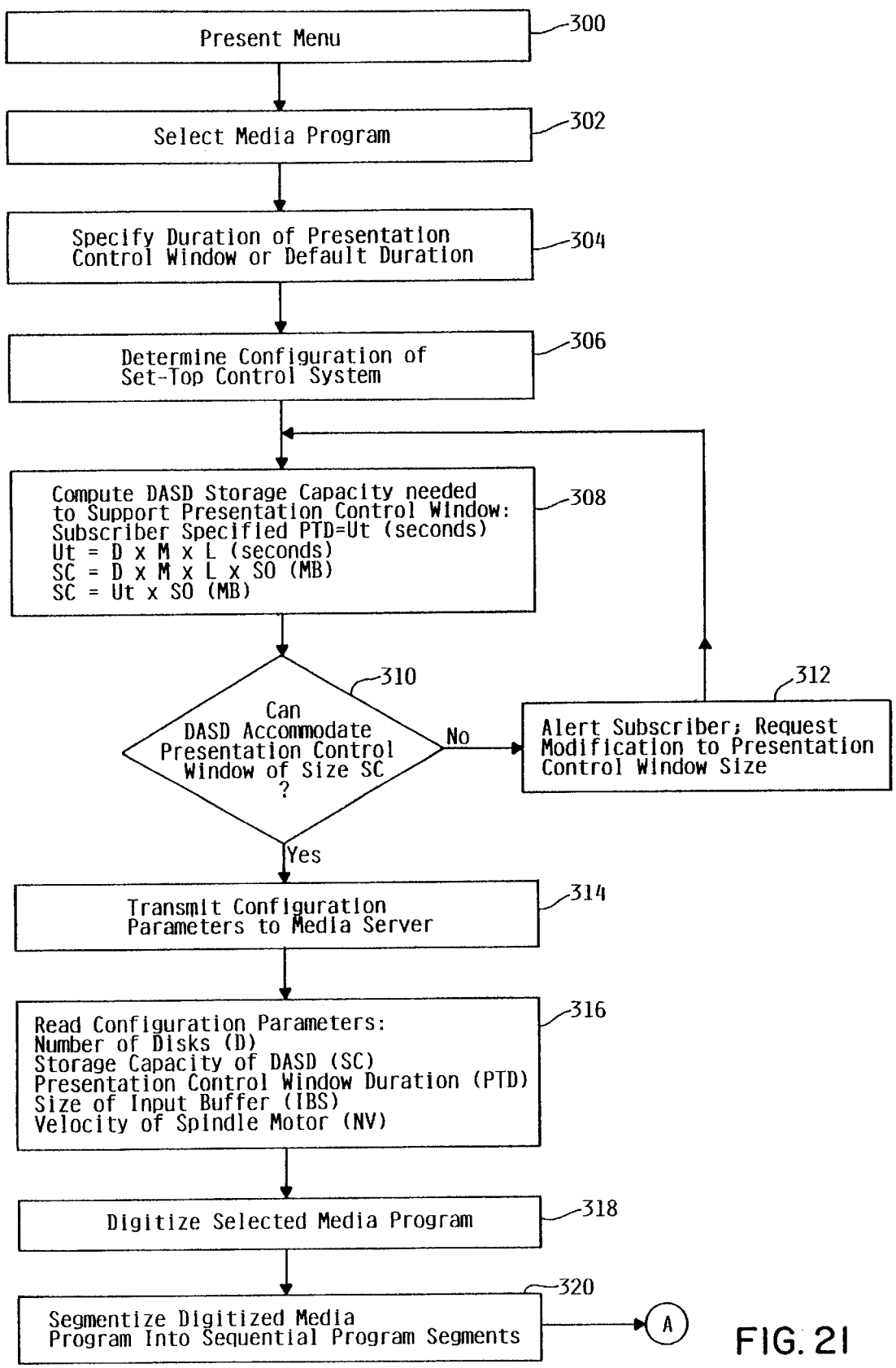
FIGS. 21–22 are flow charts depicting general processing steps performed by a novel multimedia server when communicating with a subscriber's set-top control system to provide on-demand transmission of source program segments representative of a multimedia program in accordance with configuration parameters associated with the configuration of a presentation control window buffer provided on a novel multimedia direct access storage device of the subscriber's set-top control system.

Referring now in detail to FIGS. 17–19, there is illustrated one embodiment of a novel DASD data storage architecture by which discrete video segments 48 comprising of video signal bitstream are asynchronously written to and read from spiral data tracks 110 and 111 respectively disposed on a lower and upper surface 104 and 102 of a data storage disk 108. As previously mentioned with respect to FIG. 8, the twenty second presentation control window 90 is shown in FIGS. 17–19 as comprising one odd block, Block-A 50, of video segments 48 having odd address indices, and one even block, Block-B 52, of video segments 48 having even address indices. In this embodiment, the video segments 48 defining Block-A 50 are preferably written to and read from the inbound spiral track 110 disposed on the lower surface 104 of the data storage disk 108. The video segments 48 defining Block-B 52 are preferably written to and read from the outbound spiral track 111 disposed on the upper surface 102 of the disk 108. It is to be understood that Block-A 50 and Block-B 52 may be written to either of the upper and lower disk surfaces 102 and 104, respectively.

The translatable presentation control window 90, shown in the composite illustration of FIG. 19, can be viewed as comprising a total of twenty storage locations, with ten contiguous storage locations respectively disposed on each of the lower and upper disk surfaces 104 and 102. For purposes of explanation, the storage locations disposed on the lower disk surface 104 are superimposed onto the upper disk surface 102 along a central axis 200 of the disk 108 in the composite illustration provided in FIG. 19. As illustrated, Location-1 through Location-10 define Block-A 50 disposed on the inbound spiral track 110 of the lower disk surface 104, while Location-11 through Location-20 define Block-B 52 disposed on the outbound spiral track 111 on the upper disk surface 102. Further, the disk 108 surface area allocated to support the twenty second presentation control window 90 is preferably defined in a data band between an outer spiral diameter location (OSDL) 196 and an inner spiral diameter location (ISDL) 198. As discussed previously hereinabove, this data band may, for example, be located at any diameter location on a disk surface, on any disk of a DASD 68 employing multiple disks, or at a disk location where the transducer/slider assembly 116 is supportable by a suitably well-developed air bearing.

In general, a lower transducer 117 sweeps over storage Locations 1–10 disposed on the inbound spiral track 110 of the lower disk surface 104 from the OSDL 196 toward the ISDL 198. After a head switch operation is performed at the ISDL 198, an upper transducer 116 sweeps over storage Locations 11–20 disposed on the outbound spiral track 111 of the upper disk surface 102 until the OSDL 196 is reached. The progression of the lower and upper transducers 117 and 116 respectively along the inbound and outbound spiral tracks 110 and 111 is respectively shown by the direction arrows provided in FIG. 19. This process of sweeping over one surface of the disk 108, performing a head switch operation, and then sweeping over another disk surface is continuously repeated. The video segments 48 received from the set-top controller 64 and transferred to the multimedia DASD 68 are preferably asynchronously written to and read from the storage locations 1–10 and 11–20 in accordance with a novel formatting methodology disclosed hereinbelow.

Initially, it is assumed that an asynchronous video bitstream 54 has been received by the set-top controller 64, and that none of the video segments 48 comprising the video bitstream 54 have yet been transferred to the multimedia DASD 68. It is noted that storage locations 1–20 are indicated along the vertical or Y-axis of FIG. 18, and that each column along the horizontal or X-axis indicates a particular RUN number. Each RUN, as mentioned previously, represents one complete progression through the storage locations of the inbound spiral track 110 of the lower disk surface 104, and, after performing a head switch operation, a complete progression through the storage locations of the outbound spiral track 111 of the upper disk surface 102. It is noted that the operation of writing a video segment 48 to a particular storage location is indicated in FIG. 18 by the letter "W," and the operation of reading a video segment 48 from a particular storage location is indicated by the letter "R." It is further noted that storage locations containing the letter designator "S" indicate that these storage locations contain a previously written video segment 48, and are skipped by the transducer when sweeping over the inbound and outbound spiral tracks 110 and 111 defining the presentation control window 90. The term skipping refers to a transducer neither writing (W) to or reading (R) from a particular storage location during a particular RUN.

One important feature of the novel DASD data storage architecture concerns the writing of a video segment 48 to the DASD 68 while concurrently transferring the same video segment 48 to the decoder 74 for virtually instantaneous presentation on a subscriber's television 76. This concurrent transferring operation preferably continues until such time as the first storage location defined on each of the disk surfaces contains at least one video segment 48. Thereafter, video segments 48 are preferably transferred to the output buffer 72 and decoder 74 exclusively from the DASD 68, except in the event that a forward or reverse operation cannot be satisfied within the presently defined presentation control window 90, thus requiring transmission of additional video segment 48 information from the multimedia server 30.

Presentation Control Window Architecture

Still referring to FIGS. 18 and 19 in detail, it remains assumed that the set-top controller 64 receives a video bitstream 54 comprising a non-sequential series portion of discrete video segments 48, that the input buffer 66 is configured to store a maximum of two one-second video segments 48, and that the presentation control window buffer 90 is defined as being twenty seconds in duration or capacity. Starting with RUN 1, the set-top controller 64 preferably coordinates the transfer of the first one-second segment A1 from the input buffer 66 concurrently to the multimedia DASD 68 and the decoder 74 to provide for instantaneous displaying of the first segment A1 on the subscribers television 76. It is noted that the video segments 48 transferred directly from the input buffer 66 to the decoder 74 may also be temporarily buffered in the transfer buffer 70 prior to being transferred to the output buffer 72 and subsequently to the decoder 74. It is further noted that data unrelated to the selected multimedia program may also be received by the input buffer 66 and transferred to the transfer buffer 70 for subsequent storage on the DASD 68 or transmission to the output buffer 72.

Information representative of a picture-in-picture-type dialogue message annunciating the reception of an incoming communication from a source other than the multimedia server 30, for example, may be received by the input buffer 66 and transferred to the transfer buffer 70 and/or the output buffer 72 for immediate decoding by the decoder 74 and displaying on the attached television 76. Such unrelated information received by the input buffer 66 and transferred to the transfer buffer 70 may also be stored on the DASD 68 during periods of transducer 116 or actuator 118 idleness. The rate at which multimedia program data is written to and read from the DASD 68 may also allow for dual tasking by the actuator 118 between operations associated with transferring video segment data to and from the DASD 68 and operations associated with transferring data unrelated to the video segment data to and from the DASD 68.

The concurrent operations of writing the first one-second video segment A1 to Location-1 202 and transferring the video segment A1 to the decoder 74 and display 76 for RUN 1 is indicated by the letter designator "WR" in FIG. 18. After writing video segment A1 to the first physical storage location on the inbound spiral track 110, identified as Location-1 202, the next contiguous storage location, Location-2 204, on the inbound spiral track 110 rotates into proximity with the lower transducer 117. The video segment A3 is then physically written to storage Location-2 204. After writing video segment A3 to storage Location-2 204, the lower transducer 117 follows the inbound spiral track 110 on the lower disk surface 104 until an ISDL 198 is reached. It is noted that the presentation control window 90 is defined as the portion of the inbound and outbound spiral tracks 110 and 111 defined between the OSDL 196 and the ISDL 198. Having reached the ISDL 198, a head switch is performed to de-activate the lower transducer 117 and to activate the upper transducer 116 also registered at the ISDL 198.

At Location-11 240 of the outbound spiral track 111 of the upper disk surface 102, video segment A2 is simultaneously transferred to Location-11 240 and to the decoder 74 for instantaneous presentation on the television 76. The set-top controller 64 preferably coordinates the operation of the output buffer 72 and the decoder 74 to ensure that video segments 48 buffered in the output buffer 72 are transferred to the decoder 74 at a prescribed transfer rate sufficient to provide uninterrupted presentation of each of the one-second video segments buffered in the presentation control window 90. When storage Location-12 238 rotates into proximity with the upper transducer 116, video segment A4 is written to storage Location-12 238. After writing video segment A4 to storage Location-12 238, the upper transducer 116 progresses along the outbound spiral track 111 until the OSDL 196 is reached, at which point another head switch is performed to activate the lower transducer 117 in proximity with the lower disk surface 104. Having now completed RUN 1, the operations associated with RUN 2 are disclosed.

After performing the head switch from the upper transducer 116 to the lower transducer 117, the lower transducer 117 preferably skips storage Location-1 202, which currently contains video segment Al. Upon reaching Location-2 204, the lower transducer 117 reads video segment A3 from storage Location-2 204, which is then transferred to the decoder 74 and display 76. As such, the initially asynchronously stored video segments A1, A2, and A3 have now been displayed in accordance with their original sequential order. As the lower transducer 117 progresses along the inbound spiral track 110 toward the ISDL 198, video segments A5 and A7 are respectively written to Location-3 206 and Location-4 208. Upon reaching the ISDL 198, another head switch is performed, thus bringing the upper transducer 116 into proximity with Location-11 240. The upper transducer 116 then skips Location-11 240, reads previously written video segment A4 from Location-12 238, and then writes video segments A6 and A8 respectively to Location-13 236 and Location-14 234. Video segment A4 read from Location-12 238 is transferred to the output buffer 72 and then to the decoder 74 for sequential presentation on the television 76 immediately following presentation of the previously read video segment A3. The upper transducer 116 continues along the outbound spiral track 111 until the OSDL 196 is reached.

Briefly, the operations associated with RUN 3, which commence at the OSDL 196 after completion of an upper to lower transducer head switch, include skipping Location-1 202 and Location-2 204, reading video segment A5 from Location-3 206, skipping Location-4 208, and writing video segments A9 and A11 respectively to Location-5 210 and Location-6 212. After a head switch performed at the ISDL 198, the upper transducer 116 traverses the outbound spiral track 111 and skips Location-11 240 and Location-12 238, reads previously written video segment A6 from Location-13 236, skips Location-14 234, and writes video segments A10 and A12 respectively to Location-15 232 and Location-16 230. The upper transducer 116 progresses through the outbound spiral track 111 until the OSDL 196 is again reached. The storage locations of the disk 108 associated with RUN 4 and RUN 5 are similarly written to and read from in accordance with the operations depicted in FIG. 18.

At the end of RUN 5, video segment A20 is written to Location-20 222 on the outbound spiral track 111 of the upper disk surface 102. Accordingly, all of the first twenty one-second video segments 48 comprising the twenty second presentation control window 90 have been written to the disk 108 of the multimedia DASD 68 at the completion of RUN 5. It is also noted that, at the end of RUN 5, the first column C1 of the customized matrix 51 illustrated in FIG. 8 has now been buffered in the inbound and outbound spiral tracks 110 and 111 of the data storage disk 108 constituting the twenty second presentation control window 90.

Update-in-Place Architecture

After RUN 5, the novel multimedia DASD 68 employs a unique update-in-place formatting architecture and methodology to effectively move, or temporally translate, the virtual presentation control window 90 forward or backward in time. In general, as the subscriber progresses forward through the two-hour movie, video segments 48 previously stored on the multimedia DASD 68 will be replaced by newly received video segments 48 transmitted over the communication channel 44. As such, the novel interleaved DASD 68 formatting architecture and methodology essentially operates as an asynchronous, data storage disk FIFO (First-In-First-Out) buffer when progressing through the movie in a forward temporal direction.

Referring now to RUN 6, illustrated in FIG. 18, video segment A1 previously stored at Location-1 202 is replaced, or written over, by newly received video segment A21. After transferring the video segment A21 to Location-1 202, the lower transducer 117 skips Location-2 204 through Location-5 210, reads video segment A11 from Location-6 212, and then skips Location-7 214 through Location-10 220. A head switch is performed, and the upper transducer 116 writes segment A22 to Location-11 240, thus writing over previously stored video segment A2. The upper transducer 116 skips Location-12 238 through Location-15 232, reads video segment A12 from Location-16 230, and then skips Location-17 228 through Location-20 222, thus completing RUN 6. As can be seen in FIG. 18, previously written video segments are eventually replaced by newly received video segments 48 during each subsequent RUN. In this manner, the novel formatting methodology allows for simultaneous reading and updating of multimedia program data buffered by the DASD 68 in accordance with the temporal progression of the translatable presentation control window 90.

An important advantage of the novel update-in-place formatting architecture and methodology concerns the ease by which a subscriber may move in a forward or a reverse temporal direction within the portion of the multimedia program stored within the presentation control window 90. For example, during RUN 8, video segment A15 stored at Location-8 216 will be read from the inbound spiral track 110 and transferred to the decoder 74 for presentation on the television 76. When desired, the subscribing viewer can also select any of the neighboring video segments on the inbound spiral track 110, including video segments A7, A9, A11, A13, A17, A19, A21, A23, and A25. From the subscriber's point of view, this will have the appearance of selectively moving in either a forward or reverse temporal direction with respect to video segment A15 by two-second increments. By way of further example, if video segment A21 in RUN 8 is selected and the subscriber desires to review the next video segment A22, then video segment A22 will be read from the outbound spiral track 111 on the upper disk surface 102, thus appearing as if six-seconds of the movie were skipped. Preferably, a subscriber actuates a forward or reverse control button on an IR remote control handset 25 in order to effectuate forward or reverse temporal movement within the presentation control window 90.

Spiral-and-Hold Architecture

The multimedia DASD 68 preferably performs a novel spiral-and-hold operation when a subscribing viewer initiates a forward, reverse, or pause presentation control operation or when an output buffer 72 overflow condition is imminent. It is noted that activation of a pause button on the IR remote control handset 25 will generally result in freezing of the current image displayed on the subscriber's television 76. Upon initiation of a pause command, the decoder 74 preferably halts the decoding operation under the control of the set-top controller 64. Also, in cases where forward and reverse searches are initiated by the viewer, certain situations may occur where the physical spiral track storage location of one or more desired video segments rotates into proximity with the transducer before the output buffer 72 can accept the additional video segment 48 data without overflowing. In order to prevent the output buffer 72 from overflowing in such situations, a novel spiral-and-hold operation is performed.

In accordance with the novel spiral-and-hold operation, the actuator servo control of the DASD 68 preferably transitions from a spiral track following mode to a cylindrical track following mode. The cylindrical track following mode is electronically effectuated by changing the reference position error signal from a wedge or ramp signal to a constant position error signal. This can be accomplished by transmitting only the reference position error signal, also termed the feed forward signal as previously discussed, to the actuator servo control without transmitting the spiral track position error offset signal. The constant reference signal will cause the actuator servo control to transition into a cylindrical track following mode, while a positive or negative ramp signal will transition the actuator servo control into a spiral track following mode required to follow an inbound or outbound spiral track.

5 The DASD controller 67 preferably transmits either one of the ramp or constant position error signals to the actuator servo control to respectively effectuate the spiral and cylindrical track following modes in response to the state of the output buffer 72. If, for example, the output buffer 72 indicates that an imminent overflow condition may occur, the DASD controller 67 preferably transmits a constant position error signal to the DASD 68 actuator servo control to transition the operation mode from a spiral track following mode to a cylindrical track following mode. After sensing that the output buffer 72 overflow condition has been alleviated, or when a viewer desires to resume viewing of the movie after initiating a pause command, the set-top controller 64 preferably transmits a positive or negative going ramp position error signal to the multimedia DASD 68 to resume the spiral track following mode of operation.

Asynchronous Formatting Guidelines

In general, the following formatting parameters and guidelines developed by the inventors are applicable for implementing various embodiments of a novel asynchronous formatting architecture and methodology, examples of which are disclosed herein:

---

Formatting Parameters:

| | |
|---|---|
| D = | Number of disk surfaces used for presentation control window buffer |
| M = | Number of video segment blocks per disk surface used for presentation control window buffer |
| L = | Length of each block in video segments |
| S0 = | Size of each video segment in megabytes |
| R0 = | Number of disk revolutions per video segment |
| T0 = | Decompressed full-motion program time in seconds per video segment |
| P = | Maximum server packet size in number of video segments based on subscriber's input buffer capacity in set-top control system |
| IBS = | Input buffer size in megabytes (preferably, IBS > 2 × P × S0) |

Formatting Equations:

| | |
|---|---|
| Window Storage Capacity (SC) = | D × M × L × S0 (megabytes) |
| Window Duration (PTD) = | D × M × L × T0 (seconds) |
| Spindle Motor Velocity (NV) = | 60 × L × R0/T0 (RPM) (odd and even indexed video segments on same disk surface) |
| Spindle Motor Velocity (NV) = | 60 × M × L × R0/T0 (RPM) (odd and even indexed video segments on different disk surfaces) |
| Block Indexing (BI) = | modulo (D × M) |

Assumptions:

Form Factor: Any direct access storage device form factor
R0 revolutions required to store one average sized compressed video segment S0
Input buffer of set-top control system is preferably configured to store at least two server packets (P) to allow server flexibility when asynchronously transmitting video segment packets (i.e., IBS > 2 × P × S0)

---

EXAMPLE NO. 1

In the illustrative example discussed hereinabove with respect to FIGS. 17–19, the total number of disk surfaces employed to support the twenty second presentation control window buffer 90 is two, thus, D=2. The number of video segment blocks per disk surface is one block (odd Block-A 50 on lower disk surface, even Block-B 52 on upper disk surface), thus, M=1. The length of each block is ten segments, thus, L=10, with each video segment 48 representing one second of decompressed full-motion program time, thus T0=1.0. Assuming an MPEG-1 compression ratio of approximately 100:1, each video segment 48 is compressed to approximately 0.167 MB, thus, S0=0.167 MB, and approximately two disk revolutions of a 3.5" diameter disk 108 are required to store each video segment 48, thus R0 =2.

Applying these formatting parameters, D=2, M=1, L=10, S0=0.167 MB, R0=2, and T0=1.0 to the formatting guideline equations, the following DASD 68 formatting specifications are applicable:

| | |
|---|---|
| Window Storage Capacity (SC) = | 2 × 1 × 10 × 0.167 |
| | 3.34 MB |
| Window Duration (PTD) = | 2 × 1 × 10 × 1.0 |
| | = 20 seconds |
| Spindle Motor Velocity (NV) = | 60 × 1 × 10 × 2/1.0 |
| | 1,200 RPM |
| Block Indexing (BI) = | modulo (2 × 1) |

Also, it is assumed that the input buffer 66 of the receiving set-top control system 62 is configured to store a packet having a maximum size of two video segments 48, thus P=2. Accordingly, the input buffer 66 must have a minimum storage capacity of at least 2×P×S0, or 0.668 MB, and the minimum DASD 68 storage capacity required to accommodate the twenty second translatable presentation control window buffer 90 having a modulo-2 configuration is approximately 3.34 MB.

EXAMPLE NO. 2

By way of further example, it is assumed that for a 3.5" diameter disk having a certain recording density, two tracks (R0=2 revolutions) are required to store one average sized MPEG-1 compressed video segment 48 representative of one second (T0=1) of full-motion video. This corresponds to 0.167 MB of disk space required to store each video segment 48. Assuming that the maximum size of each packet transmitted by the multimedia server 30 is two segments (P=2), the set-top control system's 62 input buffer 66 storage capacity (IBS) should be at least 2×2×0.167 MB, or 0.668 MB, as in the preceding illustrative example. It is further assumed that the DASD 68 includes a single data storage disk 108 or that only two disk surfaces (D=2) are dedicated to support media-on-demand services. If each disk surface is formatted to include two blocks per disk surface (M=2) and five video segments 48 per block (L=5), then the rotational spindle velocity is computed as NV=60×L×R0/T0=60×5× 2/1.0=600 RPM for odd and even indexed video segments 48 being buffered on the same disk surface. For a configuration in which odd and even indexed segments 48 are formatted on different disk surfaces, the spindle motor rotational velocity is computed as NV =60×M×L×R0/T0= 60×2×5×2/1.0=1,200 RPM. The duration of the presentation control window 90 is computed as PTD=D×M×L×T=2×2× 5×1=20 seconds, and its storage capacity is computed as SC=D×M×L×S0=2×2×5×0.167 MB=3.34 MB.

EXAMPLE NO. 3

As a more realistic example associated with the DASD 68 described above using two disk surfaces dedicated for video-on-demand, it is assumed that a thirty minute presentation control window 90 is desired. This would require storage for 30 min×60 sec/min=1,800 one-second (T0=1.0) compressed video segments 48, and, assuming R0=2, a total of 2×1,800=3,600 tracks, or 1,800 tracks per each of two disk surfaces (D=2), would have to be allocated to support the thirty minute presentation control window 90. Of the numerous ways of disk 108 formatting available, it is assumed that both odd and even indexed video segments 48 are formatted on the same disk surface, with thirty segments populating each block (L=30) and sixty blocks formatted on each disk surface (M=60). The corresponding spindle velocity is computed as NV=60×30×2/1.0=3,600 RPM, which is generally recognized as an industry standard for DASD 68 spindle motor velocity. Assuming conventional track densities for a 3.5" diameter disk at over 4,000 tracks per disk surface, the presentation control window buffer 90 described in this example will only occupy less than one-half of the data band of the 3.5" diameter disk 108. The required disk storage capacity for this application would be approximately 300 MB. It is to be understood, of course, that different formatting configurations will often be required for DASDs 68 having form factors other than those that include a 3.5" diameter disk 108, such as those employing 2.5" or 1.8" diameter disks 108.

EXAMPLE NO. 4

By way of further example, higher degrees of interleaving are achievable when the video segments 48 are formatted in the DASD 68 in accordance with a modulo-4 formatting methodology for a single disk 108. Assuming that a subscriber specifies a forty second presentation control window 90 and receives video segments 48 corresponding to the customized matrix 51 depicted in FIG. 9, and further assuming that each video segment 48 represents two seconds of non-compressed, full-motion video which are received in packets having a maximum size of five video segments 48, the first twenty two-second video segments 48 populating the four blocks comprising the customized matrix 51, Block-A 53, Block-B 55, Block-C 57, and Block-D 59, would be formatted modulo-4 on the DASD 68 as follows:

Block-A: A1, A5, A9, A13, A17
Block-B: A2, A6, A10, A14, A18
Block-C: A3, A7, A11, A15, A19
Block-D: A4, A8, A12, A16, A20

The video segments 48 associated with Block-A 53 and Block-B 55 are preferably written to and read from, for example, the lower surface 104 of the disk 108, while the video segments 48 associated with Block-C 57 and Block-D 59 are written to and read from the upper disk surface 102. Applying the applicable parameters (D=2, M=2, L=5, S0=0.334 MB, R0=4, T0=2.0, and P=5) of this modulo-4 formatting example to the general formatting equations, the following DASD 68 formatting specifications are applicable:

| | |
|---|---|
| Window Storage Capacity = (SC) = | 2 × 2 × 5 × 0.334<br>6.68 MB |
| Window Duration (PTD) =<br>= | 2 × 2 × 5 × 2.0<br>40 seconds |
| Spindle Motor =<br>Velocity (NV) = | 60 × 10 × 4/2.0<br>1,200 RPM |
| Block Indexing (BI) =<br>= | modulo 2 × 2<br>modulo-4 |

Thus, the minimum DASD 68 storage capacity required to accommodate the forty second translatable presentation control window 90 buffer having a modulo-4 configuration is approximately 6.68 MB.

It may be desirable to configure the multimedia DASD 68 to include a plurality of data storage disks 108 to increase the storage capacity of the DASD 68 and the duration of the multimedia program bufferable in the presentation control window 90. It is to be understood that all or portions of the DASD 68 disk storage surfaces may be allocated to accommodate the presentation control window 90 for purposes of providing local VCR-type control of multimedia program presentation. Other portions of the DASD 68 disk storage surfaces may be allocated for storing text files, application software, and other data associated with typical usage of a conventional DASD. The DASD 68 storage surfaces may include concentric and spiral data track portions to accommodate a variety of data storing needs. Accordingly, additional data storage disks 108 provide for increased DASD 68 storage capacity that may be allocated for a number of differing purposes.

In a DASD 68 configuration employing four disks 108, for example, the transducers will progress along the inbound and outbound spiral tracks preferably disposed on each of the lower and upper disk surfaces, thus weaving in and out of the stack of disks 108. As previously mentioned, a pair of disk surfaces having oppositely spiraled data tracks need not necessarily be located on opposite sides of the same disk 108. For example, both surfaces of one disk may be formatted with inwardly spiraling data tracks, while both of the surfaces of another disk may be formatted with outwardly spiraling data tracks.

EXAMPLE NO. 5

By way of further example, an embodiment of a multimedia DASD 68 suitable for providing a forty minute presentation control window 90 for effectuating full VCR-type presentation control over a forty minute portion of a two-hour video program preferably includes four disks 108 for buffering one-second compressed video segments 48 formatted modulo-80 thereon. In accordance with this configuration, it is assumed that each surface of the four disks (D=8) will be formatted to include ten segment blocks (M=10) having a segment length of thirty segments (L=30), and that odd and even indexed video segments 48 will be buffered on the same disk surfaces. As such, the following parameters are assumed to apply: D=8, M=10, L=30, S0=0.167 MB, R0=2, T0=1.0, and P=30. Applying these parameters to the formatting guideline equations, the following DASD 68 formatting specifications are applicable:

| | |
|---|---|
| Window Storage Capacity = (SC) = | 8 × 10 × 30 × 0.167<br>400 megabytes |
| Window Duration (PTD) =<br>=<br>= | 8 × 10 × 30 × 1.0<br>2,400 seconds<br>40 minutes |
| Spindle Motor =<br>Velocity (NV) = | 60 × 30 × 2/1.0<br>3,600 RPM |
| Block Indexing (BI) =<br>= | modulo 8 × 10<br>modulo-80 |

Thus, the minimum DASD 68 storage capacity required to accommodate the forty minute translatable presentation control window 90 buffer formatted modulo-80 is approximately 400 MB. The nominal spindle motor 114 velocity for such a configuration is approximately 3,600 RPM. Those skilled in the art will immediately realize that 3,600 RPM represents a relatively slow spindle motor velocity requirement in view of the substantial advantages associated with providing full local VCR-type presentation control of a forty minute portion of a two-hour video program. It is noted that the input buffer 66 of the receiving set-top control system 62 must be configured in this example to store at least thirty video segments having an average size of 0.167 MB, or approximately 5 MB. For increased multimedia server 30 asynchronous transmission flexibility, the input buffer should have a storage capacity of approximately 10 MB (IBS>2×P×S0, where P=30 and S0=0.167 MB).

The asynchronous formatting guidelines and considerations disclosed herein provide the designer with an appreciable degree of flexibility when designing a multimedia DASD 68 for use in a multimedia communication system. The formatting of the multimedia information received from a remote multimedia server 30 may be varied in accordance with the operational characteristics, specifications, and functions of a particular DASD 68 disposed in a local set-top control system 62.

EXAMPLE NO. 6

For example, relatively low spindle motor 114 rates of rotation may be achieved by appropriately formatting the video data representing a selected multimedia program. In one illustrative embodiment, the video segment 48 information transmitted by the multimedia server 30 to the set-top control system 62 in discrete packets shown in FIG. 10 and formatted on the multimedia DASD 68 as shown in FIG. 20 will provide for a relatively low spindle motor 114 velocity of approximately 400 RPM. In this modulo-4 example, it is assumed that each video segment 48 is representative of a two-second (T0=2.0) portion (S0=2×0.167 MB=0.334 MB, and R0=4 revolutions) of the multimedia program, that at least five video segments (L=5) are stored in each of the two blocks (M=2) disposed on each of two disk surfaces (D=2), and that the two blocks 53 and 57 containing odd indexed video segments 48 are disposed on one disk surface, and that the two blocks 55 and 59 containing even indexed video segments 48 are disposed on another disk surface. By applying the appropriate spindle motor velocity equation, 60×M×L×R0/T0, it can be confirmed that the nominal spindle motor velocity for this example is 60×2×5×4/2.0= 1,200 RPM.

EXAMPLE NO. 7

Assuming now that the two blocks 53 and 55 respectively containing odd and even indexed video segments 48 are disposed on one disk surface, and that the other two blocks 57 and 59 respectively containing odd and even indexed video segments 48 are disposed on another disk surface, application of the appropriate spindle motor velocity equation, 60×L×R0/T0, results in a nominal spindle motor velocity for this example of 60×5×4/2.0 600 RPM.

The formatting configuration examples discussed hereinabove demonstrate that other spindle motor 114 velocities are also easily achievable. By varying important formatting parameters, such as the number of segment blocks (M), the block length (L) of each block, the distribution of odd and even indexed segment blocks respectively on the same disk surfaces or on different disk surfaces, the number of disk surfaces (D) employed, the size (IBS) of the input buffer 66, and the size of the discrete video segments (S0), for example, multimedia program information can be efficiently transmitted from the multimedia server 30 in a format specifically tailored to the system configuration and control functionality of a subscribing customer's unique set-top control system 62.

Asynchronous Formatting Methodology

Turning now to FIGS. 21–27, there is illustrated in flow chart form one embodiment for effectuating the novel multimedia DASD formatting methodology as depicted in chart form in FIGS. 20. A subscriber preferably communicates with a remote multimedia server 30 through a novel set-top control system 62 preferably of a type discussed in detail hereinabove. In one embodiment, a subscriber to the novel media-on-demand communication system is presented with a menu of multimedia program selections preferably selectable on a pay-per-view basis, at step 300. It this example, it is assumed that the customer is interested in selecting among various video programs, such as feature-length movies. At step 302, the subscriber preferably selects at least one multimedia program presented on the selection menu. It is noted that selection of one or more multimedia programs using the menu system may be effectuated through various known techniques, including the use of an IR remote control handset 25, a touch-sensitive screen interface of a type known in the art, or a point-and-click interface similar to that commonly used when communicating with computer systems, for example.

At step 304, the subscriber preferably specifies the duration or capacity of the presentation control window 90 associated with the selected multimedia program. Alternatively, a default presentation control window 90 duration may also be selected. A subscriber, for example, may specify a forty minute duration for the presentation control window 90 associated with a feature-length motion picture typically having a running time between two and three hours. For other multimedia programs, such as a fifty minute lecture previously recorded at a local university, for example, a subscribing customer may wish to specify a fifty minute duration for the presentation control window 90 so that the entire lecture can be accessed in either a forward or reverse temporal direction without requiring re-transmission of previously transmitted portions of the lecture, thus avoiding accrual of additional costs associated with the re-transmitted lecture portions.

The intelligent set-top control system 62 preferably performs a self-diagnostic routine to determine its internal configuration, at step 306. The configuration determination procedure is preferably performed dynamically during the power-up initialization sequence of the set-top control system 62. Alternatively, configuration parameters may be stored in a memory, such as Read-Only-Memory (ROM), which is preferably updated when changes are made to the internal configuration of the set-top control system 62. Typical configuration parameters include the size of the input buffer 66, the nominal spindle motor 114 velocity, the number of data storage disks mounted to the spindle motor 114 and/or disk surfaces which are to be allocated for the purpose of supporting the presentation control window 90 buffer, and the unique address of the set-top control system 62, among others.

After selecting one or more desired multimedia programs from the multimedia server menu, the set-top controller 64, at step 308, preferably performs various internal computations to determine the nominal DASD 68 storage capacity needed to support the customer-specified presentation control window 90. The predetermined time duration (PTD) specified by the subscriber is indicated as the variable Ut, at step 308, measured in seconds. In accordance with the novel asynchronous formatting guidelines and equations previously discussed, the nominal storage capacity (SC) can be derived from the subscriber's specified duration (Ut) and the storage capacity (S0) required to store each of the discrete program segments 48. For a system employing an MPEG-1 coding standard, for example, the average value of S0 is approximately 0.167 megabytes.

At step 310, the set-top control system 62 preferably determines whether the DASD 68 can accommodate the size of the subscriber-specified presentation control window 90. A comparison is made between the nominal size of the subscriber-specified presentation control window buffer 90 and the available storage capacity of the DASD 68 allocatable to support the presentation control window 90. If it is determined that the DASD 68 lacks sufficient storage capacity to accommodate the subscriber-specified presentation control window 90 duration, and alert signal is preferably annunciated by the set-top control system 62, at step 312, indicating to the subscriber that the specified presentation control window 90 duration cannot be accommodated. An alert message is preferably transmitted on the display 76 coupled to the set-top control system 62 requesting the subscriber to specify a shorter presentation control window 90 duration, at step 316. A computation of the maximum allocatable presentation control window 90 duration is preferably performed by the set-top control system 62, the result of which is preferably communicated to the subscriber over the display 76.

At step 314, the configuration parameters associated with the presentation control window 90 and the configuration and functionality of a subscribing customer's set-top control system 62 are transmitted to the multimedia server 30. The multimedia server 30 preferably includes a server controller 34 that, at step 316, reads the configuration parameters received from a subscriber's set-top control system 62. The set-top control system 62 parameters preferably include the number of disk surfaces (D) and available disk storage capacity (SC) allocated for supporting the presentation control window 90 buffer, the predetermined time duration (PTD) of the presentation control window 90 buffer, the size (IBS) of the input buffer 66, and the velocity (NV) of the spindle motor 114. It is noted that the computations performed by the set-top control system 62 at step 310 to determine whether the DASD 68 can accommodate the subscriber-specified presentation control window 90 may instead be performed by the server controller 34 based upon the received set-top control system 62 configuration parameters.

As previously discussed, a selected multimedia program may be stored in the multimedia server 30 in either an analog format or a digital format. A selected multimedia program stored in an analog format is preferably digitized at step 318. It is noted that a real-time broadcast of multimedia program transmitted over a local, national, or international network broadcast channel 45, is typically received by the multimedia server 30 in an analog format, and may also be digitized at step 318. The digitized multimedia program is then segmentized or divided into a series of sequentially ordered program segments 48, at step 320, typically by the coder 32 and/or the index parser 33. Unique addresses are also encoded into each discrete program segment 48 by the index parser 33. Each of the program segments 48 included within the sequential series of programs segments preferably represents a predetermined duration of the selected multimedia program. In one embodiment, each of the program segments 48 represent a fixed duration of the multimedia program, such as a one second or two second portion of the multimedia program. It is noted that the digitizing and segmentizing operations of steps 318 and 320 are typically not applicable to multimedia programs previously processed and stored in the multimedia server 30 in a digital format. These steps are preferably performed only once when initially storing a multimedia program on a digital storage device 35 within the multimedia server 30.

Figure 22:
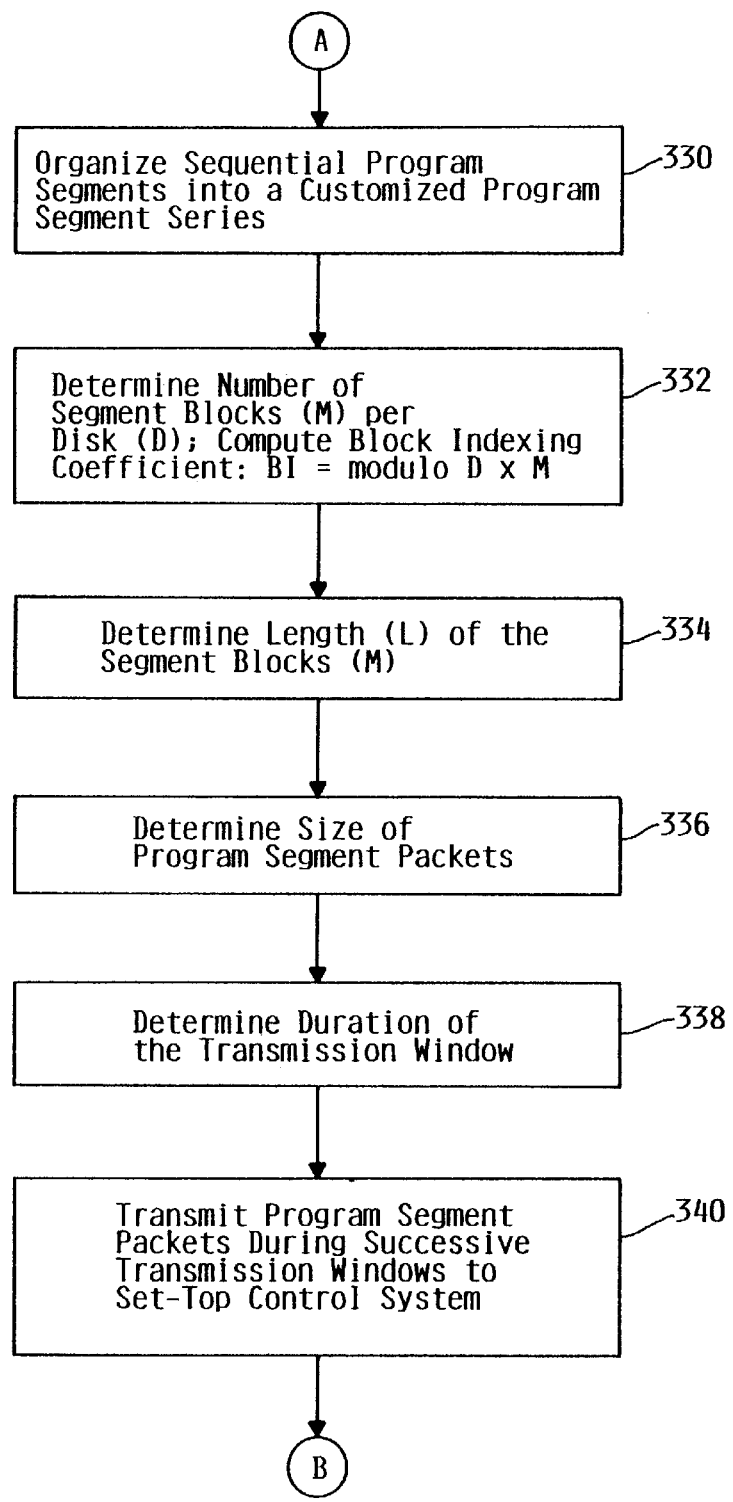

Turning now to FIG. 22 the sequential program segments comprising the selected multimedia program are preferably arranged in a customized order at step 330. In one embodiment, the multimedia server 30 includes a video parser 38 that preferably transforms the sequential program segments into a customized program segment series. The customized program segment series preferably includes an initial non-sequential series portion followed by a sequential series portion. A customized series may be comprised exclusively of non-sequentially ordered program segments 48 or, alternatively, may be comprised exclusively of sequentially ordered program segments.

The ordering of a customized program segment series is preferably dependent on a number of unique parameters associated with the configuration of a subscriber's set-top control system 62. In response to a subscriber's configuration parameters, the controller 34 of the multimedia server 30 preferably determines the number of segment blocks (M) per disk surface (D), from which is derived the Block Indexing Coefficient, BI=modulo D×M, at step 332. Further, the server controller 34, at step 334, preferably determines the length (L) of each of the segment blocks (M). It is noted that the length (L) of the segment blocks (M) preferably corresponds to the number of rows of each customized matrix comprising a segment block (M).

At step 336, the server controller 34 preferably computes the size of the program segment packets, which is typically dependent on the size (IBS) of the input buffer 66 of a subscribing customer's set-top control system 62. The input buffer 66 of a set-top control system 62 targeted to receive the program segment packets illustrated in FIG. 10, for example, would preferably be configured to store a packet containing at least five program segments 48. As discussed previously, it is preferable to configure the input buffer 66 to included sufficient memory to store at least twice the number of program segments 48 contained in the largest packet. Therefore, in this example, the input buffer 66 is preferably configured to store at least ten program segments 48. At step 338, the duration of the transmission window, within which each of the program segment packets is transmitted to a particular set-top control system 62, is preferably computed by the server controller 34 in a manner previously discussed hereinabove. At step 340, the program segments 48, previously arranged as a customized series, are then read out of the video parser 38 and temporarily stored on a staging storage device 41 preferably arranged into packets, and then transmitted to the subscriber's set-top control system 62 by the distribution switch 42, with each packet typically being transmitted to the communication channel 44 during each transmission window.

Figure 23A:
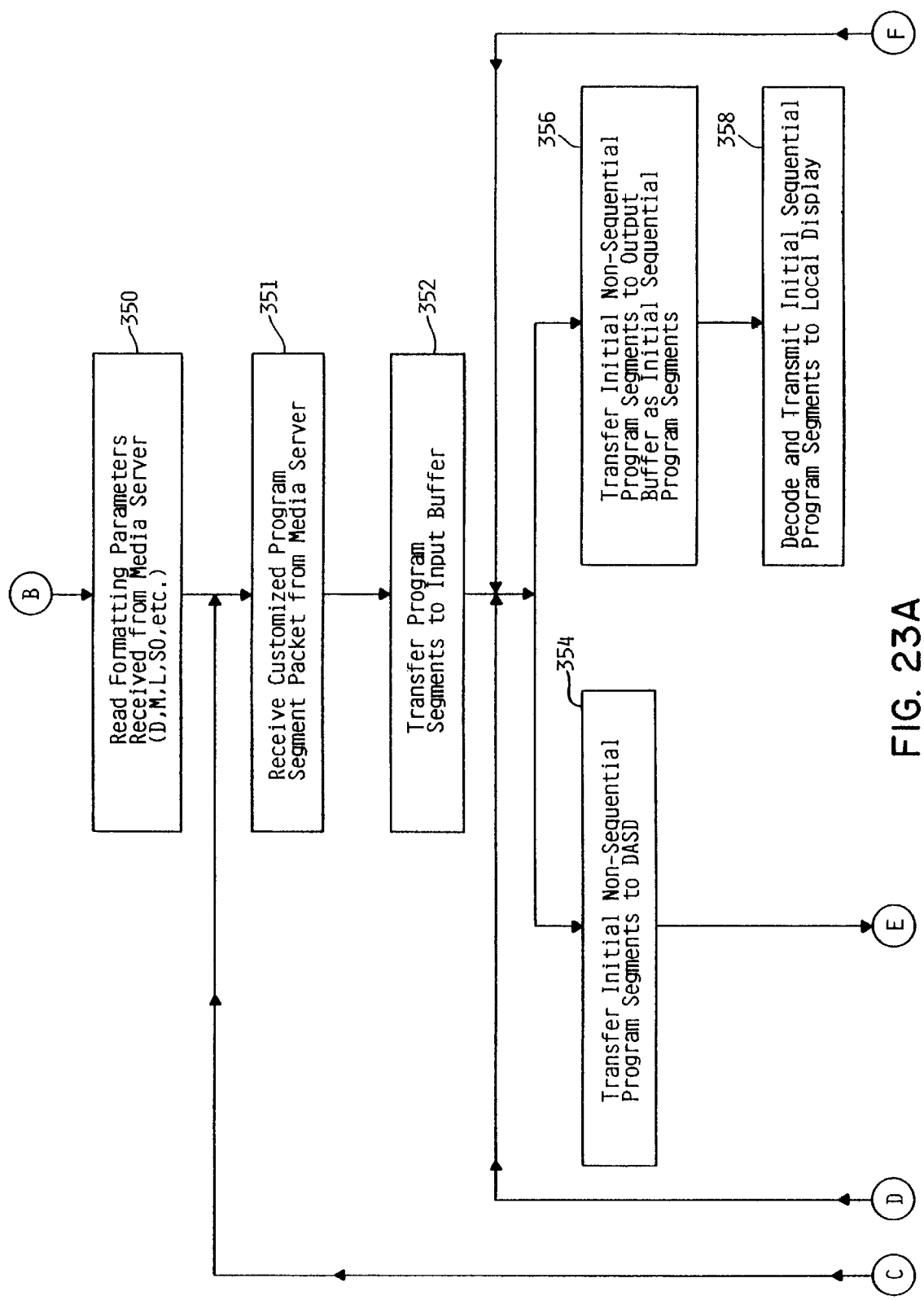
FIG. 23a–FIG. 23b are a flow chart depicting general processing steps performed by a novel intelligent set-top control system when communicating with a remote multimedia server to receive on-demand transmission of source program segments representative of a selected multimedia program in accordance with configuration parameters associated with the configuration of a presentation control window buffer provided on a novel multimedia direct access storage device of the set-top control system.
Figure 23B:
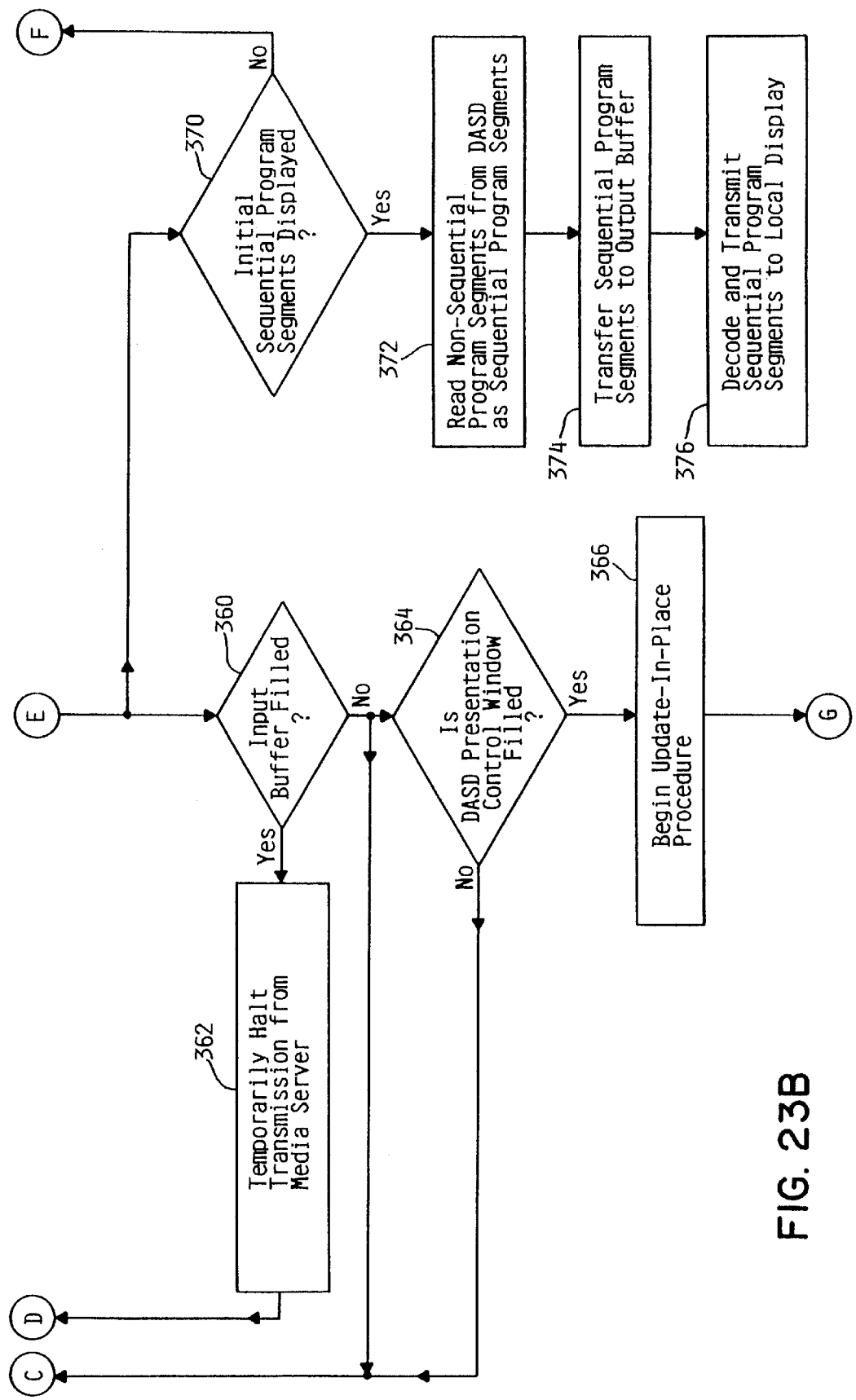

Turning now to FIGS. 10, 20, and 23, there is depicted in greater detail the steps of one embodiment for effectuating a novel asynchronous DASD 68 formatting methodology. The set-top control system 62 formatting parameters transmitted by the multimedia server 30 are received by the subscriber's set-top control system 62 at step 350. The formatting parameters are read by the set-top controller 64, and preferably loaded into a memory coupled to the set-top controller 64. The formatting parameters provide information preferably used by the set-top controller 64 to properly buffer and process the customized program segment packets received over the communication channel 44. For example, the segment block (M) formatting parameter, determined at step 332, is read by the set-top controller 64 which, in turn, preferably coordinates writing and reading of the program segments received from the multimedia server 30 to and from a corresponding number (M) of storage blocks of a predetermined length (L) defined on each of the disk surfaces (D) of the DASD 68.

In this illustrative example, it is assumed that each of the program segments 48 depicted in the packets of FIG. 10 and at DASD 68 disk storage locations depicted in FIG. 20 is representative of a two-second, full-motion video portion of a selected multimedia program. It is also assumed that the input buffer 66 of the set-top control system 62 is configured to store at least five such program segments 48, and that the program segments 48 will be buffered in a forty second presentation control window 90 (PTD=40 sec) formatted modulo-4 in two blocks (M=2) on each of two surfaces (D=2) of a single disk 108, with a block length of five program segments 48 (L=5). As shown in FIG. 20, it is assumed that Block-A 53 and Block-B 55 are disposed on one surface of the disk 108, and that Block-C 57 and Block-D 59 are disposed on the other disk 108 surface.

At step 351, a customized program segment 48 series transmitted from the multimedia server 30 in packets over the communication channel 44 are received by the subscriber's set-top control system 62. Generally, one packet is received during each multimedia server 30 transmission window, although multiple packets may be transmitted during this time if the input buffer 66 is sufficiently large. The first five non-sequential program segments contained in the first packet shown as Packet-1 in FIG. 10 would be transmitted and received as the customized series: A1, A5, A2, A6, A3. These first five segments 48 are transferred to the input buffer 66 at step 352. One important advantage of the novel asynchronous formatting methodology, as previously discussed, concerns the concurrent buffering and displaying of program segments 48 received from the multimedia server 30 to facilitate virtually instantaneous on-demand viewing of a selected multimedia program. As previously mentioned, a customized program segment series typically includes an initial non-sequentially ordered portion followed by a sequentially ordered portion. Depending on the format organization of the selected multimedia program, various non-sequential program segments 48 buffered in the input buffer 66 are transmitted concurrently to the DASD 68, at step 354, and to an output buffer 72 for subsequent decoding and displaying, at steps 356 and 358. It is noted that, at steps 356 and 358, it may be advantageous for synchronization purposes to transfer a number of non-sequential program segments 48 received from the communication channel 44 to a transfer buffer 70 prior to being transferred to the output buffer 72.

In accordance with steps 356 and 358, and as depicted in RUN-1 shown in FIG. 20, non-sequential program segment A1 is transferred concurrently to both the DASD 68 for storage at Location-1 of Block-A 53, at step 354, and to the output buffer 72, at step 356. The set-top controller 64 then preferably coordinates the transfer of non-sequential program segment A5 to the DASD 68 for storage at Location-2, at step 354. The set-top controller 64 then coordinates the concurrent transfer of non-sequential program segment A2 to both the DASD 68 for storage at Location-6 of Block-B 55, at step 354, and to the output buffer 76, at step 356. Accordingly, the output buffer 76 receives the program segments A1 and A2 in sequential order. The first two sequential program segments A1 and A2 are decoded by the decoder 74 and transmitted to the local display 76 at step 358.

Continuing with the operations associated with RUN-1, non-sequential program segment A6 is written to storage Location-7 of Block-B 55, and the last segment A3 of Packet-1 is concurrently transferred to both the DASD 68 for storage at Location-11 of Block-C 57, at step 354, and to the output buffer 76, at step 356. Having completed only one-half of RUN-1 and transferred each of the five program segments contained in Packet-1 to the DASD 68, Packet-2 is received during the next transmission window and transferred to the input buffer 66, at step 352. It is noted that the DASD presentation control window 90 will not be filled in this example, as tested at step 364, until completion of RUN-3. Packet-2 is shown in FIG. 10 as containing program segments A7, A4, A8, A9, and A13, which are operated upon during RUN-1.5 that spans RUN-1 and RUN-2. At step 354, non-sequential program segment A7 is transferred to the DASD 68 for storage at Location-12 of Block-C 57 followed by the concurrent transferring of segment A4 to both the DASD 68 for storage at Location-16 of Block-D 59, at step 354, and to the output buffer 72, at step 356. At the end of RUN-1, it can be seen that the first four program segment of the multimedia program, segments A1, A2, A3, and A4, have been transferred to the output buffer 76 in sequential order.

As mentioned previously, the process of concurrently transferring non-sequential program segments 48 to both the DASD 68, at step 354, and the output buffer, at step 356, preferably continues until such time as a received program segment 48 is transferred to the first storage location defined for each segment block, such as program segment A1 at Location-1 of Block-A 53, segment A2 at Location-6 of Block-B 55, segment A3 at Location-11 of Block-C 57, and segment A4 at Location-16 of Block-D 59 shown in FIG. 20. The orchestrated concurrent transferring of program segments 48 to both the DASD 68 and the output buffer 72 and decoder 74 thus provides for virtually instantaneous presentation of a selected multimedia program on a subscribing customer's television 76. The program segments 48 contained in subsequently received Packet-3 and Packet-4 are transferred to storage locations on the DASD 68 in a manner respectively depicted in RUN-2 and RUN-3, thereby filling the twenty storage locations of the presentation control window 90. After receiving a predetermined number of initial non-sequential program segments 48, twenty in this example, and storing same in the presentation control window 90 buffer on the DASD 68, as tested at step 364, a novel update-in-place procedure is then performed at step 366 as discussed in greater detail hereinbelow.

At step 360, the set-top controller 64 preferably monitors the state of the input buffer 66 and, if an overflow condition is imminent, preferably transmits a control signal to the multimedia server 30 to request temporary halting of the transmission of program segment packets at step 362. It is noted that an input buffer 66 overflow condition should generally not occur during periods of normal program viewing since the transmission and reception of program segment packets is synchronized by transferring packets during prescribed transmission windows. Various presentation control window 90 function modes, such as a pause mode, for example, will typically result in the transmission of a halt control signal from the set-top control system 62 to the multimedia server 30. The remaining program segments 48 contained in Packet-1 and stored in the input buffer 66, for example, are transferred to the DASD 68 during halting of additional packet transmissions in order to remedy an impending overflow condition, at step 354.

Still referring to FIG. 23, a significant advantage concerning the novel asynchronous formatting methodology provides for the concurrent writing and displaying of program segments 48 transferred to and from the multimedia DASD 68. After the initial sequential program segments are displayed at steps 356 and 358, such as segments A1, A2, A3, and A4, the novel formatting methodology disclosed herein provides for the reading of program segments 48 asynchronously buffered in the DASD 68 as sequential program segments at step 372. The sequential program segments 48 read from the DASD 68 are transferred to the output buffer 72, at step 374, decoded by the decoder 74, and then transmitted to the local display 76, at step 376.

Figure 24:
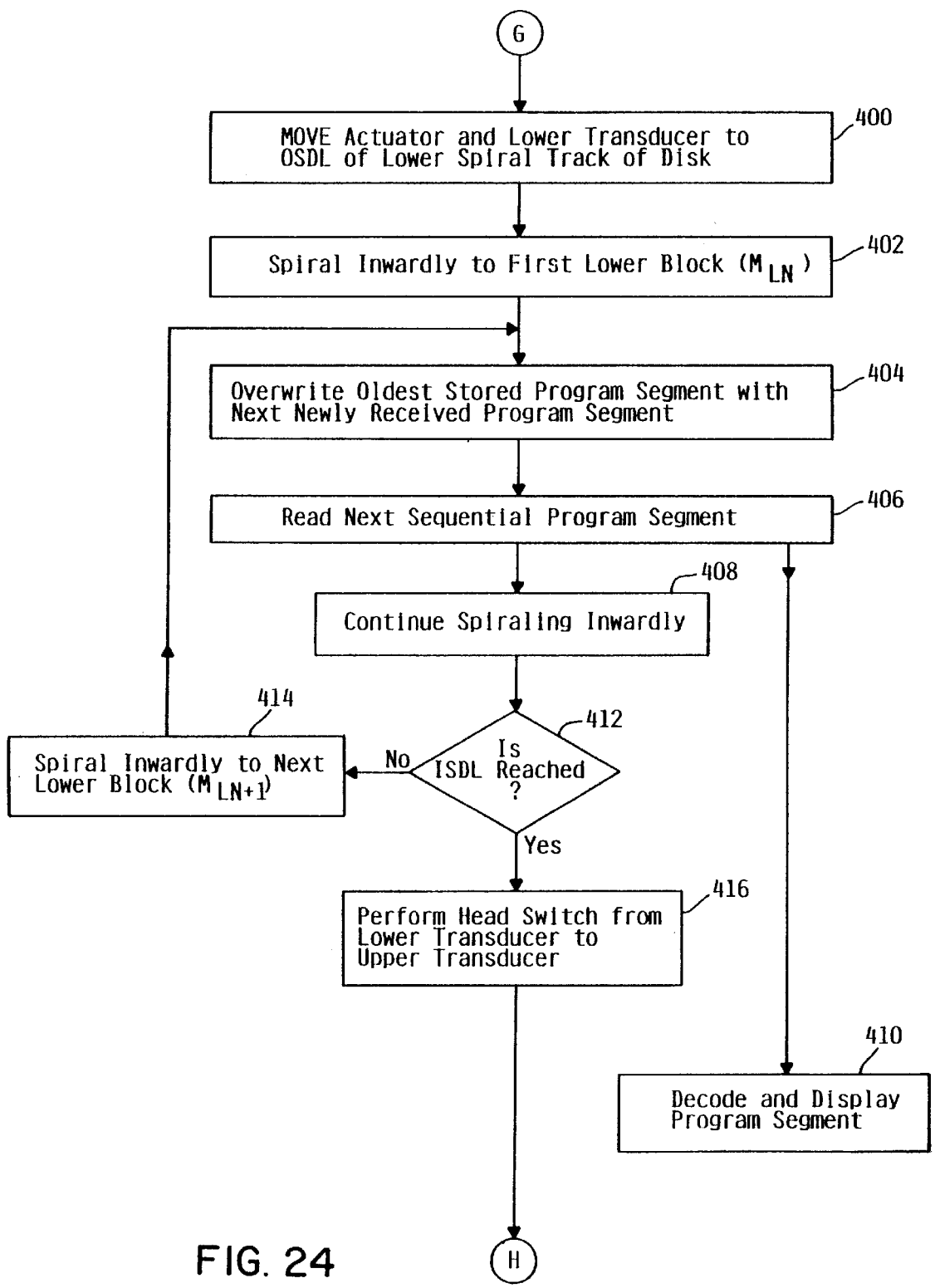
FIGS. 24–25 are flow charts depicting general processing steps performed by a novel intelligent set-top control system when writing a custom ordered series of discrete source program segments representative of a portion of a selected multimedia program to a presentation control window buffer provided on a novel multimedia direct access storage device, and when reading the discrete source program segments as a sequentially ordered series of discrete local program segments from the direct access storage device in accordance with a novel update-in-place formatting methodology.
Figure 25:
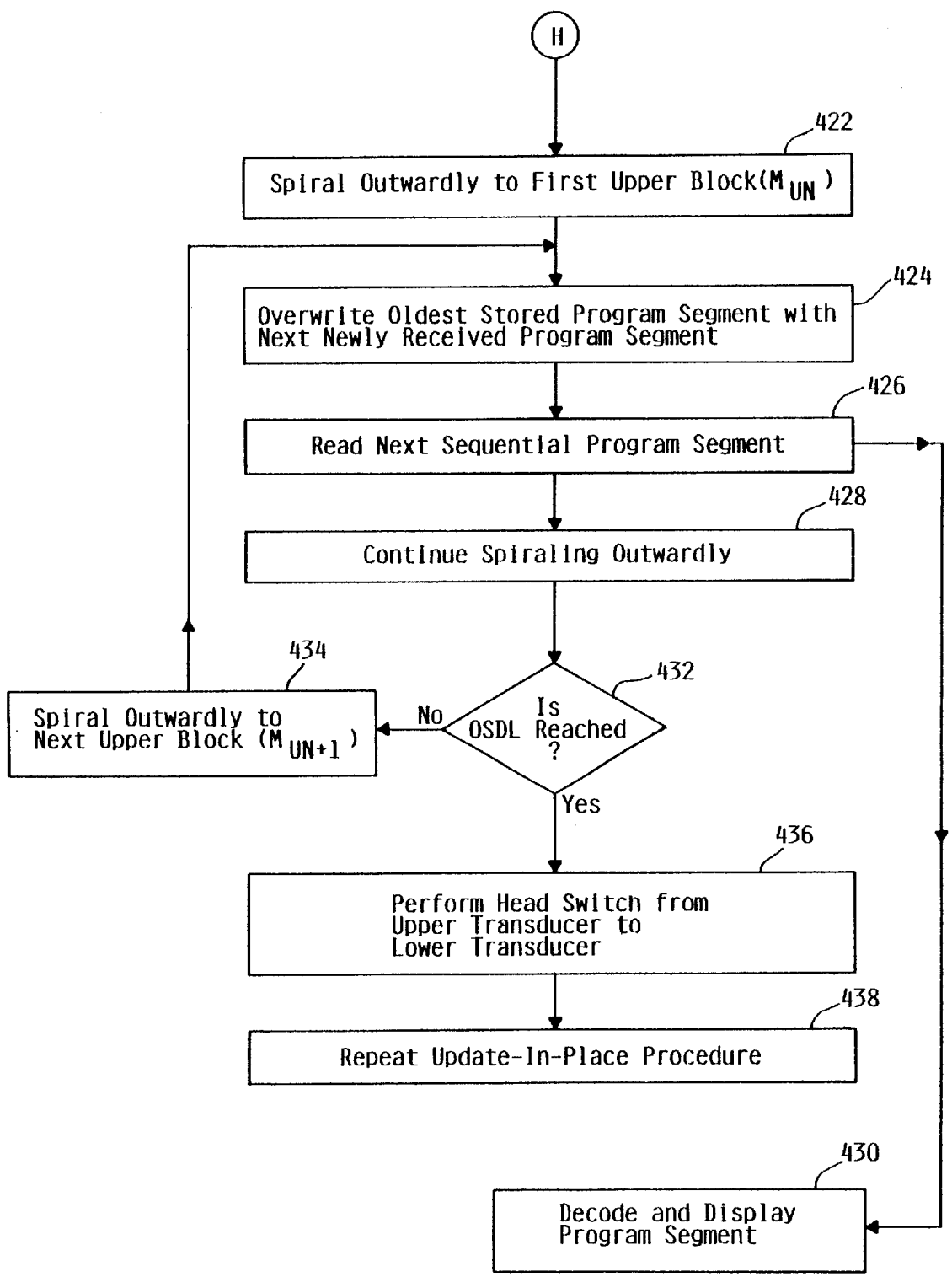
Figure 26:
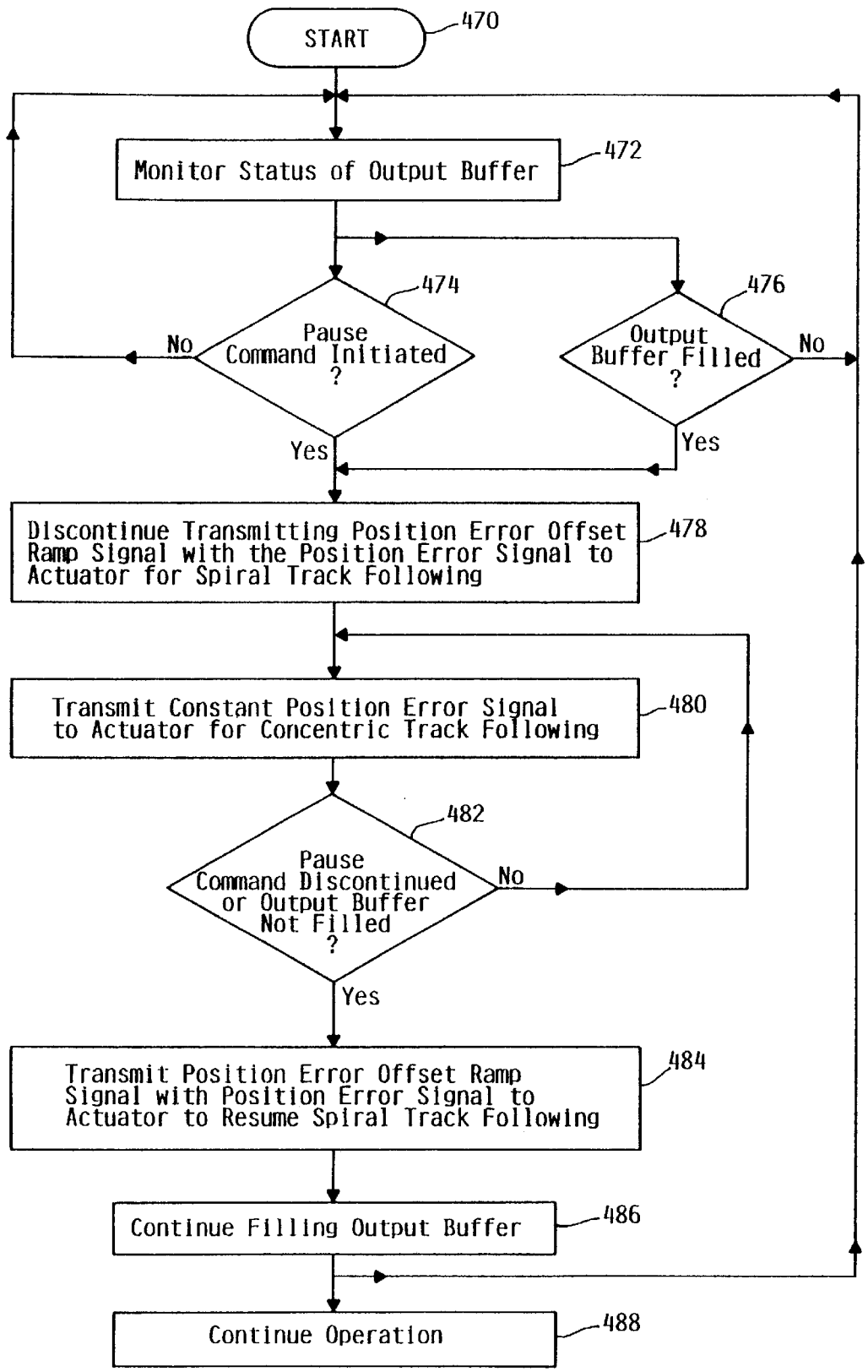
FIG. 26 is a flow chart depicting general processing steps associated with effectuating a spiral-and-hold operation of a novel multimedia direct access storage device.

Turning now FIGS. 10, 20, and 24–26, there is depicted in greater detail the steps of one embodiment for effectuating a novel update-in-place procedure of step 366. It is assumed that the presentation control window 90 has been filled after completion of RUN-3, that the last sequential program segment A12 has been read from Location-18 during RUN-3 and displayed on the customer's television 74, and that the operations described in FIGS. 24–26 are associated with successive runs beginning with RUN-4. It is further assumed that Packet-5 containing program segments A21, A22, A23, and A24 has been received and transferred to the input buffer 66. In the embodiment depicted in FIGS. 24–26, the actuator 118 of the DASD 68 is preferably moved to an outer spiral diameter location (OSDL) 196 of the lower spiral track 110 of the data storage disk 108 at step 400. At step 402, the lower transducer preferably spirals inwardly to the first lower block ($M_{LN}$), Block-A 53. At step 404, the next newly received program segment, segment A21, is written to the storage location in the first lower block, Block-A 53, containing the oldest program segment 48 stored in Block-A 53, which corresponds to previously stored segment A1 at Location-1. At step 406, the next sequential program segment 48 stored in the first lower block, Block-A 53, which corresponds to program segment A13, is read from Location-4, and decoded and then displayed at step 410 on the customer's television 76 in sequence with respect to the previously read and displayed program segment A12. The actuator 118 and lower transducer 117, at step 408, continue to traverse inwardly preferably along the centerline of the lower spiral data track 110.

If other program segment storage blocks are provided on the lower disk surface ($M_{LN+1}$), the overwriting, reading, decoding and display steps 404, 406, and 410 are repeated for the next lower block, such as Block-B 55. After overwriting previously stored program segment A2 at Location-6 of Block-B 55 with newly received segment A22, and reading the next sequential segment A14 from Location-9 of Block-B 55, the actuator 118 and lower transducer 117 traverse the lower spiral track 110 until an inner spiral diameter location (ISDL) 198 is reached, at step 412. A head switch is performed at the ISDL 198 to activate the upper transducer 116 at step 416.

Referring now to FIG. 25 and step 422, actuator 118 and upper transducer 116 begin to traverse outwardly along the upper spiral track 111 to the first upper program segment storage block ($M_{UN}$), such as Block-C 57. At step 424, the next newly received program segment, segment A23, is written to the storage location in Block-C 57 containing the oldest program segment 48 stored in Block-C 57, which corresponds to previously stored segment A3. At step 426, the next sequential program segment 48 stored in Block-A 53, which corresponds to program segment A15, is read from Location-14, and decoded and then displayed at step 430 on the customer's television 76 in sequence with respect to the previously read program segment A14. The actuator 118 and upper transducer 116, at step 428, continue to traverse outwardly preferably along the centerline of the upper spiral data track 111. If other program segment storage blocks ($M_{UN+1}$) are provided on the upper disk surface, the overwriting, reading, decoding and display steps 424, 426, and 430 are repeated for the next upper block, such as Block-D 59.

After overwriting previously stored program segment A4 at Location-16 of Block-D 59 with newly received segment A24, and reading the next sequential segment A16 from Location-19 of Block-D 59, the actuator 118 and upper transducer 116 traverse the upper spiral track 111 until the OSDL 196 is reached, at step 432. Another head switch is performed at the OSDL 196 to activate the lower transducer 117 at step 436. The novel update-in-place procedure is then repeated for subsequent runs, as at step 438. It can be appreciated that this update procedure provides for writing of new program segments 48 into the presentation control window 90 buffer, reading of previously stored program segments 48 from the presentation control window 90 buffer in a sequential order, and overwriting previously stored program segments 48.

Another feature of the novel presentation control window 90 provides for the erasure of the contents of a presentation control window 90 associated with a previously viewed pay-per-view multimedia program. The erasure procedure may also be performed in connection with a presentation control window 90 reconfiguration procedure which may be desirable during the on-going transmission of a multimedia program currently being viewed. Generally, after viewing a multimedia program, the storage locations defining a presentation control window 90 buffer will contain program segment data of the previously viewed program. Prior to receiving the program segment data for a subsequently ordered multimedia program, each of the presentation control window 90 storage locations may be erased by applying a d.c. current or single frequency signal to the write element of the transducer as it passes over the storage locations.

Alternatively, a selective erasure procedure may instead be employed by which selected storage locations are erased while others are overwritten using newly received program segments associated with a newly ordered multimedia program. For example, it is assumed that each of the twenty storage locations depicted in FIG. 20 contain a program segment of a previously viewed multimedia program. It is further assumed that the first two packets, Packet-1 and Packet-2 shown in FIG. 10, have been received by the input buffer 66 which is assumed to be configured to store at least ten two-second compressed program segments 48. During RUN-1, segments A1 and A5 are initially respectively stored at Location-1 and Location-2 of Block-A 53. It is noted that in this example, Location-3, Location-4, and Location-5 contain program segments associated with the previously viewed multimedia program. An erase signal is preferably applied to the transducer as Location-3, Location-4, and Location-5 spiral into proximity with the write element of the transducer, thus erasing these storage locations rather than merely skipping these storage locations. This selective erasure procedure is preferably performed until the presentation control window 90 buffer is filled with program segments associated with the newly ordered multimedia program.

Turning now to FIG. 26, a novel spiral-and-hold procedure is illustrated in flow chart form. At step 472, the set-top controller 64 preferably monitors the status of the output buffer 72. Upon initiation of a pause command by a subscriber, at step 474, or an operation in which the output buffer 72 may be subject to an imminent overflow condition, at step 476, a novel spiral-and-hold procedure is preferably executed. Initially, at step 478, the position error offset ramp signal added to the constant position error signal and transmitted to the actuator servo control to effectuate spiral track following is discontinued. Accordingly, only the constant position error signal is transmitted to the actuator servo control to maintain the actuator and transducers in a concentric track following mode, as at step 480. A concentric track following mode preferably continues until the overflow condition of the output buffer 72 is remedied or the pause command initiated by a subscriber is terminated at step 482. The position error offset ramp signal is added to the constant position error signal, at step 484, and transmitted to the actuator servo control to resume spiral track following. The transfer of program segments to the output buffer 72 then resumes, at 486, and normal operation continues, at step 488.

It will, of course, be understood that various modifications and additions can be made to the embodiments discussed hereinabove without departing from the scope or spirit of the present invention. Accordingly, the scope of the present invention should not be limited to the particular embodiments discussed above, but should be defined only by the claims set forth below and equivalents of the disclosed embodiments.

What is claimed is:

1. A direct access storage device for buffering at least a portion of a multimedia program presentation comprising source program segments each representative of a temporally unique portion of the multimedia program, the direct access storage device comprising:
    at least one data storage disk having a plurality of data storing regions disposed on any of a lower disk surface and an upper disk surface;
    a spindle motor for rotating the at least one data storage disk;
    a single actuator having elongated arms;
    a read/write transducer disposed on each of the elongated arms;
    a translatable presentation control window buffer supported by the plurality of data storing regions, the presentation control window buffer storing source program segments defining a portion of the multimedia program presentation and comprising a forward window portion and a reverse window portion defined with respect to a current viewing time reference; and
    a controller for coordinating writing of the source program segments to the plurality of data storage regions and reading of the source program segments from the presentation control window buffer to effect at least pause, forward, and reverse functions in response to respective pause, forward, and reverse control signals.

2. The device of claim 1, wherein the at least one data storage disk includes an upper data storing region disposed on the upper disk surface and a lower data storing region disposed on the lower disk surface, the upper and lower data storing regions defining the presentation control window buffer.

3. The device of claim 1, wherein the at least one data storage disk includes an upper data storing region disposed on the upper disk surface and a lower data storing region disposed on the lower disk surface, the upper and lower data storing regions comprising respective spiral tracks.

4. The device of claim 3, wherein the controller transitions from a spiral track following mode to a cylindrical track following mode in response to one of the respective pause, forward, and reverse control signals.

5. The device of claim 3, wherein the controller transitions from a spiral track following mode to a cylindrical track following mode to prevent an output buffer of the device from overflowing.

6. The device of claim 1, wherein the controller coordinates writing of non-chronologically ordered source program segments to the data storing regions and coordinates reading of the non-chronologically ordered source program segments from the presentation control window buffer as chronologically ordered source program segments.

7. The device of claim 1, wherein the controller coordinates writing of chronologically ordered source program segments to the data storing regions and coordinates reading of the chronologically ordered source program segments from the presentation control window buffer.

8. The device of claim 1, wherein the multimedia program presentation comprises a live program broadcast.

9. The device of claim 1, wherein the source program segments define frames of the multimedia program presentation.

10. The device of claim 1, wherein the multimedia program presentation comprises pre-processed programming.

11. The device of claim 1, wherein the controller coordinates asynchronous writing of the source program segments to the plurality of data storage regions and coordinates asynchronous reading of the source program segments from the presentation control window buffer to effect the at least pause, forward, and reverse functions in response to the respective pause, forward, and reverse control signals.

12. The device of claim 1, wherein the controller coordinates transmission of the source program segments to an output buffer of the device concurrently with coordinating writing of the source program segments to the presentation control window buffer.

13. The device of claim 1, wherein the source program segments comprise compressed digital program segments.

14. A method for buffering at least a portion of a multimedia program presentation comprising source program segments each representative of a temporally unique portion of a multimedia program, the method comprising:
    providing a direct access storage device comprising a plurality of read/write heads supported by a single actuator and having a plurality of data storing regions defined on a surface of at least one data storage disk disposed in the direct access storage device;
    providing a translatable presentation control window buffer supported by the plurality of data storing regions, the presentation control window buffer storing source program segments defining a portion of the multimedia program presentation and comprising a forward window portion and a reverse window portion defined with respect to a current viewing time reference;
    writing the source program segments to the plurality of data storage regions; and
    reading the source program segments from the presentation control window buffer to effect at least pause, forward, and reverse functions in response to respective pause, forward, and reverse control signals.

15. The method of claim 14, wherein the at least one data storage disk includes an upper data storing region disposed on the upper disk surface and a lower data storing region disposed on the lower disk surface, the upper and lower data storing regions comprising respective spiral tracks, and writing and reading the source program segments comprises writing and reading the source program segments to and from the spiral tracks.

16. The method of claim 14, further comprising transitioning from a spiral track following mode to a cylindrical track following mode in response to an output buffer overflow condition or one of the respective pause, forward, and reverse control signals.

17. The method of claim 14, wherein writing the source program segments comprises writing non-chronologically ordered source program segments to the data storing regions, and reading the source program segments comprises reading the non-chronologically ordered source program segments from the presentation control window buffer as chronologically ordered source program segments.

18. The method of claim 14, wherein writing the source program segments comprises writing chronologically ordered source program segments to the data storing regions, and reading the source program segments comprises reading the chronologically ordered source program segments from the presentation control window buffer.

19. The method of claim 14, wherein the multimedia program presentation comprises a live program broadcast.

20. The method of claim 14, wherein the multimedia program presentation comprises pre-processed programming.

* * * * *

US006529685C1

(12) INTER PARTES REEXAMINATION CERTIFICATE (0222nd)
United States Patent
Ottesen et al.

(10) Number: US 6,529,685 C1
(45) Certificate Issued: Jan. 4, 2011

(54) MULTIMEDIA DIRECT ACCESS STORAGE DEVICE AND FORMATTING METHOD

(75) Inventors: Hal Hjalmar Ottesen, Rochester, MN (US); Gordon J. Smith, Rochester, MN (US); George Willard VanLeeuwen, Rochester, MN (US)

(73) Assignee: Echostar Technologies Corporation, Englewood, CO (US)

Reexamination Request:
No. 95/000,173, Aug. 1, 2006

Reexamination Certificate for:
Patent No.: 6,529,685
Issued: Mar. 4, 2003
Appl. No.: 09/771,036
Filed: Jan. 26, 2001

Related U.S. Application Data

(62) Division of application No. 09/035,624, filed on Mar. 5, 1998, now Pat. No. 6,208,804, which is a continuation of application No. 08/866,377, filed on May 30, 1997, now Pat. No. 5,751,883, which is a continuation of application No. 08/478,328, filed on Jun. 7, 1995, now abandoned.

(51) Int. Cl.
*G11B 27/031* (2006.01)
*G11B 27/10* (2006.01)
*G11B 27/034* (2006.01)
*H04N 7/173* (2006.01)
*H04N 7/24* (2006.01)
*H04N 5/00* (2006.01)

(52) U.S. Cl. ............. 386/125; 348/E5.008; 348/E7.071; 348/E7.073; 375/E7.001; 70/46
(58) Field of Classification Search .................. None
See application file for complete search history.

(56) References Cited

U.S. PATENT DOCUMENTS 3,682,363 A 8/1972 Hull
3,942,190 A 3/1976 Detweiler
(Continued)

FOREIGN PATENT DOCUMENTS

DE 4434034 3/1996
(Continued)

OTHER PUBLICATIONS

Hugh M. Sierra, *An Introduction to Direct Access Storage Devices*, Academic Press, Inc., 1990.
(Continued)

*Primary Examiner*—Fred Ferris

(57) ABSTRACT

A multimedia direct access storage device and a method for transferring source program signals representative of a compressed digital multimedia program to and from the direct access storage device are disclosed. A multimedia program is transmitted from a multimedia server as a custom ordered series of discrete program segments and received by the multimedia direct access storage device, which buffers the compressed program segments for subsequent presentation on a local display monitor. The multimedia direct access storage device is preferably incorporated as a component of a local set-top control system for buffering a predetermined number of compressed program segments received from the multimedia server, some of which may be non-sequentially ordered and others of which may be sequentially ordered. A novel formatting methodology provides for the sequential presentation of the program segments asynchronously distributed on one or more data storage disks disposed in the direct access storage device. A user-definable presentation control window for performing local VCR-type presentation control functions for the portion of a multimedia program buffered in the direct access storage device is also provided through the novel formatting methodology. The novel formatting methodology also provides concurrent presentation and buffering of program segments received from the multimedia server for on-demand viewing of a selected multimedia program.

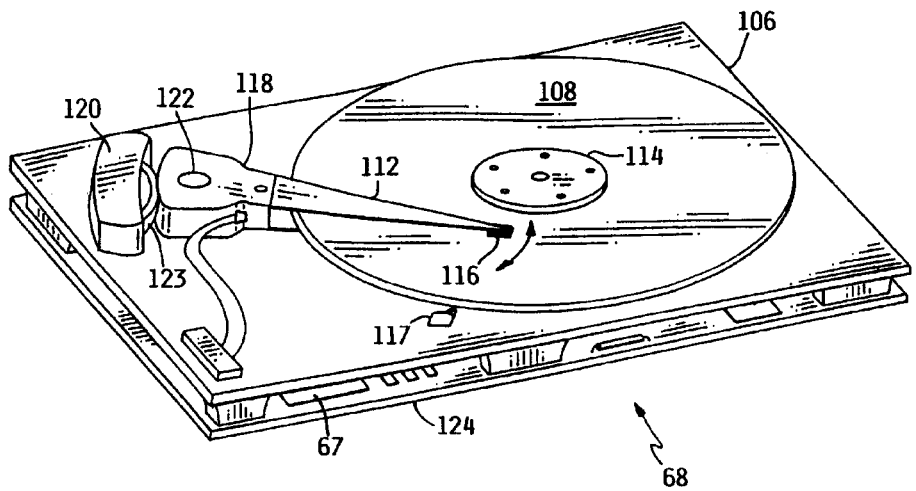

U.S. PATENT DOCUMENTS

| | | |
|---|---|---|
| 4,141,039 A | 2/1979 | Yamamoto |
| 4,142,209 A | 2/1979 | Hedlund et al. |
| 4,155,889 A | 5/1979 | Fagerburg et al. |
| 4,224,481 A | 9/1980 | Russell |
| 4,258,418 A | 3/1981 | Heath |
| 4,313,135 A | 1/1982 | Cooper |
| 4,347,527 A | 8/1982 | Lainez et al. |
| 4,388,659 A | 6/1983 | Lemke |
| 4,408,309 A | 10/1983 | Kiesling et al. |
| 4,423,480 A | 12/1983 | Bauer et al. |
| 4,439,785 A | 3/1984 | Leonard |
| 4,506,348 A | 3/1985 | Miller et al. |
| 4,506,358 A | 3/1985 | Montgomery |
| 4,602,297 A | 7/1986 | Reese |
| 4,633,331 A | 12/1986 | McGrady et al. |
| 4,636,885 A | 1/1987 | Yamada et al. |
| 4,665,431 A | 5/1987 | Cooper |
| 4,688,106 A | 8/1987 | Keller et al. |
| 4,689,022 A | 8/1987 | Peers et al. |
| 4,706,121 A | 11/1987 | Young |
| 4,723,181 A | 2/1988 | Hickok |
| 4,752,834 A | 6/1988 | Koombes |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,805,217 A | 2/1989 | Morihiro et al. |
| 4,816,905 A | 3/1989 | Tweedy et al. |
| 4,821,121 A | 4/1989 | Beaulier |
| 4,833,710 A | 5/1989 | Hirashima |
| 4,876,670 A | 10/1989 | Nakabayashi et al. |
| 4,884,197 A | 11/1989 | Sachs et al. |
| 4,891,715 A | 1/1990 | Levy et al. |
| 4,897,867 A | 1/1990 | Foster et al. |
| 4,899,275 A | 2/1990 | Sachs et al. |
| 4,920,533 A | 4/1990 | Dufresne et al. |
| 4,924,387 A | 5/1990 | Jeppesen |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,972,396 A | 11/1990 | Rafner |
| 4,979,050 A | 12/1990 | Westland et al. |
| RE33,535 E | 2/1991 | Cooper |
| 4,991,033 A | 2/1991 | Takeshita et al. |
| 5,001,568 A | 3/1991 | Efron et al. |
| 5,014,125 A | 5/1991 | Pocock et al. |
| 5,018,186 A | 5/1991 | Kimura et al. |
| 5,019,900 A | 5/1991 | Clark et al. |
| 5,021,893 A | 6/1991 | Scheffler |
| 5,027,241 A | 6/1991 | Hatch et al. |
| 5,027,400 A | 6/1991 | Baji et al. |
| 5,043,714 A | 8/1991 | Perlman |
| 5,047,857 A | 9/1991 | Duffield et al. |
| 5,057,932 A | 10/1991 | Lang |
| 5,063,453 A | 11/1991 | Yoshimura et al. |
| 5,089,885 A | 2/1992 | Clark |
| 5,093,718 A | 3/1992 | Hoarty et al. |
| 5,109,281 A | 4/1992 | Kobori et al. |
| 5,111,345 A | 5/1992 | Muller |
| 5,118,105 A | 6/1992 | Brim et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,142,532 A | 8/1992 | Adams |
| 5,148,432 A | 9/1992 | Gordon et al. |
| 5,153,726 A | 10/1992 | Billing |
| 5,168,353 A | 12/1992 | Walker |
| 5,172,413 A | 12/1992 | Bradley et al. |
| 5,202,761 A | 4/1993 | Cooper |
| 5,214,768 A | 5/1993 | Martin et al. |
| 5,226,141 A | 7/1993 | Esbensen |
| 5,227,876 A | 7/1993 | Cucchi et al. |
| 5,233,423 A | 8/1993 | Jernigan et al. |
| 5,233,603 A | 8/1993 | Takeuchi et al. |
| 5,237,648 A | 8/1993 | Mills et al. |
| 5,241,428 A | 8/1993 | Goldwasser et al. |
| 5,245,430 A | 9/1993 | Nishimura |
| 5,247,347 A | 9/1993 | Litteral et al. |
| 5,251,009 A | 10/1993 | Bruno |
| 5,253,275 A | 10/1993 | Yurt et al. |
| 5,283,659 A | 2/1994 | Akiyama et al. |
| 5,285,272 A | 2/1994 | Bradley et al. |
| 5,287,182 A | 2/1994 | Haskell et al. |
| 5,293,282 A | 3/1994 | Squires et al. |
| 5,311,423 A | 5/1994 | Clark |
| 5,317,603 A | 5/1994 | Osterweil |
| 5,317,604 A | 5/1994 | Osterweil |
| 5,329,307 A | 7/1994 | Takemura et al. |
| 5,329,320 A | 7/1994 | Yifrach |
| 5,355,486 A | 10/1994 | Cornaby |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,416,415 A | 5/1995 | Dorri et al. |
| 5,428,731 A | 6/1995 | Powers, III |
| 5,438,423 A | 8/1995 | Lynch et al. |
| 5,440,334 A | 8/1995 | Walters et al. |
| 5,442,390 A | 8/1995 | Hooper et al. |
| 5,452,006 A | 9/1995 | Auld |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,488,409 A | 1/1996 | Yuen et al. |
| 5,506,615 A | 4/1996 | Awaji et al. |
| 5,508,940 A | 4/1996 | Rossmere et al. |
| 5,513,011 A | 4/1996 | Matsumoto et al. |
| 5,513,306 A | 4/1996 | Mills et al. |
| 5,519,684 A | 5/1996 | Iizuka et al. |
| 5,526,202 A | 6/1996 | Blagaila et al. |
| 5,528,281 A | 6/1996 | Grady et al. |
| 5,528,282 A | 6/1996 | Voeten et al. |
| 5,537,157 A | 7/1996 | Washino et al. |
| 5,550,594 A | 8/1996 | Cooper et al. |
| 5,550,982 A | 8/1996 | Long et al. |
| 5,555,463 A | 9/1996 | Staron et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,577,190 A | 11/1996 | Peters |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap |
| 5,604,544 A | 2/1997 | Bertram |
| 5,610,653 A | 3/1997 | Abecassis |
| 5,612,749 A | 3/1997 | Bacher et al. |
| 5,614,940 A | 3/1997 | Cobbley et al. |
| 5,615,401 A | 3/1997 | Harscoet et al. |
| 5,619,247 A | 4/1997 | Russo |

| Patent No. | Date | Inventor |
|---|---|---|
| 5,619,337 A | 4/1997 | Naimpally |
| 5,625,464 A | 4/1997 | Compoint et al. |
| 5,627,695 A | 5/1997 | Prins et al. |
| 5,629,732 A | 5/1997 | Moskowitz et al. |
| 5,635,984 A | 6/1997 | Lee |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,696,866 A | 12/1997 | Iggulden et al. |
| 5,696,868 A | 12/1997 | Kim et al. |
| 5,701,383 A | 12/1997 | Russo et al. |
| 5,706,388 A | 1/1998 | Isaka |
| 5,712,976 A | 1/1998 | Falcon, Jr. et al. |
| 5,715,356 A | 2/1998 | Hirayama et al. |
| 5,719,982 A | 2/1998 | Kawamura et al. |
| 5,721,585 A | 2/1998 | Keast et al. |
| 5,721,815 A | 2/1998 | Ottesen et al. |
| 5,721,878 A | 2/1998 | Ottesen et al. |
| 5,724,474 A | 3/1998 | Oguro et al. |
| 5,729,741 A | 3/1998 | Liaguno et al. |
| 5,751,282 A | 5/1998 | Girard et al. |
| 5,751,338 A | 5/1998 | Ludwig, Jr. |
| 5,751,371 A | 5/1998 | Shintani |
| 5,754,254 A | 5/1998 | Kobayashi et al. |
| 5,761,166 A | 6/1998 | Sedlmayr et al. |
| 5,761,417 A | 6/1998 | Henley et al. |
| 5,771,334 A | 6/1998 | Yamauchi et al. |
| 5,774,170 A | 6/1998 | Hite et al. |
| 5,774,186 A | 6/1998 | Brodsky et al. |
| 5,778,137 A | 7/1998 | Nielsen et al. |
| 5,787,225 A | 7/1998 | Honjo |
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw et al. |
| 5,822,493 A | 10/1998 | Uehara et al. |
| 5,852,705 A | 12/1998 | Hanko et al. |
| 5,864,682 A | 1/1999 | Porter et al. |
| 5,870,553 A | 2/1999 | Shaw et al. |
| 5,889,915 A | 3/1999 | Hewton |
| 5,892,884 A | 4/1999 | Sugiyama et al. |
| 5,899,578 A | 5/1999 | Yanagihara et al. |
| 5,920,572 A | 7/1999 | Washington et al. |
| 5,920,842 A | 7/1999 | Cooper et al. |
| 5,930,444 A | 7/1999 | Camhi et al. |
| 5,930,493 A | 7/1999 | Ottesen et al. |
| 5,949,948 A | 9/1999 | Krause et al. |
| 5,949,954 A | 9/1999 | Young et al. |
| 5,956,716 A | 9/1999 | Kenner et al. |
| 5,963,202 A | 10/1999 | Polish |
| 5,973,679 A | 10/1999 | Abbott et al. |
| 5,991,496 A | 11/1999 | Kojima |
| 5,995,709 A | 11/1999 | Tsuge |
| 5,999,691 A | 12/1999 | Takagi et al. |
| 6,002,832 A | 12/1999 | Yoneda |
| 6,005,562 A | 12/1999 | Shiga et al. |
| 6,005,564 A | 12/1999 | Ahmad et al. |
| 6,018,612 A | 1/2000 | Thomason et al. |
| 6,028,599 A | 2/2000 | Yuen et al. |
| RE36,801 E | 8/2000 | Logan et al. |
| 6,112,226 A | 8/2000 | Weaver et al. |
| 6,138,147 A | 10/2000 | Weaver et al. |
| 6,141,385 A | 10/2000 | Yamaji et al. |
| 6,151,059 A | 11/2000 | Schein et al. |
| 6,154,771 A | 11/2000 | Rangan et al. |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,226,447 B1 | 5/2001 | Sasaki et al. |
| 6,229,532 B1 | 5/2001 | Fujii |
| 6,233,389 B1 | 5/2001 | Barton et al. |
| 6,243,741 B1 | 6/2001 | Utsumi |
| 6,249,641 B1 | 6/2001 | Yokota |
| 6,253,375 B1 | 6/2001 | Gordon et al. |
| 6,256,704 B1 | 7/2001 | Hlava et al. |
| 6,272,672 B1 | 8/2001 | Conway |
| 6,278,837 B1 | 8/2001 | Yasukohchi et al. |
| 6,285,824 B1 | 9/2001 | Yanagihara et al. |
| 6,292,618 B1 | 9/2001 | Ohara et al. |
| 6,292,619 B1 | 9/2001 | Fujita et al. |
| 6,301,711 B1 | 10/2001 | Nusbickel |
| 6,304,714 B1 | 10/2001 | Krause et al. |
| 6,330,675 B1 | 12/2001 | Wiser et al. |
| 6,341,195 B1 | 1/2002 | Mankovitz et al. |
| 6,353,461 B1 | 3/2002 | Shore et al. |
| 6,400,407 B1 | 6/2002 | Zigmond et al. |
| 6,424,791 B1 | 7/2002 | Saib |
| 6,445,738 B1 | 9/2002 | Zdepski et al. |
| 6,445,872 B1 | 9/2002 | Sano et al. |
| 6,498,894 B2 | 12/2002 | Ito et al. |
| 6,504,990 B1 | 1/2003 | Abecassis |
| 6,516,467 B1 | 2/2003 | Schindler et al. |
| 6,542,695 B1 | 4/2003 | Akiba et al. |
| 6,553,178 B2 | 4/2003 | Abecassis |
| 6,698,020 B1 | 2/2004 | Zigmond et al. |
| 6,754,254 B2 | 6/2004 | Sendonaris |
| 6,788,882 B1 | 9/2004 | Geer et al. |
| 7,055,166 B1 | 5/2006 | Logan et al. |
| 7,272,298 B1 | 9/2007 | Lang et al. |
| 2005/0025469 A1 | 2/2005 | Geer et al. |
| 2005/0132418 A1 | 6/2005 | Barton et al. |
| 2005/0226604 A1 | 10/2005 | Kawamura et al. |

FOREIGN PATENT DOCUMENTS

| | | |
|---|---|---|
| EP | 0273384 | 7/1988 |
| EP | 0487296 | 5/1992 |
| EP | 0521454 | 1/1993 |
| EP | 0594241 A1 | 4/1994 |
| EP | 0 599 765 A2 | 6/1994 |
| EP | 0625858 | 11/1994 |
| EP | 0630006 | 12/1994 |
| EP | 0643388 | 3/1995 |
| EP | 0645929 | 3/1995 |
| EP | 0701246 | 3/1996 |
| EP | 0726574 | 8/1996 |
| EP | 0785675 | 7/1997 |
| EP | 0817483 | 1/1998 |
| GB | 2222742 | 3/1990 |
| GB | 2320637 | 6/1998 |
| JP | 63-161532 | 7/1988 |
| JP | 02-103732 | 4/1990 |
| JP | 04-088772 | 3/1992 |
| JP | 04-170756 | 6/1992 |
| JP | 06-233234 | 8/1994 |
| JP | 6-245157 | 9/1994 |
| JP | 7-111629 | 4/1995 |
| JP | 07-131754 | 5/1995 |
| JP | 7-250305 | 9/1995 |
| JP | 7-264529 | 10/1995 |
| WO | WO-91/03112 | 3/1991 |
| WO | WO-92/22983 | 12/1992 |
| WO | WO-95/09509 | 4/1995 |
| WO | WO-95/32584 | 11/1995 |
| WO | WO-98/56188 | 12/1998 |
| WO | WO-00/76130 | 12/2000 |

OTHER PUBLICATIONS

Ruemmler, Chris et al., *UNIX disk access patterns*, Hewlett–Packard Laboratories, Winter UNIX, San Diego, California, Jan. 25–29, 1993 ("HP").
*Specifications for Quantum 2000/Q2080/Q500 direct access storage device*, Quantum Corp., Sep. 1983.
"Conner Peripherals Unveils Dual Actuator Storage Device," Dow Jones Newswires, Oct. 22, 1991.
John R. Quain, "Continuing Forecast: Faster, Smaller; Forecast for the Hard Disk Drive Industry," Computer Shopper, May 1992, vol. 12, No. 5, p. 542, Ziff Davis Publishing.
Stan Miastkowski, "Speed Data Delivery," BYTE, Dec. 1994.
"Seagate Expands Support for Professional Audio/Video System Storage Applications," Business Wire, Apr. 5, 1995.
"Model DFMS–351AV," copyrighted 1995.
"Addendum to Functional Specification Ultrastar (DFMS) SCSI Models," IBM, May 18, 1995.
"Seagate Introduces 23–Gbyte Elite Disc Drive," Business Wire, Feb. 26, 1996.
T.–G. Kwon and S. Lee, "PRR: Prime Round–Robin Placement for Implementing VCR Operations," IEEE International Conference on Systems, 1995, vol. 5, pp. 3920–3925.
Greg Varana, "If I only had a drive," EDN, Sep. 13, 2001, pp. 31–40.
"Correctable Disk Errors and Audio/Video Applications," SCSI Toolbox, LLC, web page, Apr. 17, 2006.
"Audio/Video Drives FAQ," Seagate website page, copyrighted 2006.
"Audio/Video FAQ," Seagate website page, copyrighted 2006.
Excerpts from the deposition testimony of Thomas Worthington, Nov. 17, 2005 (pp. 1–6, 12–13, 72–79, 82–84, 97, 111–112, and 128–130).
Excerpts from the deposition testimony of Marc Brodsky, Feb. 17, 2006 (pp. 1–7, 17–18, 20–22, 77–112, and 174–177).
IBM Documents labeled IBM 000841 to IBM 000853, 1993.
IBM, Models DFHS–31080, –32160, and –34320 Disk Drive Specifications, Nov. 1993.
IBM, Models DFMS–31080, –32160, –32600, –34320, and –35250 Disk Drive Specifications, Nov. 1993.
Quantum, Empire Models 1440S, 2160S Disk Drive Specifications, 1993.
IBM, 0662 Model A10 Disk Drive Specification, Nov. 1993.
Seagate, Product Overview, Mar. 1994.
IBM, 0662 Models S12, S1D, SW1 and SWD Disk Drive Specifications, Nov. 1993.
Fujitsu, Models M2903, M2909, and M2915 Disk Drive Specifications, 1993.
IBM, 0664 Models M1H and N1H Disk Drive Specifications, Nov. 1992.
Quantum, Empire Models 540S and 1080S Disk Drive Specifications, 1993.
Seagate, Barracuda Family Disk Drive Specifications 1992.
IBM, Models DPEA–31080 and DPES–31080 Disk Drive Specifications, Oct. 1994.
Conner Peripherals, Inc., Filepro Performance 4207 Series Disk Drive Specification, May 1994.
Seagate, ST12400 Family Disk Drive Specifications, 1992.
Conner Peripherals, Inc., Aegean Series Disk Drive Specifications, Jun. 1992.
IBM, Models DSAA–3270, –3360, –3540, –3720; and DSAS–3270, –3360, –3540, –3720 Disk Drive Specifications, Nov. 1993.
IBM, 0663 Models E15 and E12 Disk Drive Specifications, Aug. 1992.
Conner Peripherals, Inc., Baja Series Disk Drive Specifications, Jun. 1992.
Conner Peripherals, Inc., Summit Series Disk Drive Specifications, Oct. 1991.
Seagate, Hawk 2XL Disk Drive Specifications 1995.
MPEG International Standard, ISO/IEC 11172–1 (1993).
SCSI–2 Specification, Revision 10L, Sep. 1993 (excerpts).
Yamamoto et al., High Areal Bit Density Perpendicular Magnetic Recording on Hard Disk, IEEE Transactions on Magnetics, vol. 27, No. 6, Nov. 1991.
Arnett et al., TMR and Squeeze at Gigabit Areal Densities, IEEE Transactions on Magnetics, vol. 28, No. 4, Jul. 1992.
Excerpts from the deposition testimony of Hal Ottesen, Nov. 11, 2005 & Feb. 9, 2006 (pp. 1–5, 203–207, 293–300, 336–337, and 342–343).
Excerpts from the deposition testimony of George Van Leeuwen, Feb. 8, 2006 (pp. 1–5, 95–96, and 117–118).
1993 Disk/Trend Report on Rigid Disk Drives (excerpts).
1995 Disk/Trend Report on Rigid Disk Drives (excerpts).
S. Berson et al., "Staggered Striping in Multimedia Information Systems", University of California Computer Science department Technical Report CSD–930042, Dec. 1993.
S. Berson et al., "Design of a Scalable Multimedia Storage Manager", UCLA Technical Report 94003, Jun. 1994.
Connor Filepro Performance Series CFP1060E/CFP1060S/CFP1060W Intelligent Disk Drive Product Manual, Rev. A, May 1994, Conner Peripherals.
I. Freedman et al., "Systems Aspects of COBE Science Data Compression", in 1993 Space and Earth Science Data Compression Workshop held at Snowbird, Utah, Apr. 2, 1993, pp. 85–97, NASA Conference Publication 3191.
Douglas T. Anderson, "The Hard Disk Technical Guide", Rev. Feb. 1994, Micro House.
Winston Hodge et al., "True Video on Demand v. Near Video on Demand in Interactive Television", pp. 103–120, McGraw–Hill: IBN 0–07–29151–9, National Cable Television Conference, May 24, 1995.
A. Hospodor, "The Effect of Prefetch on Caching SCSI Disk Drive Buffers", Doctoral Thesis, Santa Clara University, May 1994.
OEM Interface Specification for DSAA–3xxx(281/365/548(528MB)/730MB 3.5–inch Hard Disk Drive with ATA Interface, IBM Specification S84G–8402–00, IBM Rev. 1.0, Feb. 23, 1994.
IBM, 0663 and 0663 Enhanced Disk Drive SCSI Specification Release 4.0, IBM Specification 41W–0000–001, IBM, Sep. 18, 1992.
Apple Computer, "Inside MacIntosh: Overview", Addison–Wesley Publishing Co., 1992.
Neil McManes, "QuickTime Ready for Prime Time", MACWEEK, vol. 5, No. 42, Dec. 13, 1991.
Cyril U. Orji et al., "Design and Configuration Rationales for Digital Video Storage and Delivery Systems", Multimedia Tools & Applications 9:275–302(1992).
Quantum Fireball 640/1280S Product Manual, Quantum Corp., 1995.
Guide to VAX/VMS File Applications, Digital Equipment Corporation Massachusetts, Sep. 1984 (selected pages).

Harrick M. Vin et al., "Designing a Multiuser HDTV Storage Server", IEEE Journal on Selected Areas in Communication, 11(1): 153–164, Jan. 1993.

J. M. Harker et al., A Quarter Century of Disk File Innovation, IBM Journal of Research and Development, vol. 25, No. 5:678, 652–685, Sep. 1981.

European Examination Report dated Nov. 20, 2008 for EP Application No. 96480069.2.

European Examination Report dated Aug. 8, 2008 for European Patent No. 96480074.2.

R. Boyd–Merritt, Electronic Engineering Times, Redesigned Disk Drives Go To The Movies, Jan. 17, 1994, pp. 37, 39–40, 53.

V Fujii et al., "Implementation of MPEG Transport Demultiplexer with a RISC–Based Microcontroller," IEEE, 1996.

Woodham, D.J., (Chairman: M. Hausdorfer), A Solid State "Action Replay" Recorder, Symposium Record Broadcast Sessions, 16th International TV Symposium, Montreaux, Switzerland, Jun. 17–22, 1989.

R. Johnston et al., A Digital Television Sequence Store, IEEE Transactions on Communications, vol. Com–26, No. 5, May 1978.

R. Johnson et al., DASD: IBM's Direct Access Storage Devices, McGraw–Hill, Inc., 1992.

J. Meng et al., "CVEPS—A Compressed Video Editing and Parsing System," ACM Multimedia '96, Boston MA, pp. 43–53 (ACM 0–89791–671–1/96/1).

Ramanathan et al., "Toward Personalized Multimedia Dial–Up Services", Computer Networks and ISDN Systems Jul. 26, 1994, No. 10, Amsterdam, NL.

K. Shen et al., A Fast Algorithm for Video Parsing Using MPEG Compressed Sequences, IEEE, 252–5.

S. Smoliar et al., Content–Based Video Indexing and Retrieval, IEEE, Summer 1994, pp. 62–72.

J. Stratigos et al., Media4 Press Release "Announces Reseller Agreement with AlphaStar Television Networks", Microsoft® and Windows® 95 (2 pgs).

J. Stratigos et al., Media4 Press Release "Announces Multimedia Satellite Network for Personal Computers", Microsoft® and Windows® 95 (2 pgs).

H. Zhang, "Video Parsing, Retrieval and Browsing: An Integrated and Content–Based Solution," ACM Multimedia 95, Electronic Proceedings, Nov. 5–9, 1995, 16 pages.

Astarte DVDirector™ Beta Testing Program.

DiviCom, MP100 User Guide, DiviCom, Inc., © 1996 (97 pgs).

Hewlett Packard® MPEGscope Startup Guide, Hewlett Packard Company © 1997–2000 (39 pgs).

International Standard ISO/IEC 11172—2:1993(E), (Part 2: Video), Downloaded Jun. 15, 2005 124 pp.

International Standard ISO/IEC 11172–3:1993/Cor.1:1996(E), (Part 3: Audio), Downloaded Jun. 15, 2005–2 pages.

International Standard ISO/IEC 13818–1:2000(E) "Information Technology–Generic Coding of Moving Pictures and Associated Audio Information: Systems", © ISO/IEC 2000, Downloaded Jun. 30, 2005, 174 pp.

International Standard ISO/IEC 13818–2:2000(E) "Information Technology–Generic Coding of Moving Pictures and Associated Audio Information: Video", © ISO/IEC 2000, Downloaded Jun. 30, 2005, 220 pp.

International Standard ISO/IEC 13818–3:1998(E) "Information Technology—Generic Coding of Moving Pictures and Associated Audio Information: Audio", © ISO/IEC 1998 (126 pp).

International Standard ISO/IEC 13818:1:2000/Amd.2:2004(E) "Information Technology—Generic Coding of Moving Pictures and Associated Audio Information: Systems", Amendment 2: Support of IPMP on MPEG–2 Systems, © ISO/IEC 2004, Downloaded Jun. 30, 2005, 13 pages.

MediaStream by Media4, "Desktop Satellite Multimedia", "The MediaStream Receiver Card", "MediaStream Uplink System", by Media4, Inc.

Media Stream, "Satellite Receiver" Installation and Users Guide for Windows 95, Media4, Inc., © 1996.

R. A. Pascoe, "Multimedia Bitmap Video Imaging in an OS/2 Window," IBM Technical Disclosure Bulletin, 34(7A) 402–403 (1991).

Hewlett Packard® MPEGscope User's Guide, Hewlett Packard Company ® 1997–2000, 282 pgs.

Inside MacIntosh "Memory", Apple Technology Library by Apple Computer, Inc., © 1992 (published by Addison Wesley Publishing Company) 303 pgs.

Inside MacIntosh "QuickTime", Apple Technology Library by Apple Computer, Inc., © 1993 (published by Addison–Wesley Publishing Company) 719 pgs.

Inside MacIntosh "QuickTime Components", Apple Technology Library by Apple Computer, Inc., © 1993 (published by Addison–Wesley Publishing Company) 828 pgs.

Inside Macintosh "Files," Apple Technology Library by Apple Computer, Inc., © 1992 (published by Addison–Wesley Publishing Company) 532 pgs.

European search report dated Apr. 25, 2006 for European Pat. Appln. No. 96480074.2.

European examination report dated Jan. 8, 2007 for European Pat. Appln. No. 96480074.2.

Oyang, et al., "Design of Multimedia Storage Systems for On–Demand Playback," Proceedings of the International Conference on Data Engineering, Taipei, Mar. 6–10, 1995, vol. CONF 11, pp. 457–465.

European Search Report for EP Application No. 96480069, dated Dec. 30, 2005.

European Office Action for EP Application No. 96480074, dated Sep. 21, 2007.

European Office Action for EP Application No. 96480069, dated Nov. 27, 2007.

US 6,529,685 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 6-14 and 17-20 are cancelled.

Claims 3, 15 and 16 are determined to be patentable as amended.

Claims 4 and 5 were not reexamined.

3. [The device of claim 1] *A direct access storage device for buffering at least a portion of a multimedia program presentation comprising source program segments each representative of a temporally unique portion of the multimedia program, the direct access storage device comprising:*

*at least one data storage disk having a plurality of data storing regions disposed on any of a lower disk surface and an upper disk surface;*

*a spindle motor for rotating the at least one data storage disk;*

*a single actuator having elongated arms;*

*a read/write transducer disposed on each of the elongated arms;*

*a translatable presentation control window buffer supported by the plurality of data storing regions, the presentation control window buffer storing source program segments defining a portion of the multimedia program presentation and comprising a forward window portion and a reverse window portion defined with respect to a current viewing time reference; and*

*a controller for coordinating writing of the source program segments to the plurality of data storing regions and reading of the source program segments from the presentation control window buffer to effect at least pause, forward, and reverse functions in response to respective pause, forward, and reverse control signals,* wherein the at least one data storage disk includes an upper data storing region disposed on the upper disk surface and a lower data storing region disposed on the lower disk surface, the upper and lower data storing regions comprising respective spiral tracks.

15. [The method of claim 14] *A method for buffering at least a portion of a multimedia program presentation comprising source program segments each representative of a temporally unique portion of a multimedia program, the method comprising:*

*providing a direct access storage device comprising a plurality of read/write heads supported by a single actuator and having a plurality of data storing regions defined on a surface of at least one data storage disk disposed in the direct access storage device;*

*providing a translatable presentation control window buffer supported by the plurality of data storing regions, the presentation control window buffer storing source program segments defining a portion of the multimedia program presentation and comprising a forward window portion and a reverse window portion defined with respect to a current viewing time reference;*

*writing the source program segments to the plurality of data storing regions; and*

*reading the source program segments from the presentation control window buffer to effect at least pause, forward, and reverse functions in response to respective pause, forward, and reverse control signals,* wherein the at least one data storage disk includes an upper data storing region disposed on the upper disk surface and a lower data storing region disposed on the lower disk surface, the upper and lower data storing regions comprising respective spiral tracks, and writing and reading the source program segments comprises writing and reading the source program segments to and from the spiral tracks.

16. [The method of claim 14] *A method for buffering at least a portion of a multimedia program presentation comprising source program segments each representative of a temporally unique portion of a multimedia program, the method comprising:*

*providing a direct access storage device comprising a plurality of read/write heads supported by a single actuator and having a plurality of data storing regions defined on a surface of at least one data storage disk disposed in the direct access storage device;*

*providing a translatable presentation control window buffer supported by the plurality of data storing regions, the presentation control window buffer source program segments defining a portion of the multimedia program presentation and comprising a forward window portion and a reverse window portion defined with respect to a current viewing time reference;*

*writing the source program segments to the plurality of data storing regions;*

*reading the source program segments from the presentation control window buffer to effect at least pause, forward, and reverse functions in response to respective pause, forward, and reverse control signals and* further comprising transitioning from a spiral track following mode to a cylindrical track following mode in response to an output buffer overflow condition or one of the respective pause, forward, and reverse control signals.

\* \* \* \* \*